US007992400B2

(12) United States Patent
Uno et al.

(10) Patent No.: US 7,992,400 B2
(45) Date of Patent: Aug. 9, 2011

(54) REFRIGERATING APPARATUS AND FLUID MACHINE THEREFOR

(75) Inventors: Keiichi Uno, Kariya (JP); Hironori Asa, Okazaki (JP); Yasuhiro Takeuchi, Kariya (JP); Hideji Yoshida, Hashima (JP); Akihiro Imura, Kariya (JP); Atsushi Inaba, Kariya (JP); Koichi Ban, Tokai (JP); Takashi Yamanaka, Kariya (JP); Shigeki Iwanami, Okazaki (JP); Hiroshi Kishita, Anjo (JP); Hiroshi Ogawa, Nagoya (JP)

(73) Assignees: DENSO CORPORATION, Kariya (JP); Nippon Soken, Inc., Nishio (JP)

( * ) Notice: Subject to any disclaimer, the term of this patent is extended or adjusted under 35 U.S.C. 154(b) by 681 days.

(21) Appl. No.: 12/078,074

(22) Filed: Mar. 27, 2008

(65) Prior Publication Data
US 2008/0184706 A1    Aug. 7, 2008

Related U.S. Application Data

(62) Division of application No. 11/260,680, filed on Oct. 28, 2005, now Pat. No. 7,418,824.

(30) Foreign Application Priority Data

Oct. 29, 2004 (JP) ................................ 2004-316738
Oct. 29, 2004 (JP) ................................ 2004-316739
Oct. 29, 2004 (JP) ................................ 2004-316740
Nov. 19, 2004 (JP) ................................ 2004-336409
Feb. 25, 2005 (JP) ................................ 2005-051530
Aug. 24, 2005 (JP) ................................ 2005-242879

(51) Int. Cl.
*F25B 27/00* (2006.01)

(52) U.S. Cl. ..................................................... 62/238.6
(58) Field of Classification Search ................. 62/238.6, 62/238.4, 323.1, 498; 60/667, 670
See application file for complete search history.

(56) References Cited

U.S. PATENT DOCUMENTS

| 3,153,442 | A  | * | 10/1964 | Silvern ........................... 165/50 |
| 6,581,384 | B1 |   | 6/2003  | Benson |
| 6,606,860 | B2 |   | 8/2003  | McFarland |
| 6,827,104 | B2 |   | 12/2004 | McFarland |
| 7,159,400 | B2 | * | 1/2007  | Tsutsui et al. .................. 60/665 |
| 7,181,919 | B2 | * | 2/2007  | Uno et al. ........................ 62/157 |
| 2003/0188728 | A1 |   | 10/2003 | Shinohara et al. |
| 2004/0184923 | A1 |   | 9/2004  | Iwanami et al. |

(Continued)

FOREIGN PATENT DOCUMENTS

EP    1 326 009 A1    7/1999

(Continued)

OTHER PUBLICATIONS

Office Action from China Patent Office dated Apr. 24, 2009 in the corresponding CN application No. 2007101971163.3 (and English Translation).

(Continued)

*Primary Examiner* — Melvin Jones
(74) *Attorney, Agent, or Firm* — Posz Law Group, PLC

(57) ABSTRACT

A complex fluid machine has an expansion-compressor device, a pump, and a motor generator, wherein the expansion-compressor device, the pump, and the motor generator are operatively connected and arranged in series, and a power transmitting device for disconnecting the pump from the motor generator, when the expansion-compressor device is driven by the motor generator so as to be operated as a compressor device.

5 Claims, 34 Drawing Sheets

U.S. PATENT DOCUMENTS

| | | |
|---|---|---|
| 2004/0187506 A1 | 9/2004 | Iwanami et al. |
| 2004/0231330 A1 | 11/2004 | Ibaraki et al. |
| 2006/0086091 A1 | 4/2006 | Sato et al. |
| 2006/0101817 A1 | 5/2006 | Fukutomi et al. |

FOREIGN PATENT DOCUMENTS

| | | |
|---|---|---|
| JP | S41-003398 Y | 2/1966 |
| JP | S41-16853 Y | 8/1966 |
| JP | A-56-43018 | 4/1981 |
| JP | A-58-126407 | 7/1983 |
| JP | A-58-183803 | 10/1983 |
| JP | U-61-84190 | 6/1986 |
| JP | A-62-051726 | 3/1987 |
| JP | A-63-96449 | 4/1988 |
| JP | U-1-93397 | 6/1989 |
| JP | A-4-54205 | 2/1992 |
| JP | A-8-86289 | 4/1996 |
| JP | B2-3485659 | 7/1996 |
| JP | B2-2540738 | 10/1996 |
| JP | A-10-18988 | 1/1998 |
| JP | A-2000-127753 | 5/2000 |
| JP | A-2000-320912 | 11/2000 |
| JP | A-2004-108220 | 4/2004 |

OTHER PUBLICATIONS

Notice of Official Rejection mailed on Mar. 16, 2010 issued from the Japanese Patent Office in the corresponding Japanese patent application No. 2005-051530 (with English translation).

Office Action mailed on Oct. 5, 2010 issued from the Japanese Patent Office in corresponding Japanese patent application No. 2005-242879 (with English translation).

U.S. Appl. No. 11/194,370, filed Aug. 1, 2005.

U.S. Appl. No. 11/091,451, filed Mar. 29, 2005.

Office Action from German Patent Office issued on Dec. 15, 2006, for the corresponding German patent application No. 10 2005 051 428.6-13 (and Translation thereof).

Office Action from Japan Patent Office mailed on Jun. 23, 2009 in the corresponding Japanese patent application No. 2004-316740 (and English translation).

Office Action from Japan Patent Office mailed on Jul. 21, 2009 in the corresponding Japanese patent application No. 2004-316738 (and English translation).

* cited by examiner

A/C COMMAND SIGNAL, ETC.

REFRIGERATING APPARATUS AND FLUID MACHINE THEREFOR

CROSS REFERENCE TO RELATED APPLICATION

This application is a divisional application of U.S. Ser. No. 11/260,680, which was filed on Oct. 28, 2005. This application is based on Japanese Patent Application Nos. 2004-316739 filed on Oct. 29, 2004, 2004-316738 filed on Oct. 29, 2004, 2004-316740 filed on Oct. 29, 2004, 2004-336409 filed on Nov. 19, 2004, 2005-51530 filed on Feb. 25, 2005, and 2005-242879 filed on Aug. 24, 2005, the disclosures of which are incorporated herein by reference. Further, parent application U.S. Ser. No. 11/260,680 is incorporated herein by reference.

FIELD OF THE INVENTION

The present invention relates to a refrigerating apparatus having a refrigerating cycle for performing a cooling operation and Rankine cycle for collecting waste heat from a heat generating device, such as an internal combustion engine. The present invention further relates to a complex fluid machine to be applied to the refrigerating apparatus, wherein the fluid machine has a function of a compressor device for compressing and pumping out working fluid as well as an expansion device for outputting mechanical energy by expanding the working fluid operating in the Rankine cycle. The present invention further relates to a method for controlling an operation of the refrigerating apparatus, in particular relates to a method of stopping the operation of the Rankine cycle.

BACKGROUND OF THE INVENTION

A complex fluid machine, in which a compressor device, an expansion device, a driving motor and a pump are integrally formed, is known in the art, for example as shown in Japanese Patent Publication No. H8-86289 (a rotating machine of a rolling type piston is shown). In the above complex fluid machine, the respective components are arranged in series and coaxially connected with one another (the compressor device is connected to the expansion device by a magnet coupling device, or directly). The compressor device is used for compressing refrigerant in a refrigerating cycle, whereas the expansion device is operated by working fluid in Rankine cycle.

According to the above fluid machine, the expansion device is driven by the driving motor for a certain period during its initial (starting) stage until an operation of the expansion device becomes stable. Then, the expansion device is driven by the expansion of the working fluid (which is heated by a burner to be converted into high pressure and high temperature working fluid) in the Rankine cycle, so that it is rotated by its own driving force. The driving force is directly or indirectly (through the magnet coupling) transmitted to the compressor device to operate the same, so that the working fluid is compressed. The pump is also operated by the driving force generated at the expansion device for circulating the working fluid in the Rankine cycle.

As above, a heat generating device (such as the burner) is specifically necessary in the above mentioned prior art apparatus. The present inventors have been developing a refrigerating apparatus to be used for an automotive vehicle, in which waste heat from an internal combustion engine is collected and utilized for operating the Rankine cycle, in order that energy consumption can be reduced in view of grovel warming.

In the case that the above mentioned prior art apparatus is used for the automotive vehicle, in which the waste heat from the engine is used as a heating source (instead of the burner), the driving force can not be obtained by the expansion device when an amount of the waste heat from the engine is small. During such a period, the compressor device can be operated by the driving motor. In such a case, however, the pump is also operated by the driving motor together with the compressor device, reducing efficiency of the operation for the compressor by the driving motor.

On the other hand, in the case that the operation of the compressor device is not necessary (a cooling operation by the refrigerating cycle is not required), the operation of the expansion device is stopped even when the waste heat from the engine can be sufficiently obtained. As a result, the waste heat can not be efficiently utilized for collecting the energy by the expansion device.

According to another prior art fluid machine, for example shown in Japanese Patent Publication No. 2004-232492, the fluid machine likewise has a function of a compressor device and a function of an expansion device. According to this prior art fluid machine, the compressor device is also operated as the expansion device, wherein the flow direction of the working fluid in case of operating as the compressor device is opposite to that of the working fluid in case of operating as the expansion device. A first fluid (discharge) port and a first (discharge) valve device are provided in the fluid machine, so that compressed working fluid is pumped out through the first fluid (discharge) port. Further, a second fluid (inlet) port and a second (inlet) valve device are provided in the fluid machine, so that high pressure and high temperature working fluid is supplied into the expansion device. The second fluid (inlet) port is closed by the second valve device (an electrically operated ON-OFF valve device) when the fluid machine is operated as the compressor device.

According to the above fluid device, however, a volume of the second fluid port inevitably becomes a dead volume for a compression operation of the fluid machine (the dead volume: a volume of the working fluid which is not pumped out and remains in a working chamber during the compression operation). It is a problem, in particular, when an inner diameter of the second fluid port is to be designed to be larger for the purpose of allowing a large amount of the working fluid to flow into the working chamber of the expansion device, or when the amount of the working fluid pumped out from the compressor device for each rotation is designed to be smaller.

According to a further prior art refrigerating apparatus, for example shown in Japanese Patent Publication No. S56-43018, the refrigerating apparatus is used for the automotive vehicle, wherein a compressor device is connected with an expansion device so that the compressor device is driven by a driving force generated by the expansion device operated by use of waste heat from an engine. In such a refrigerating apparatus, however, a cooling operation can not be performed in the case that the waste heat can not be collected during a warming up operation of the engine. In particular, even in the case that a large cooling capacity is required for quickly cooling down an inside of the vehicle after the vehicle has been parked under the brazing sun in summer, the cooling operation is not possible so long as the sufficient waste heat can not be collected from the engine.

Therefore, the present inventors have proposed, in their Japanese Patent Application No. 2004-227006, a refrigerating apparatus for an automotive vehicle, in which a compressor device is separated from an expansion device, the compressor device is driven by an engine or a driving motor, and the energy from the expansion device is used for generating an electric power and/or for driving a pump for circulating working fluid in Rankine cycle. According to the above proposed refrigerating apparatus, the cooling operation becomes possible even when there is no waste heat, whereas the energy can be efficiently collected by the Rankine cycle when there is a sufficient amount of the waste heat.

According to the above proposed refrigerating apparatus, however, the cooling operation can not be performed when the engine operation is temporarily stopped, in the case that the refrigerating apparatus is applied to such a vehicle having an idle-stop operation in view of environmental protection.

According to a still further prior art, for example, as shown in Japanese Patent Publication No. 2004-108220, an electric power is generated at a generator which is driven by an expansion device to be operated in Rankine cycle for collecting waste heat.

The electric power generator is usually operated by a sensor-less control method, according to which a rotational phase of the generator is predicted without using a phase sensor, so that a generator of a low cost is realized.

It is not possible, in such a sensor-less control method, to completely prevent an operation of the generator from becoming out of a control as a result the operation steps out of its normal operational condition. Accordingly, the operation of the generator is generally stopped in the case that the operation of the generator (which is driven by the expansion device) steps out of its normal operational condition. Then, since a load to the expansion device is removed, the rotation of the expansion device may be accelerated and may exceed a tolerance rotational level. If it would happen, noise might be generated at the expansion device, and as the case may be, the expansion device might be damaged. Furthermore, a higher voltage may be generated at the generator, causing a problem in that related electrical parts or devices may be damaged.

Even in the case that an operation of the generator is controlled by signals from position sensors, the operation of the generator may become out of control, if a controller (inverter) for the generator becomes out of order, and the rotation of the expansion device may be accelerated and damaged.

SUMMARY OF THE INVENTION

The present invention is made in view of the above problems. It is, therefore, an object of the present invention to provide a refrigerating apparatus and a fluid machine to be applied to the refrigerating apparatus, in which a pump is driven by an expansion device, an influence of the pump is eliminated when the fluid machine is operated as a compressor device, and waste heat can be effectively collected and utilized even when a cooling operation by the compressor device is not required.

It is another object of the present invention to provide a fluid machine for a refrigerating apparatus, in which a dead volume is reduced when the fluid machine is operated as a compressor device.

It is a further object of the present invention to provide a refrigerating apparatus, in which waste heat is collected from a heat generating device, for example an internal combustion engine for an automotive vehicle, and a cooling operation can be continuously performed even when an operation of the heat generating device is temporarily stopped. The refrigerating apparatus can provide the cooling operation, even when a requirement for the cooling operation is temporarily and highly increased.

It is a further object of the present invention to provide a waste heat utilizing apparatus for an internal combustion engine and a method of controlling an operation of the apparatus, in which an operation of an expansion device is stopped in safe for preventing an acceleration of the expansion device when an operation for an electric power generator becomes out of control.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
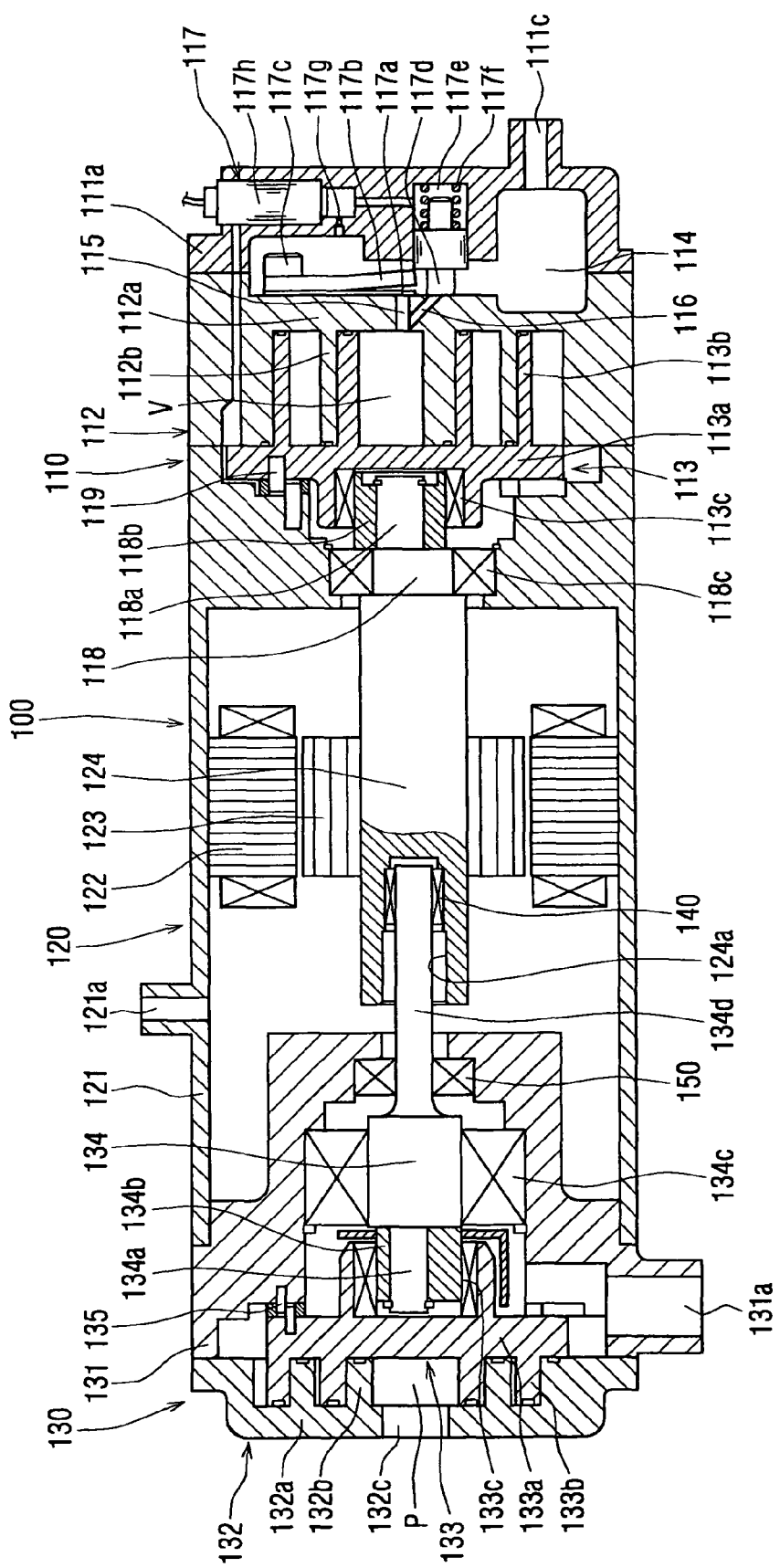
FIG. 1 is a schematic cross sectional view showing a complex fluid machine according to a first embodiment of the present invention.

A first embodiment relates to an automotive air conditioning apparatus, wherein a complex fluid machine 100 of the present invention is applied to a refrigerating cycle 30 having Rankine cycle 40.

At first, a structure of the complex fluid machine is explained with reference to FIG. 1. The complex fluid machine 100 comprises an expansion-compressor device 110 having both functions of a compressor device and an expansion device, a motor generator 120 having both functions of an electric power generator and an electric motor, and a refrigerant pump 130.

The expansion-compressor device 110 has the same structure to a well-known scroll type compressor, and comprises a fixed scroll 112 provided between a front housing 111a and a motor housing 121, a movable scroll 113 facing to and rotated with respect to the fixed scroll 112, a discharge port 115 for communicating a working chamber V with a high pressure chamber 114, an inlet port 116, and a valve device 117 for opening and closing the inlet port 116.

The fixed scroll 112 has a base plate 112a and vortical scroll wrap 112b extending from the base plate 112a toward the movable scroll 113, whereas the movable scroll 113 has a vortical scroll wrap 113b to be contacted and engaged with the vortical scroll wrap 112b and a base plate 113a on which the scroll wrap 113b is formed. The working chamber V is formed between the fixed scroll 112 and the movable scroll 113, the scroll wraps 112b and 113b of which are operatively contacted with each other. The volume of the working chamber V is changed (expanded or contracted) when the movable scroll 113 is rotated with respect to the fixed scroll 112 (moves around the fixed scroll).

A shaft 118 is a crank shaft, which is rotationally supported by a bearing 118c fixed to the motor housing 121, and which has a crank portion 118a at its one axial end, wherein the crank portion 118a is eccentric with respect to a rotational center of the shaft 118. The crank portion 118a is connected to the movable scroll 113 via a bushing 118b and a bearing 113c.

A self rotation prevention mechanism 119 is provided between the movable scroll 113 and the motor housing 121, so that the movable scroll 113 rotates around the crank portion 118a by one turn when the shaft 118 is rotated by one turn. Namely, the movable scroll 113 is prevented from rotating on its axis but is rotated around the rotational center of the shaft 118 (in an orbital motion). The volume of the working chamber V becomes smaller, as the working chamber is moved from the outside portion of the movable scroll 113 toward its center, when the shaft 118 is rotated in a forward direction. On the other hand, the volume of the working chamber V becomes larger, as the working chamber is moved from its center toward the outside portion of the movable scroll 113, when the shaft 118 is rotated in a reversed direction.

The discharge port 115 is formed at a center portion of the base plate 112a, so that the working chamber V, which has become to its minimum volume when the expansion-compressor device 110 is operated as a compressor device (hereinafter, referred to as a compression mode), is communicated with the high pressure chamber 114 formed in the front housing 111a to discharge (pump out) the compressed refrigerant (the compressed working fluid). The inlet port 116 is likewise formed in the base plate 112a (adjacent to the discharge port 115), to communicate the high pressure chamber 114 with the working chamber V, which has become to its minimum volume when the expansion-compressor device 110 is operated as an expansion device (hereinafter, referred to as an expansion mode), so that high pressure and high temperature refrigerant (i.e. superheated vaporized refrigerant) supplied into the high pressure chamber 114 is introduced into the working chamber V.

The high pressure chamber 114 has a function for smoothing pulsation of the refrigerant pumped out from the discharge port 115, and a high pressure port 111c to be connected to a heating device 43 and a condenser 31 is formed at the high pressure chamber 114.

A low pressure port 121a, which is connected to an evaporator 34 and a second bypass passage 42, is formed in the motor housing 121, and is communicated with a side of the fixed scroll 112 through an inside of the motor housing 121.

The valve device 117 comprises a discharge port valve device having a discharge valve 117a, an inlet port valve device having a valve body 117d, an electromagnetic valve 117h, and so on. The discharge valve 117a is arranged in the high pressure chamber 114, and is a check valve of a reed valve shape for preventing the refrigerant pumped out from the discharge port 115 from flowing back from the high pressure chamber 114 into the working chamber V. A stopper 117b is a valve stopping plate for restricting a maximum opening degree of the discharge valve 117a. The discharge valve 117a and the stopper 117b are fixed to the base plate 112a by a bolt 117c.

The valve body 117d is a switching valve for switching from the compression mode to the expansion mode, and vice versa, by opening or closing the inlet port 116. A backward portion of the valve body 117d is slidably inserted into a back pressure chamber 117e formed in the front housing 111a. A spring 117f (a biasing means) is disposed in the inside of the back pressure chamber 117e, for biasing the valve body 117d in a valve closing direction, namely in a direction in which a forward portion of the valve body 117d closes the inlet port 116. An orifice 117g is formed in the front housing 111a, at a passage connecting the back pressure chamber 117e with the high pressure chamber 114, wherein the orifice 117g has a certain flow resistance.

The electromagnetic valve 117h is a control valve for controlling the pressure in the back pressure chamber 117e, by controlling a communication condition between the low pressure side (the low pressure port 121a) and the back pressure chamber 117e. The control valve 117h is operated by an electronic control unit (not shown).

When the electromagnetic valve 117h is opened, the pressure in the back pressure chamber 117e is decreased to become lower than that in the high pressure chamber 114. The valve body 117d is moved in the right hand side of FIG. 1, compressing the spring 117f, to open the inlet port 116. The pressure loss at the orifice 117g is extremely high, and thereby the flow amount of the refrigerant from the high pressure chamber 114 into the back pressure chamber 117e is negligible small.

When the electromagnetic valve 117h is closed, the pressure in the back pressure chamber 117e becomes equal to that of the high pressure chamber 114 through the orifice 117g. Then, the valve body 117d is moved in the left hand direction in FIG. 1 by the spring force of the spring 117f, to close the inlet port 116. As above, the valve body 117d, the back pressure chamber 117e, the spring 117f, the orifice 117g, and the electromagnetic valve 117h form an electrical switching valve of a pilot type, to open and close the inlet port 116. The inlet port 116 and the valve body 117d form a switching device for switching a fluid passage between the working chamber V and the high pressure chamber 114.

The motor generator 120 comprises a stator 122 and a rotor 123 rotating in the inside of the stator 122, and is accommodated in the motor housing 121 (in the low pressure space of the fluid machine 100) fixed to the fixed scroll 112. The stator 122 is a stator coil wound with electric wires and is fixed to an inner peripheral surface of the motor housing 121. The rotor 123 is a magnet rotor, in which permanent magnets are provided, and is fixed to a motor shaft 124. One end of the motor shaft 124 is connected to the shaft 118 of the expansion-compressor device 110, and a hole 124a is formed at the other end of the motor shaft 124, with which a pump shaft 134 of the refrigerant pump 130 is operatively connected.

The motor generator 120 is operated as a motor (the electric motor) for driving the expansion-compressor device 110 (operating as the compressor device), when electric power is supplied from a battery 13 to the stator 122 through an inverter 12 and thereby the rotor 123 is rotated (in the forward direction). The motor generator 120 is also operated as the motor (the electric motor), for driving the refrigerant pump 130, when the rotor 123 is rotated (in the reversed direction), as described below. The motor generator 120 is furthermore operated as a generator (an electric power generator) for generating electric power, when a torque for rotating the rotor 123 (in the reversed direction) is inputted by a driving force produced by the expansion-compressor device 110 in its expansion mode. The electric power thus obtained is charged into the battery 13 through the inverter 12.

The refrigerant pump 130 is arranged at an adjacent position to the motor generator 120, and at the opposite side of the expansion-compressor device 110, and accommodated in a pump housing 131 fixed to the motor housing 121. The refrigerant pump 130 comprises, as in the same manner to the expansion-compressor device 110, a fixed scroll 132 having a base plate 132a and a scroll wrap 132b, and a movable scroll 133 having a base plate 133a and a scroll wrap 133b. The fixed scroll 132 is fixed to the pump housing 131, whereas the movable scroll 133 is arranged in a space defined by the pump housing 131 and the fixed scroll 132. The movable scroll 133 rotates in an orbital motion, and a self rotation on its axis is prevented by a self rotation preventing mechanism 135.

The pump housing 131 is formed with an inlet opening 131a, which is connected to a gas-liquid separator 32 and communicated with a side of the movable scroll 133 and the inside of the pump housing 131. The fixed scroll 132 is formed with an outlet opening 132c, through which a working chamber P formed by the fixed and movable scrolls 132 and 133 is communicated with the heating device 43 (described later).

The pump shaft 134 is rotationally supported by a bearing 134c fixed to the pump housing 131, and has a crank portion 134a at its one axial end, wherein the crank portion 134a is eccentric with respect to a rotational center of the pump shaft 134. The crank portion 134a is connected to the movable scroll 133 via a bushing 134b and a bearing 133c. The other axial end of the pump shaft 134 is formed with a small diameter portion 134d, which is smaller in diameter than the other portion of the pump shaft 134 (a portion supported by the bearing 134c), and the small diameter portion 134d is inserted into the hole 124a formed at the axial end of the motor shaft 124.

A one way clutch 140 is provided between the motor shaft 124 and the pump shaft 134 (the small diameter portion 134d). The one way clutch 140 is engaged with the pump shaft 134 (the small diameter portion 134d), when the motor shaft 124 is rotated in the reversed direction (in the rotational direction of the expansion mode), to rotate the pump shaft 134. On the other hand, the one way clutch 140 becomes out of engagement with the pump shaft 134 (the small diameter portion 134d), when the motor shaft 124 is rotated in the forward direction (in the rotational direction of the compression mode), to disconnect the pump shaft 134 from the motor shaft 124 (not to rotate the pump shaft 134).

A shaft seal member 150 is provided between the pump housing 131 and the small diameter portion 134d of the pump shaft 134, to seal the inner space of the motor generator 120 from the inner space of the refrigerant pump 130 (the space of the low pressure side, which is communicated with the inlet opening 131a from the movable scroll 133)

The above complex fluid machine 100 is incorporated into the refrigerating cycle 30 having Rankine cycle 40, to form a refrigerating apparatus 1 (the automotive air conditioning apparatus). More specifically, the expansion-compressor device 110 (the compressor device in the compression mode) is incorporated into the refrigerating cycle 30, whereas the expansion-compressor device 110 (the expansion device in the expansion mode) and the refrigerant pump 130 are incorporated into the Rankine cycle 40. The refrigerating apparatus 1 is explained with reference to FIG. 2.

The refrigerating cycle 20 transfers the heat from a low temperature side to a high temperature side, and utilizes its cold heat and hot heat for an air conditioning operation. The refrigerating cycle 30 comprises the expansion-compressor device 110, the condenser 31, the gas-liquid separator 32, a depressurizing device 33, the evaporator 34 and son on, wherein those components are connected in a circuit.

The condenser 31 is a heat exchanger connected at a refrigerant discharge side of the expansion-compressor device 110 in the case of the compression mode, and for cooling down the high pressure and high temperature refrigerant to condense (liquidize) the refrigerant. A fan 31a blows cooling air (outside air) toward the condenser 31.

The gas-liquid separator 32 is a receiver for separating the refrigerant condensed at the condenser 31 into a gas-phase refrigerant and a liquid-phase refrigerant, to flow out the liquid-phase refrigerant. The depressurizing device 33 is a temperature dependent type expansion valve for depressurizing and expanding the liquid-phase refrigerant separated at the gas-liquid separator 32, wherein an opening degree of the valve is controlled so that the refrigerant is depressurized in an isenthalpic manner and that superheated degree of the refrigerant to be sucked into the expansion-compressor device 110 in the compression mode is controlled at a predetermined value.

The evaporator 34 is a heat exchanger for performing a heat absorbing operation by evaporating the refrigerant depressurized by the depressurizing device 33, to cool down air outside of a vehicle (the outside air) or air inside of the vehicle (the inside air), which is blown through the evaporator by a fan 34*a*. A check valve 34*b* is provided at a refrigerant outlet side of the evaporator 34, for allowing the refrigerant to flow only from the evaporator 34 to the expansion-compressor device 110.

The Rankine cycle 40 collects energy (a driving force at the expansion mode of the expansion-compressor device 110) from waste heat generated at an engine 10 producing a driving power for the vehicle. The condenser 31 is commonly used in both of the refrigerating cycle 30 and the Rankine cycle 40. A first bypass passage 41 is provided between the gas-liquid separator 32 and a juncture A, which is an intermediate point between the condenser 31 and the expansion-compressor device 110, wherein the first bypass passage 41 bypasses the condenser 31. The second bypass passage 42 is provided between junctures B and C, wherein the juncture B is an intermediate point between the expansion-compressor device 110 and the check valve 34*b*, whereas the juncture C is an intermediate point between the condenser 31 and the juncture A. The Rankine cycle 40 is formed in the following manner.

The refrigerant pump 130 of the complex fluid machine 100 and a check valve 41*a* are arranged in the first bypass passage 41, wherein the check valve 41*a* allows the refrigerant to flow only from the gas-liquid separator 32 to the refrigerant pump 130. The heating device 43 is provided between the juncture A and the expansion-compressor device 110.

The heating device 43 is a heat exchanger for heating the refrigerant by heat-exchange between the refrigerant supplied by the refrigerant pump 130 and engine cooling water (hot water) of an engine cooling circuit 20 (hot water circuit) of the engine 10. A three way valve 21 is provided in the hot water circuit 20. A heating device bypass passage 21*a* is provided between the three way valve 21 and the engine 10. The three way valve 21 switches from a hot water circulation mode to a water non-circulation mode (a hot water bypass mode), and vice versa, so that the hot water from the engine 10 is controlled to be supplied or not to be supplied to the heating device 43. A switching operation of the three way valve 21 is controlled by an electronic control unit (not shown).

An alternator 11 is provided at the engine 10, wherein the alternator 11 is driven by the engine 10, and the electric power generated at the alternator 11 is charged into the battery 13 through the inverter 12.

A water pump 22, which is for example a mechanical pump driven by the engine 10, is provided in the hot water circuit 20 for circulating the engine cooling water, and a radiator 23 is a heat exchanger for heat-exchanging the engine cooling water with the outside air for cooling down the engine cooling water.

A check valve 42*a* is provided in the second bypass passage 42 for allowing the refrigerant to flow only from the expansion-compressor device 110 to an inlet side of the condenser 31. An ON-OFF valve 44 is provided in a passage between the junctures A and C. The valve 44 is an electromagnetic valve for opening or closing the passage and is controlled by the electronic control unit (not shown).

The Rankine cycle 40 is formed by the gas-liquid separator 32, the first bypass passage 41, the refrigerant pump 130, the heating device 43, the expansion-compressor device 110, the second bypass passage 42, the condenser 31, and so on.

The operation and effects of the complex fluid machine 100 of the first embodiment is explained below.

Compression Mode

In the compression mode, the motor generator 120 is operated as the electric motor when a cooling operation by the refrigerating cycle is necessary, a rotational force is applied to the motor shaft 124 (in the forward direction) to rotate the movable scroll 113 of the expansion-compressor device 110, so that the refrigerant is sucked and compressed in the refrigerating cycle.

More specifically, the ON-OFF valve 44 is opened by the control unit (not shown) and the engine cooling water is prevented by the three way valve 21 from flowing into the heating device 43. The electromagnetic valve 117*h* is closed to close the inlet port 116 by the valve body 117*d*, and the electric power is supplied to the stator 122 of the motor generator 120 from the battery 13 through the inverter 12 to rotate the motor shaft 124.

During this operation, as in the same manner to the well known scroll type compressor, the expansion-compressor device 110 sucks the refrigerant from the low pressure port 121*a*, compresses the same in the working chamber V, pumps out the compressed refrigerant from the discharge port 115 into the high pressure chamber 114, and discharges the compressed refrigerant from the high pressure port 111*c* to the condenser 31.

The refrigerant discharged from the high pressure port 111*c* is circulated in the refrigerating cycle 30 of the heating device 43, the ON-OFF valve 44, the condenser 31, the gas-liquid separator 32, depressurizing device 33, the evaporator 34, the check valve 34*b*, the low pressure port 121*a* of the expansion-compressor device 110, so that the cooling operation is performed by the heat absorbing operation at the evaporator 34. Since the engine cooling water (the hot water) does not flow into the heating device 43, the refrigerant is not heated in the heating device 43, and thereby the heating device 43 operates simply as a part of the refrigerant passage.

Since the pump shaft 134 (the small diameter portion 134*d*) becomes out of the engagement with the motor shaft 124 because of the one way clutch 140, the refrigerant pump 130 is not operated in this mode.

Expansion Mode

In the expansion mode, the high pressure super heated refrigerant heated by the heating device 43 is supplied into the expansion-compressor device 110 to expand the refrigerant in the expansion device 110, when the cooling operation by the refrigerating cycle 30 is not necessary and when a sufficient waste heat can be obtained from the engine 10 (when the temperature of the engine cooling water is sufficiently high). The movable scroll 113 is rotated by the expansion of the refrigerant to obtain a driving force (mechanical energy) for rotating the motor shaft 124. The rotor 123 of the motor generator 120 is rotated by thus obtained driving force, to generate the electric power, and to charge the generated electric power into the battery 13.

More specifically, the ON-OFF valve 44 is closed by the control unit (not shown) and the engine cooling water is circulated by the three way valve 21 to flow into the heating device 43. The motor generator 120 is operated as the electric power generator (rotation in the reversed direction) and the electromagnetic valve 117h is opened to open the inlet port 116 by the valve body 117d.

In this operation, the pump shaft 134 (the small diameter portion 134d) of the refrigerant pump 130 is brought into the engagement with the motor shaft 124 through the one way clutch 140, so that the refrigerant pump 130 is driven to rotate. The high pressure super heated refrigerant heated by the heating device 43 is supplied into the working chamber V through the high pressure port 111c, the high pressure chamber 114, and the inlet port 116, so that the refrigerant is expanded in the working chamber V. The movable scroll 113 is rotated by the expansion of the refrigerant in the reversed direction opposite to that in the compression mode, the rotational driving force applied to the shaft 118 is transmitted to the motor shaft 124 and the rotor 123 of the motor generator 120. When the driving force transmitted to the motor shaft 124 becomes higher than a driving force necessary for the refrigerant pump 130, the motor generator starts to rotate as the electric power generator. And the obtained electric power is charged into the battery 13 through the inverter 12.

The refrigerant, the pressure of which is decreased as a result of the expansion, flows out from the low pressure port 121a. The refrigerant flowing out from the low pressure port 121a is circulated in the Rankine cycle 40, which comprises the second bypass passage 42, the check valve 42a, the condenser 31, the gas-liquid separator 32, the first bypass passage 41, the check valve 41a, the refrigerant pump 130, the heating device 43 and the expansion-compressor device 110 (the high pressure port 111c). The refrigerant pump 130 supplies the liquid-phase refrigerant from the gas-liquid separator 32 to the heating device 43, wherein the refrigerant is pressurized to such a pressure corresponding to the temperature of the superheated vaporized refrigerant produced at the heating device 43.

As above, according to the complex fluid machine of the present invention, the operation of the compression mode can be performed at the expansion-compressor device 110 by the motor generator 120, irrespectively whether there is expansion energy in the refrigerant. In this compression mode, since the refrigerant pump 130 is disconnected from the motor generator 120 by the operation of the one way clutch 140, the refrigerant pump 130 is prevented from acting as a resistance against the operation of the motor generator 120.

Furthermore, the expansion-compressor device 110 has both functions of the compressor device (110) and the expansion device (110), and thereby the expansion device (110) is not acting as a resistance against the operation of the motor generator 120 when the compressor device (110) is operated by the motor generator 120 in the compression mode.

Furthermore, in the case that the sufficient expansion energy can be obtained from the refrigerant and the operation of the compressor device (110) is not necessary, the refrigerant pump 130 can be rotated by the rotational driving force generated by the expansion device (110) at its expansion mode, so that any specific device for driving the refrigerant pump 130 is not required. And the motor generator 120 is operated as the electric power generator to collect the expansion energy as the electrical energy. In this operation, the alternator 11 may not be necessarily operated for generating the electric power, so that the driving force for the alternator can be reduced to thereby improve a fuel consumption ratio.

Furthermore, the refrigerant pump 130 is arranged at one axial end of the complex fluid machine 100, and the one way clutch 140 is provided between the refrigerant pump 130 and the adjacent device (the motor generator 120). The one way clutch 140 can be easily arranged without a complicated shaft structure in the fluid machine 100, irrespectively of the arrangement of the expansion-compressor device 110 and the motor generator 120.

Furthermore, since the shaft seal member 150 is provided at the pump shaft 134, in order to prevent a leakage of the refrigerant through a gap between the motor generator 120 and the refrigerant pump 130, the shaft seal member 150 is prevented from acting as resistance against the operation of the motor generator 120 when the refrigerant pump 130 is disconnected from the motor generator 120 by the one way clutch 140.

Energy loss at the shaft seal member 150, when the refrigerant pump 130 is operated by the motor generator 120, is in proportion to a tightening force of the shaft seal member 150 to the pump shaft 134 and a rotational speed of a contacting portion of the pump shaft 134 contacting with the shaft seal member 150. The shaft seal member 150 is provided at the small diameter portion (the contacting portion) 134d of the pump shaft 134, to reduce the rotational speed at the outer periphery of the contacting portion and to reduce the energy loss.

Figure 3:
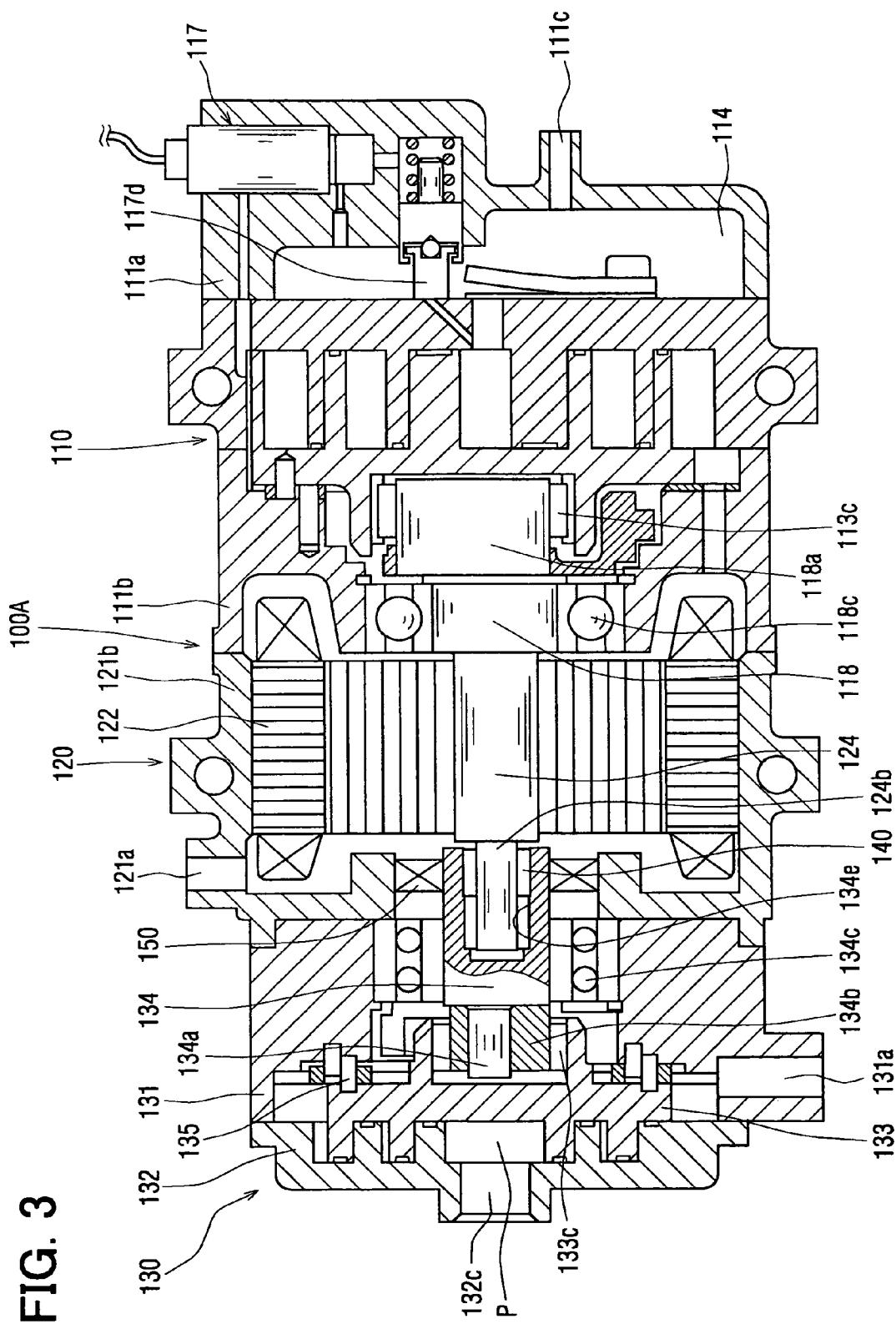
FIG. 3 is a schematic cross sectional view showing a modification of the complex fluid machine of the first embodiment.

A modification of the complex fluid machine 100 is shown in FIG. 3. The same reference numerals in FIG. 3 designate the same or substantially same portions to the structure of the complex fluid machine shown in FIG. 1. Various portions are explained hereinafter with reference to FIG. 3.

The motor housing 120 of FIG. 1 is divided into two parts, one of which is a motor housing 121b and a shaft housing 111b.

A left hand end of the motor shaft 124 is formed with a small diameter portion 124b, whereas a right hand end of the pump shaft 134 is formed with a hole 134e, wherein the small diameter portion 124b is inserted into the hole 134e. The one way clutch 140 is provided between the small diameter portion 124b and the pump shaft 134, so that the pump shaft 134 is operatively disconnected from the motor shaft 124 when the motor generator 120 is operated as the electric motor and the motor shaft 124 is rotated in the forward direction, whereas the pump shaft 134 is operatively connected with the motor shaft 124 when the motor generator 120 is operated as the electric power generator and the motor shaft 124 is rotated in the reversed direction.

The forward end of the valve body 117d is formed as a plane surface, as shown in FIG. 3, which is perpendicular to an axial line of its movement. However, the plane surface can be formed, so that it is inclined with respect to the axial line in order to increase a seal performance at the inlet port 116 when it is closed by the valve body 117d.

According to the complex fluid machine 100 of the first embodiment (including the above modification), the expansion-compressor device 110, the motor generator 120 and the refrigerant pump 130 are arranged in series, so that the refrigerant pump 130 can be driven by the rotational driving force produced at the expansion-compressor device 110 when it is operated as the expansion device. Accordingly, any specific device for driving the refrigerant pump 130 is not required.

Furthermore, the motor generator 120 is arranged in the space, which is communicated with the low pressure side of the expansion-compressor device 110 and in which the low pressure refrigerant flows. Accordingly, the motor generator 120 can be effectively cooled by the refrigerant of a lower temperature flowing through the motor generator 120.

The low pressure side of the refrigerant pump 130 is communicated with the motor generator 120, and the shaft seal member 150 is provided between the motor generator 120 and the refrigerant pump 130. Accordingly, a pressure difference of the refrigerant between the motor generator 120 and the refrigerant pump 130 can be made small, so that the refrigerant is prevented from leaking from the refrigerant pump 130 into the motor generator 120.

Second Embodiment

Figure 4:
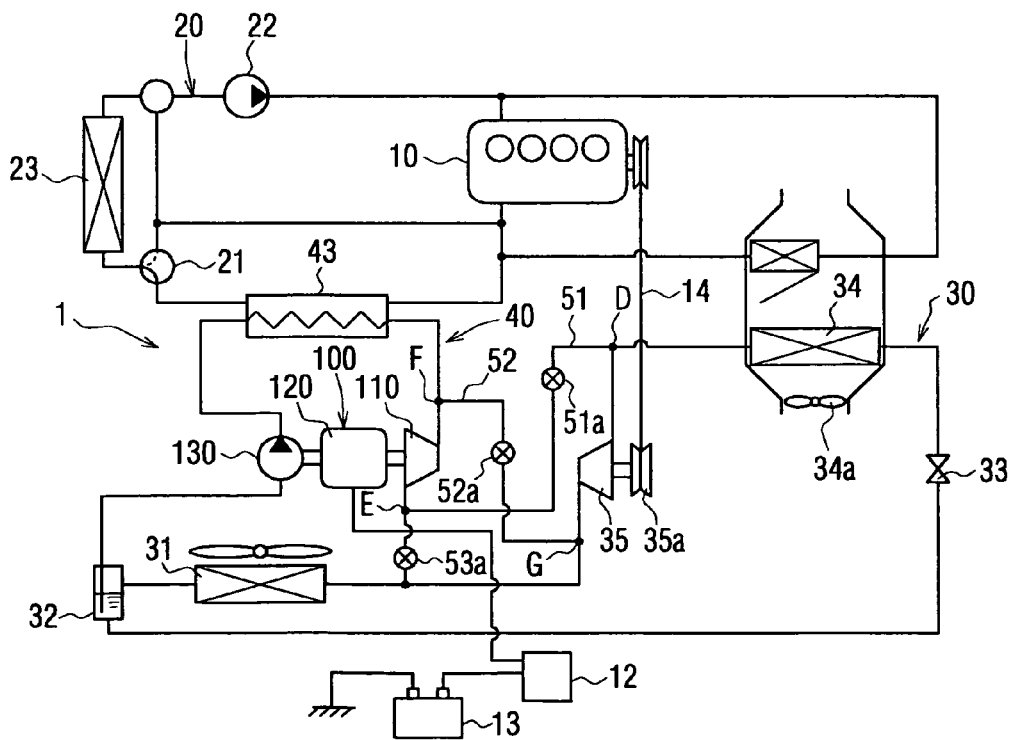
FIG. 4 is a schematic view showing a system structure according to a second embodiment.

A second embodiment is shown in FIG. 4, which differs from the first embodiment in that the air conditioning apparatus 1 is applied to a vehicle (e.g. an idle-stop vehicle, a hybrid vehicle), wherein an operation of the engine 10 is temporally stopped depending on a driving condition of the vehicle (such as, an idling operation, a low speed driving, and so on). The second embodiment further differs from the first embodiment in that a main compressor device 35 is provided in the refrigerating cycle 30, and connecting passages 51, 52 and ON-OFF valves 51a, 52a, 53a are provided.

As described above, the main compressor device 35 is provided in the refrigerant cycle 30, independently from the expansion-compressor device 110. The refrigerant cycle 30 of this embodiment comprises the main compressor device 35, the condenser 31, the gas-liquid separator 32, the evaporator 34, which are connected in a circuit.

The main compressor device 35 is provided with a pulley device 35a having a pulley and an electromagnetic clutch working as a driving force transmitting device. The pulley device 35a is operatively connected with the engine 10 via a driving belt 14. The main compressor device 35 is driven by the driving force of the engine 10, when the electromagnetic clutch of the pulley device 35a is connected, whereas the operation of the main compressor device 35 is stopped when the electromagnetic clutch is disconnected. The electromagnetic clutch is controlled by the control unit (not shown).

The Rankine cycle 40 comprises, as in the same manner to the first embodiment, the refrigerant pump 130, the heating device 43, the expansion-compressor device 110, the condenser 31, and the gas-liquid separator 32, which are connected in a circuit.

A first connecting passage 51 is provided between a refrigerant inlet side (a juncture D) of the main compressor device 35 and a low pressure side (a juncture E) of the expansion-compressor device 110. A second connecting passage 52 is provided between a high pressure side (a juncture F) of the expansion-compressor device 110 and a refrigerant outlet side (a juncture G) of the main compressor device 35.

A first to third ON-OFF valves 51a, 52a and 53a are respectively provided in the first connecting passage 51, the second connecting passage 52, and a passage connecting the condenser 31 with the juncture E. Those ON-OFF valves are electromagnetic valves to be controlled by the control unit (not shown) for opening or closing the respective passages.

A reference numeral 450 designates an air conditioner unit having a unit casing 460, in which the evaporator 34 and a heater core 431 are provided. A numeral 431a is an air mix door for controlling a flow rate of the air cooled down at the evaporator 34 and flowing through the heater core 431, so that temperature of the air blown off into a passenger room of the vehicle is controlled by mixing the cooled down air from the evaporator 34 and the heated air from the heater core 431. A numeral 430 is a heater circuit for passing the engine cooling water (hot water) through the heater core 431. A numeral 23a is a radiator bypass passage, and a numeral 24 is a thermostat for controlling flow rate of the engine cooling water bypassing the radiator 23. An operation of the second embodiment is explained below with reference to FIGS. 5 to 9.

Figure 5:
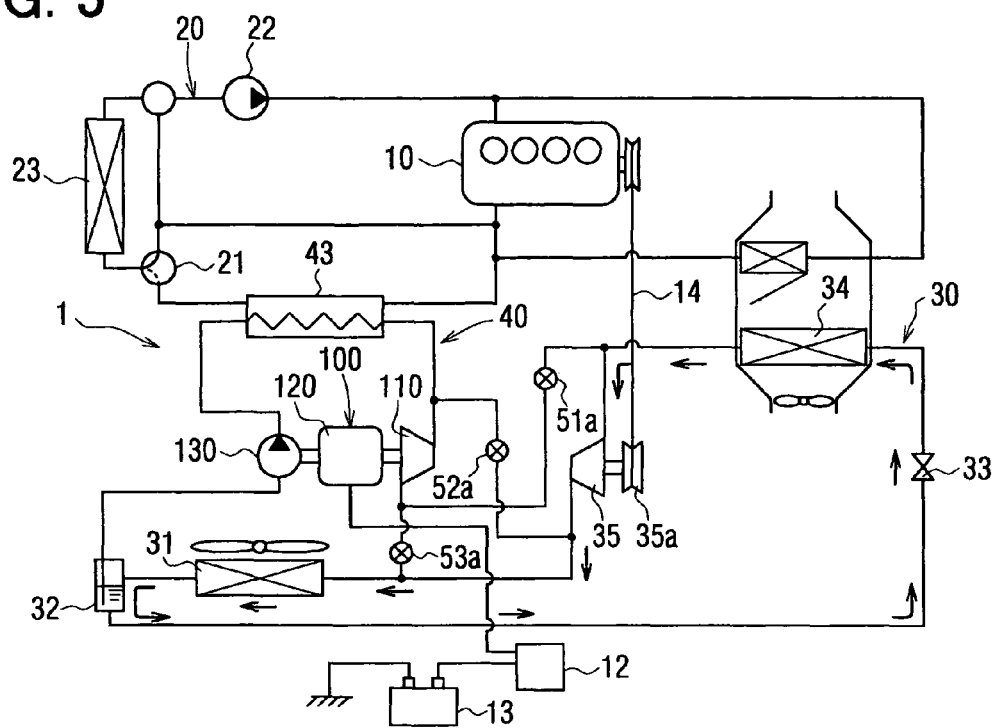
FIGS. 5 to 9 are schematic views showing the system structure according to the second embodiment, in which refrigerant flows in respective operational modes are shown.

Sole Operational Mode of Main Cooling Operation: FIG. 5

In this operational mode, the main compressor device 35 is operated when the cooling operation for the vehicle is required, in the case that sufficient amount of waste heat can not be obtained from the engine 10, for example when the engine 10 is in its warming-up condition, or in the case that the battery 13 is sufficiently charged with the electric power and no further charging of the electric power is necessary.

In this operational mode, the supply of the engine cooling water to the heating device 43 is stopped by the operation of the three way valve 21. All of the ON-OFF valves 51a, 52a and 53a are closed and the electromagnetic clutch of the pulley device 35a for the main compressor device 35 is connected.

Then, the main compressor device 35 is driven by the engine 10 to compress and pump out (discharge) the refrigerant, and the discharged refrigerant is circulated in the refrigerating cycle 30 as indicated by arrows of a solid line in FIG. 5, so that cooling operation is performed by the heat absorbing operation at the evaporator 34. In this operational mode, the operation of the complex fluid machine 100 is stopped.

Figure 6:
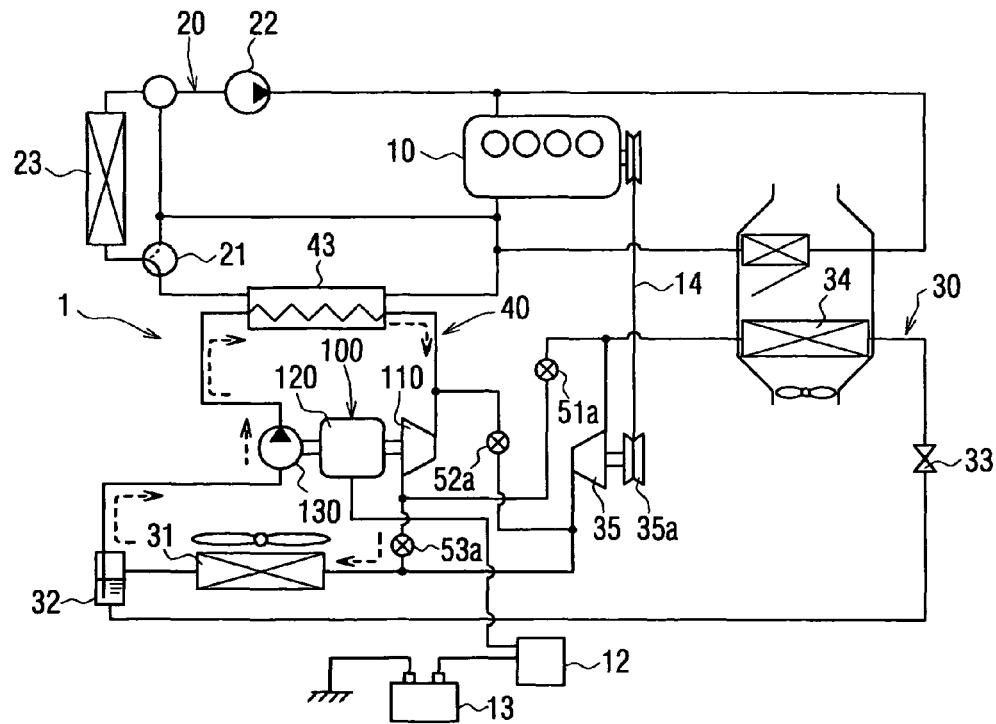

Sole Operational Mode of Rankine Cycle Operation: FIG. 6

In this operational mode, the expansion-compressor device 110 is operated as the expansion device when the cooling operation for the vehicle is not required, in the case that sufficient amount of waste heat can be obtained from the engine 10 during the vehicle is running, and in the case that the charging of the electric power to the battery 13 is necessary. This operational mode corresponds to the expansion mode of the first embodiment.

The engine cooling water is allowed to be supplied to the heating device 43 due to the operation of the three way valve 21. The first and second ON-OFF valves 51a and 52a are closed, whereas the third ON-OFF valve 53a is opened. The electromagnetic clutch of the pulley device 35a for the main compressor device 35 is disconnected. The motor generator 120 is operated as the electric power generator (rotated in the reversed direction), and the electromagnetic valve 117h (FIG. 1) of the expansion-compressor device 110 is opened.

Then, the refrigerant pump 130 is operated, the rotational driving force is generated at the expansion-compressor device 110 by the expansion of the superheated refrigerant from the heating device 43, and the motor generator 120 is driven by the rotational driving force. When the driving force generated at the expansion-compressor device 110 becomes higher than the driving force necessary for the refrigerant pump 130, the motor generator 120 starts to rotate as the electric power generator. And the obtained electric power is charged into the battery 13 through the inverter 12. The refrigerant discharged from the expansion-compressor device 110 is circulated in the Rankine cycle 40, as indicated by arrows of a dotted line in FIG. 6. In this operational mode, the operation of the main compressor device 35 is stopped.

Figure 7:
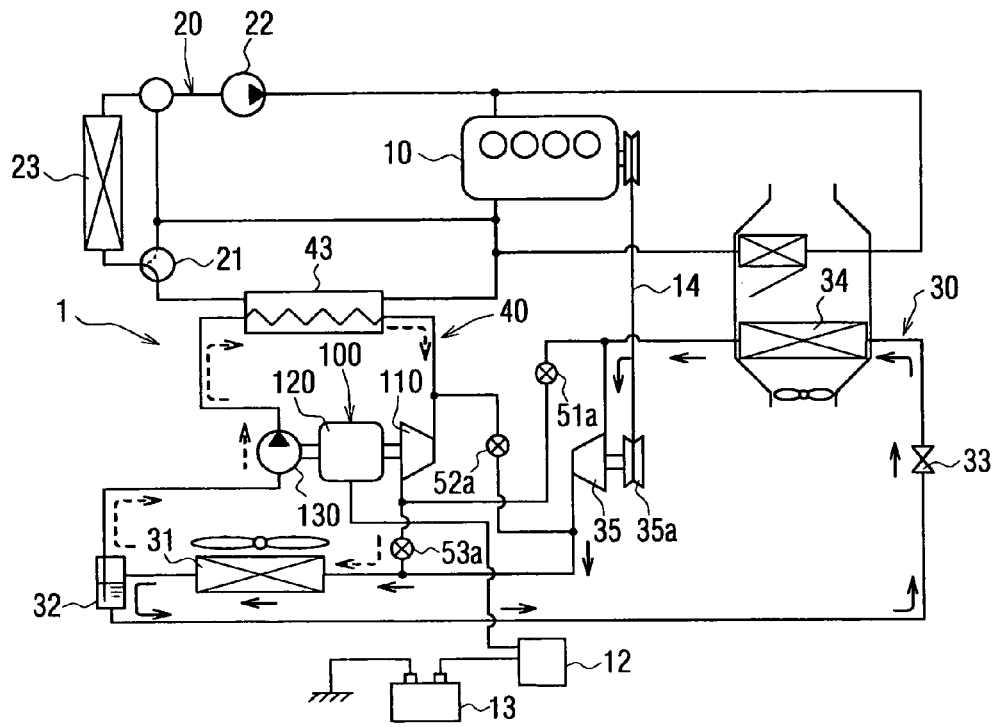

Bilateral Operational Mode of Main Cooling & Rankine Cycle Operation: FIG. 7

In this operational mode, the main compressor device 35 is further operated in addition to the above sole operational mode of the Rankine cycle, when the cooling operation for the vehicle is required, in the case that sufficient amount of waste heat can be obtained from the engine 10 during the vehicle is running, and in the case that the charging of the electric power to the battery 13 is necessary.

The engine cooling water is allowed to be supplied to the heating device 43 due to the operation of the three way valve 21. The first and second ON-OFF valves 51a and 52a are closed, whereas the third ON-OFF valve 53a is opened. The motor generator 120 is operated as the electric power generator (rotated in the reversed direction), and the electromagnetic valve 117h (FIG. 1) of the expansion-compressor device 110 is opened. And the electromagnetic clutch of the pulley device 35a for the main compressor device 35 is connected.

An operation is carried out in the Rankine cycle 40, as in the same manner to that of the above sole operational mode of the Rankine cycle, so that the electric power is generated at the motor generator 120 by the driving force produced at the expansion-compressor device 110. The refrigerant is circulated as indicated by arrows of the dotted line in FIG. 7.

An operation is further carried out in the refrigerating cycle 30, as in the same manner to that of the above sole operational mode of the main compressor device 35, so that the main compressor device 35 is driven by the engine 10 and the cooling operation is performed by the heat absorbing operation at the evaporator 34. The refrigerant is circulated as indicated by arrows of the solid line in FIG. 7.

Figure 8:
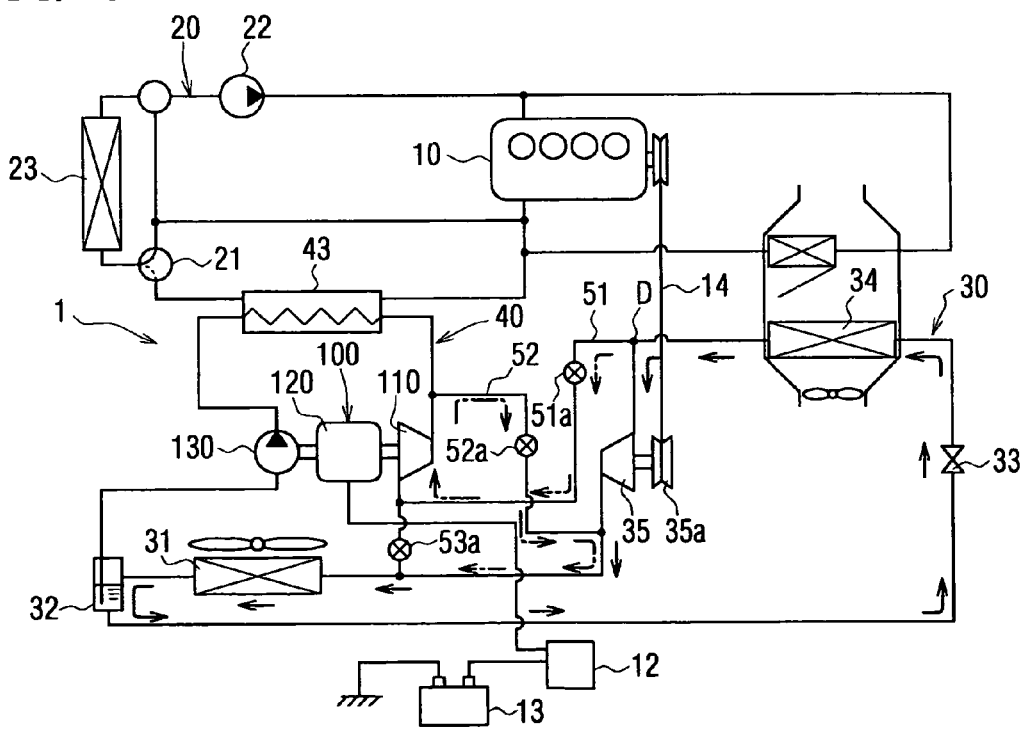

Assisting Operational Mode for Main Cooling Operation: FIG. 8

In this operational mode, the expansion-compressor device 110 is operated as the compressor device, in addition to the operation of the main compressor device 35, when a large cooling capacity is required for quickly cooling down the inside space of the vehicle in the case that the vehicle has been parked under the brazing sun in summer.

In this operational mode, the supply of the engine cooling water to the heating device 43 is stopped by the operation of the three way valve 21. The first and second ON-OFF valves 51a and 52a are opened, whereas the third ON-OFF valve 53a is closed. The electromagnetic valve 117h (FIG. 1) of the expansion-compressor device 110 is closed, and the electric power is supplied to the stator 122 of the motor generator 120 so that it is operated as the electric motor (the rotation in the forward direction). The electromagnetic clutch of the pulley device 35a for the main compressor device 35 is connected.

Then, the main compressor device 35 is driven by the engine 10 to compress and pump out (discharge) the refrigerant, and the discharged refrigerant is circulated in the refrigerating cycle as indicated by arrows of the solid line in FIG. 8. The expansion-compressor device 110 is operated by the motor generator 120 in the compression mode, so that a part of the refrigerant circulating in the refrigerating cycle 30 flows into the expansion-compressor device 110 from the inlet side (the juncture D) of the main compressor device 35 through the first connecting passage 51 and the first ON-OFF valve 51a, the refrigerant is compressed by and pumped out (discharged) from the compressor device (110), and the refrigerant flows into the condenser 31 through the second connecting passage 52 and the second ON-OFF valve 52a. The refrigerant is circulated as indicated by arrows of a one-dot-chain line in FIG. 8.

As above, a larger amount of the refrigerant is compressed and discharged from the main compressor device 35 and the expansion-compressor device 110, which are arranged in parallel to each other in the refrigerating cycle 30, so that flow amount of the refrigerant flowing through the evaporator 34 and the condenser 31 is increased, to thereby increase the cooling capacity at the evaporator 34. In this operational mode, the refrigerant pump 130 is disconnected from the motor generator 120 due to the one way clutch 140, and the operation of the refrigerant pump 130 is stopped.

Figure 9:
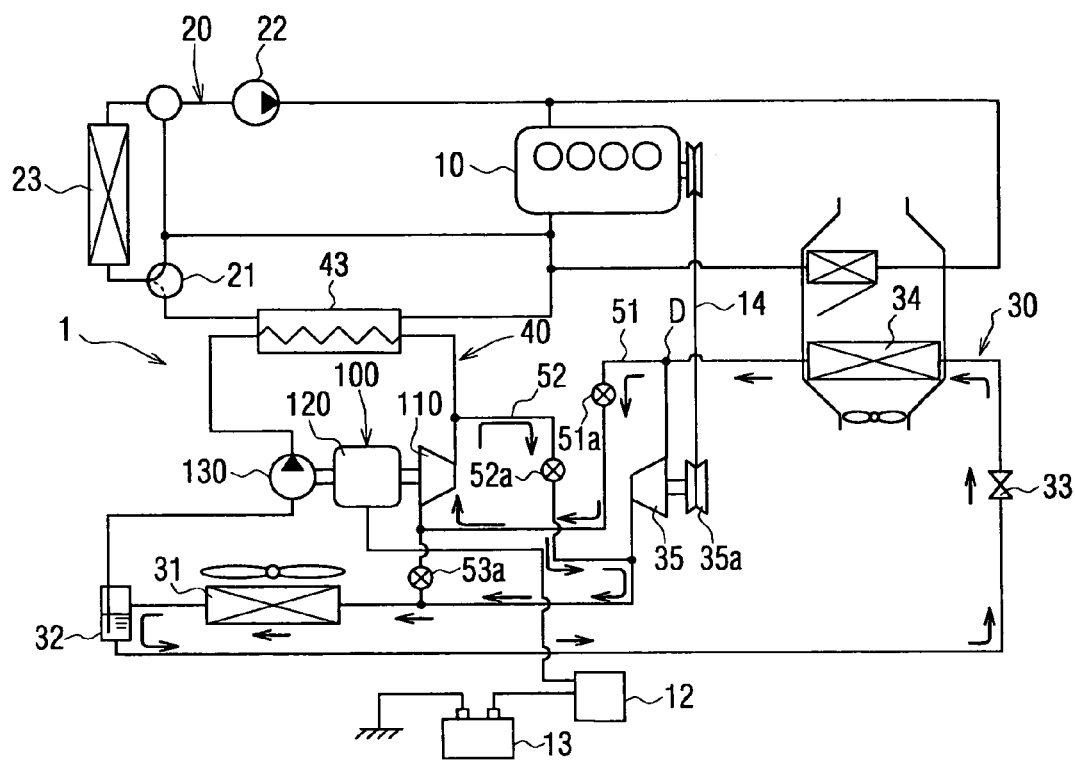

Sole Operational Mode of Sub-Cooling Operation: FIG. 9

In this operational mode, the expansion-compressor device 110 is operated as the compressor device, in place of the main compressor device 35, when the cooling operation is required, even in the case that the engine operation is stopped. This operational mode corresponds to the compression mode of the first embodiment.

In this operational mode, the supply of the engine cooling water to the heating device 43 is stopped by the operation of the three way valve 21. The first and second ON-OFF valves 51a and 52a are opened, whereas the third ON-OFF valve 53a is closed. The electromagnetic valve 117h (FIG. 1) of the expansion-compressor device 110 is closed, and the electric power is supplied to the stator 122 of the motor generator 120 so that it is operated as the electric motor (the rotation in the forward direction).

In this operation, the operation of the main compressor device 35 is stopped together with the operation stop of the engine 10. The expansion-compressor device 110 is operated by the motor generator 120 as the compressor device. The refrigerant from the evaporator 34 is circulated through the first connecting passage 51, the first ON-OFF valve 51a, the expansion-compressor device 110, the second connecting passage 52, the second ON-OFF valve 52a, the condenser 31, the gas-liquid separator 32, the depressurizing device 33, and the evaporator 34, wherein the refrigerant circuit in which the refrigerant flows is formed as the refrigerating cycle. In this operational mode, the refrigerant pump 130 is disconnected from the motor generator 120 due to the one way clutch 140, and the operation of the refrigerant pump 130 is stopped.

As above, according to the second embodiment, the main compressor device 35 driven by the engine 10 is provided in the refrigerating cycle 30, and the connecting passages 51 and 52 as well as the first to third ON-OFF valves 51a, 52a and 53a are provided between the refrigerating cycle 30 and the Rankine cycle 40. As a result, the cooling operation and the electric power generating operation can be independently or simultaneously performed, during the engine 10 is operated, depending on the various operational conditions, such as the condition of the waste heat from the engine 10, the requirement for the cooling operation, the requirement for the electric power generation, and so on.

Furthermore, the cooling capacity can be increased when a higher cooling capacity is required, because the expansion-compressor device 110 can be operated as the compressor device in addition to the main compressor device 35, wherein the expansion-compressor device 110 and the main compressor device 35 are arranged in parallel to each other for the refrigerating cycle.

Furthermore, the continuous cooling operation can be achieved even when the engine operation is stopped, since the expansion-compressor device 110 can be operated as the compressor device in place of the main compressor device 35, when the engine operation is stopped.

In the above first and second embodiments, the one way clutch 140 can be replaced by an electromagnetic valve, which is controlled by an electrical signal from the electronic control unit (not shown).

According such an arrangement, the amount of the refrigerant circulating in the Rankine cycle 40 can be controlled by ON-OFF of the electromagnetic valve, namely ON and OFF for the operation of the refrigerant pump 130, during the fluid machine 100 is operated as the expansion device.

The expansion-compressor device 110 in the above embodiments is formed as a fluid machine commonly having both functions of the compressor device and the expansion device. However, the compressor device and the expansion device can be independently formed.

A rotary type, piston type, vane type, or any other type fluid machine can be used as the expansion-compressor device 110, or independently as the compressor device and the expansion device.

In the above embodiments, the expansion-compressor device 110, the motor generator 120 and the refrigerant pump 130 are arranged in this order. However, the order for arranging the above three devices is not limited to those shown in the drawings.

The internal combustion engine 10 is explained as the heat generating device in the above embodiments. Any other devices or apparatuses can be used as the heat generating device 10, such as an external combustion engine, fuel cell stacks, motors, inverters and so on, which generate heat during their operation and throw away (radiate) the heat (as waste heat) for the purpose of controlling temperatures of their own devices or apparatuses.

Third Embodiment

A third embodiment is shown in FIGS. 10 to 13, which differs from the first and second embodiments in the following points.

At first, the different points in the structure of a fluid machine 100B are explained with reference to FIG. 10.

The refrigerant pump 130 of the first embodiment is removed from the fluid machine 100B of the third embodiment. The axial end of the motor shaft 124 is rotationally supported by a bearing 141 fixed to the motor housing 121.

Figure 11:
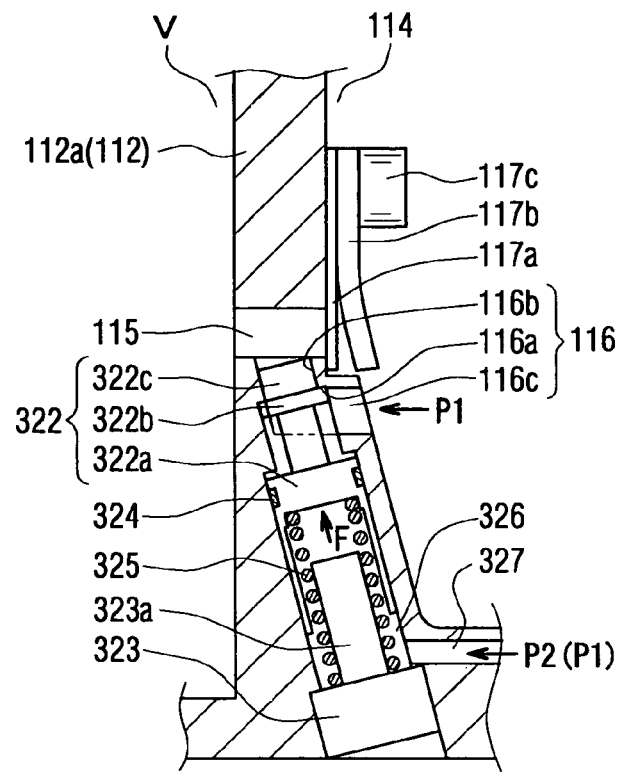
FIGS. 11 and 12 are enlarged cross sectional views showing a valve device of the fluid machine according to the third embodiment.

The inlet port 116 is communicated with the working chamber V at its one end. And at its other end, the inlet port 116 is opened to the high pressure chamber 114 at a portion adjacent to the discharge port 115, wherein a passage area of the inlet port 116 is designed to be large enough not to generate a pressure loss for the refrigerant when the superheated vaporized refrigerant flows into the working chamber V through the inlet port 116. As shown in FIG. 11, the inlet port 116 is formed in the base plate 112a of the fixed scroll 112 and formed into an L-shape. The inlet port 116 is bent at an intermediate portion thereof, and a sealing portion 116a, at which a check valve portion 322b of a spool 322 is operatively contacted, is formed at the intermediate portion. A passage portion 116b of the inlet port 116 between the sealing portion 116a and the one end of the inlet port 116 at the discharge port 115 is referred to as a working chamber side passage, whereas a passage portion 116c of the inlet port 116 between the sealing portion 116a and the other end of the inlet port 116 is referred to as a high pressure side passage. The working chamber side passage 116b is formed in the base plate 112a as to be inclined with respect to the discharge port 115.

A discharge port valve device comprises the discharge valve 117a, the stopper 117b and the bolt 117c, the structure of which is the same to the first embodiment.

An inlet port valve device 300 comprises a spool type valve body 322, which has a sliding portion 322a, the check valve portion 322b, and a projected portion 322c. The sliding portion 322a is a main body portion of the valve body 322 and is formed into a cylindrical shape at its backward end, so that a cylindrical space is formed. An outer diameter of the sliding portion 322a is made larger than that of the other portions of the valve body 322 (the check valve portion 322b and the projected portion 322c). The check valve portion 322b is formed at a position adjacent to a forward end of the valve body 322, and formed into a circular flanged shape. The projected portion 322c is formed at the forward end of the valve body 322 and formed into a cylindrical shape, an outer diameter of which is made smaller than that of the check valve portion 322b. A cubic volume of the projected portion 322c is made to be almost equal to that of the working chamber side passage 116b. The sliding portion 322a, the check valve portion 322b, and the projected portion 322c are coaxially arranged.

A cylindrical space is formed in the base plate 112a of the fixed scroll 112, being coaxial with the working chamber side passage 116b. An outside end of the cylindrical space is opened to the outside of the fluid machine 100B. A sealing element 324 is disposed at an outer peripheral portion of the sliding portion 322a. The valve body 322 is slidably arranged in the cylindrical space, in such a manner that the projected portion 322c faces to the working chamber side passage 116b. The outside end of the cylindrical space is closed by a plug member 323, and a space defined by the sliding portion 322a and the plug member 323 is formed as a back pressure chamber 326. A cylindrical guide portion 323a extending toward the sliding portion 322a is formed at the plug member 323, wherein an outer diameter of the guide portion 323a is made smaller than that of the plug member 323. In a condition, in which the check valve portion 322a is brought into contact with the sealing portion 116a, a gap is formed between the sliding portion 322a and the plug member 323, so that the valve body 322 can be axially moved.

The high pressure side passage 116c is positioned at a forward end side of the sliding portion 322a, so that the high pressure P1 of the refrigerant in the high pressure chamber 114 is always applied to the forward end side of the sliding portion 322a. A gas port 327 is formed in the base plate 112a, for communicating the back pressure chamber 326 with a pressure control chamber 117j (FIG. 10), so that the pressure P2 of the refrigerant in the pressure control chamber 117j is applied to the back pressure chamber 326, namely to a backward side of the sliding portion 322a.

A spring 325 is arranged between the sliding portion 322a and the plug member 323, being guided by the cylindrical guide portion 323a. A biasing force F is thereby applied to the valve body 322 in a valve closing direction, so that the check valve portion 322b is brought into contact with the sealing portion 116a to close the inlet port 116. The biasing force F is designed to be such a value, at which the valve body 322 is not moved toward the plug member 323 (in a valve opening direction), even when a high pressure is generated in the working chamber V during the compression mode of the expansion-compressor device 110 and such high pressure is applied to the projected portion 322c of the valve body 322 through the discharge port 115.

An axial length and an outer diameter of the projected portion 322c is so designed that the cubic volume of the projected portion 322c becomes almost equal to the cubic volume of the working chamber side passage 116b. More specifically, the axial length of the projected portion 322c is so designed that the projected portion 322c is completely pulled out from the working chamber side passage 116b, when the valve body 322 is moved in the valve opening direction. And the projected portion 322c is separated from the sealing portion 116a to form a circular flow passage between the projected portion 322c and the sealing portion 116a, wherein the circular flow passage has a flow area which allows that a necessary amount of the refrigerant can flow through the circular flow passage. As above, a movable range of the valve body 322 is designed in such a manner that the projected portion 322c is accommodated in the working chamber side passage 116b when the valve body is moved in the valve closing direction, whereas the projected portion 322c is completely pulled out from the working chamber side passage 116b and separated from the sealing portion 116a, to form the gap (the circular flow passage) when the valve body 322 is moved in the valve opening direction.

Figure 10:
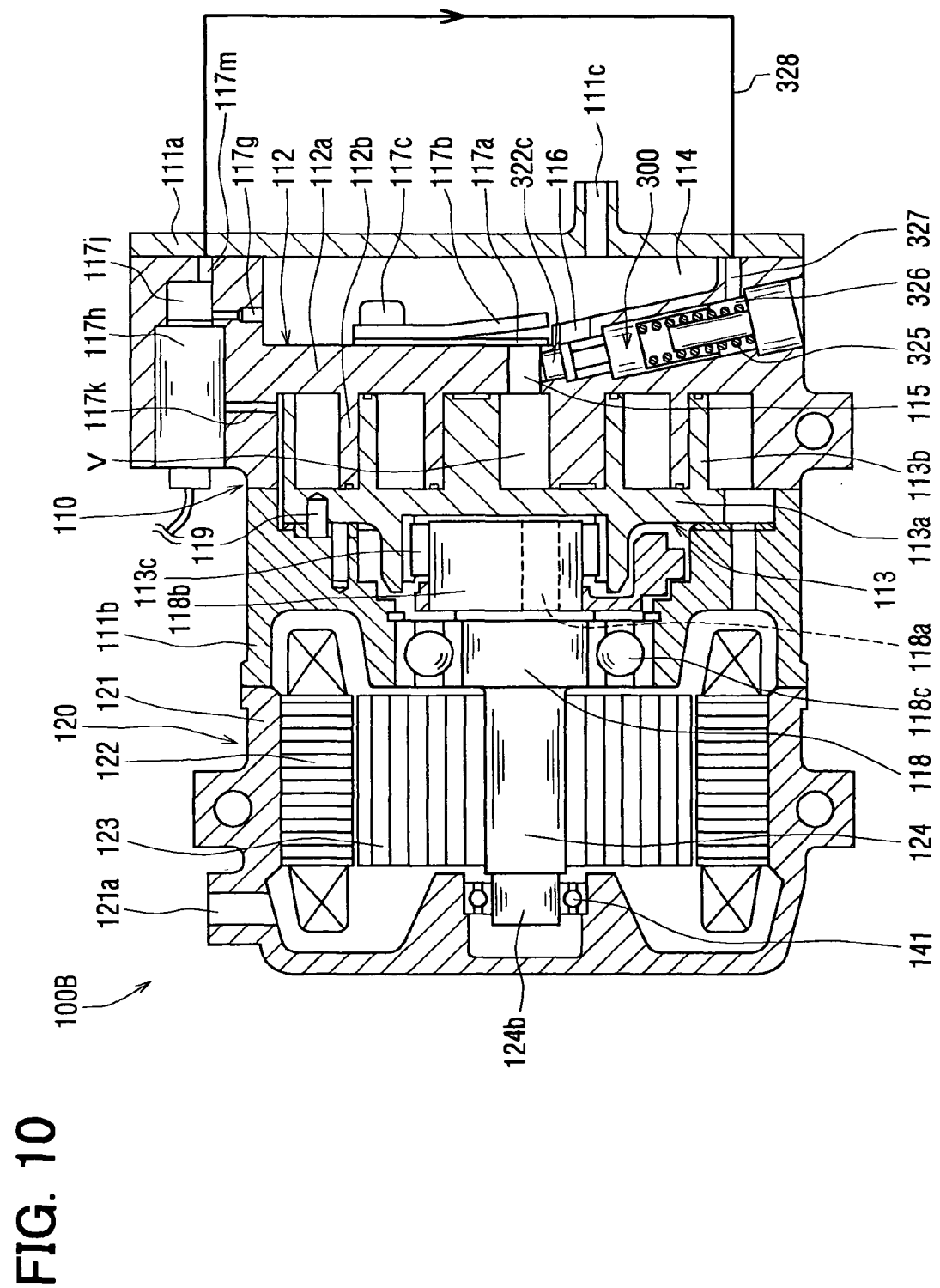
FIG. 10 is a schematic cross sectional view showing a complex fluid machine according to a third embodiment of the present invention.

As shown in FIG. 10, the orifice 117g is formed in the base plate 112a for communicating the high pressure chamber 114 with the pressure control chamber 117j, which is defined by a hole formed in the base plate 112a and the electromagnetic valve 117h, as in the same manner to the first embodiment. The orifice 117g has a certain flow resistance. A communication port 117k is formed in the base plate 112a, so that the pressure control chamber 117j is operatively communicated with the low pressure side of the expansion-compressor device 110. Another gas port 117m is also formed in the base plate 112a, which is communicated with the gas port 327 of the back pressure chamber 326 via a communication passage 328. The pressure of the refrigerant in the pressure control chamber 117j is controlled by the electromagnetic valve 117h, so that the pressure P2 of the control pressure chamber 117j is applied to the back pressure chamber 326.

More specifically, when the electromagnetic valve 117h is closed, the communication port 117k is closed and the pressure control chamber 117j is communicated with high pressure chamber 114 through the orifice 117g, so that the pressure in the pressure control chamber 117j is controlled at the high pressure P1 of the high pressure chamber 114. Then, the high pressure P1 is applied to the back pressure chamber 326 through the communication passage 328, and thereby the high pressure P1 is applied to both of the forward end side and the backward end side of the sliding portion 322a. The valve body 322 is moved in the valve closing direction (in an upward direction of FIG. 11) by the spring force F of the spring 325, the check valve portion 322b is brought into contact with the sealing portion 116a, and the inlet port 116 is closed. The pressure loss at the orifice 117g is extremely high, and thereby the flow amount of the refrigerant from the high pressure chamber 114 into the back pressure chamber 326 is negligible small.

On the other hand, when the electromagnetic valve 117h is opened, the communication port 117k is opened, so that the high pressure in the back pressure chamber 326 is released to the low pressure side (to the low pressure port 121a) of the expansion-compressor device 110 through the communication passage 328, the pressure control chamber 117j, and the communication port 117k. As a result, the lower pressure P2 (lower than the pressure P1) is applied to the back pressure chamber 326. A pressure difference $\Delta P$ (P1−P2) is generated at the sliding portion 322a. When an acting force (acting force=$\Delta P \times$cross-sectional area of the sliding portion 322a) obtained by the pressure difference becomes larger than the spring force F, the valve body 322 is moved in the backward direction (the valve opening direction is a downward direction of FIG. 11), the check valve portion 322b is separated from the sealing portion 116a, to open the inlet port 116. As above, the valve body 322, the back pressure chamber 326, the spring 325, the communication passage 328, the orifice 117g, the electromagnetic valve 117h, and so on form an electrical switching valve of a pilot type, to open and close the inlet port 116.

Figure 12:
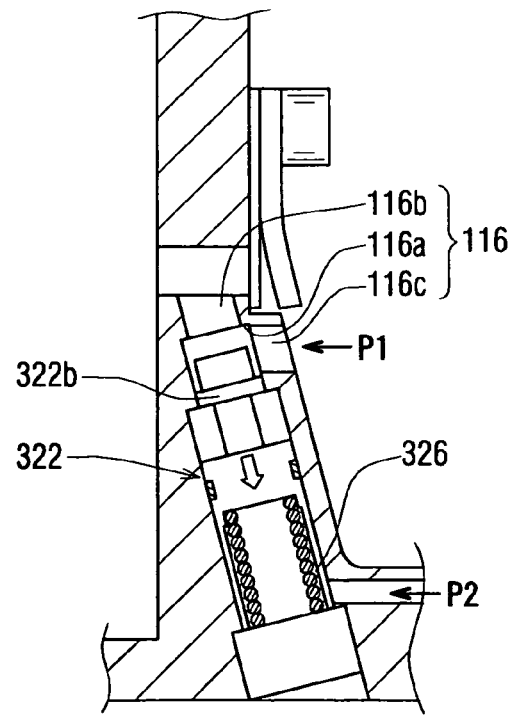

When the valve body 322 is moved in the backward direction, the inlet port 116 is sufficiently opened. The backward end of the sliding portion 322a is brought into contact with the plug member 323, and thereby the downward movement of the valve body 322 is restricted, as shown in FIG. 12. As described above, the cross sectional area of the sliding portion 322a is designed that the acting force (acting force=$\Delta P \times$the cross-sectional area of the sliding portion 322a) becomes larger than the spring force F.

Figure 13:
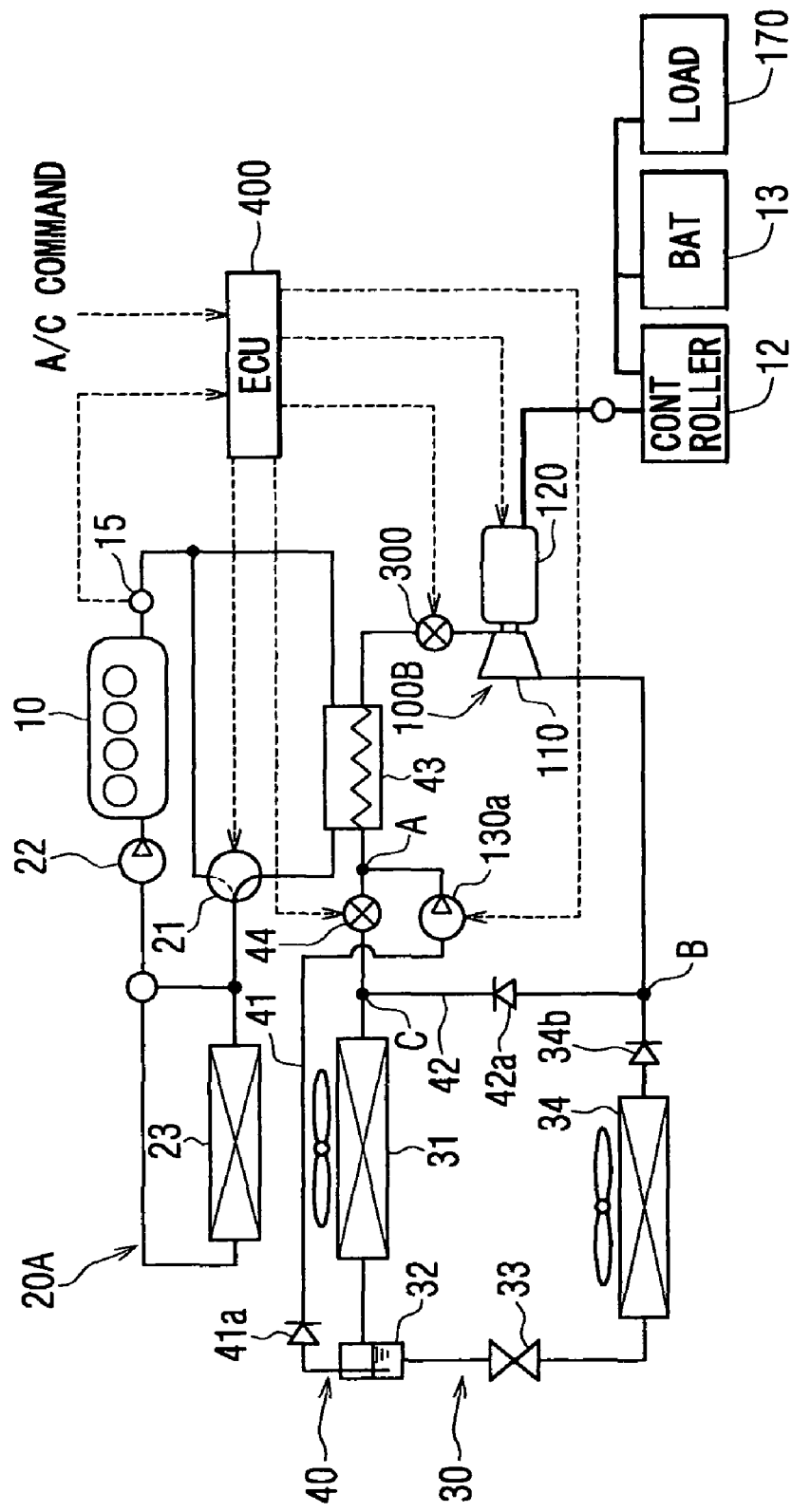
FIG. 13 is a schematic view showing a system structure according to the third embodiment, in which the fluid machine of FIG. 10 is applied.

The fluid machine 100B of the above structure (FIG. 10) is used in the refrigerating cycle 30 and the Rankine cycle 40 shown in FIG. 13.

Points of FIG. 13 (the third embodiment) different from FIG. 2 (the first embodiment) are explained below.

Figure 2:
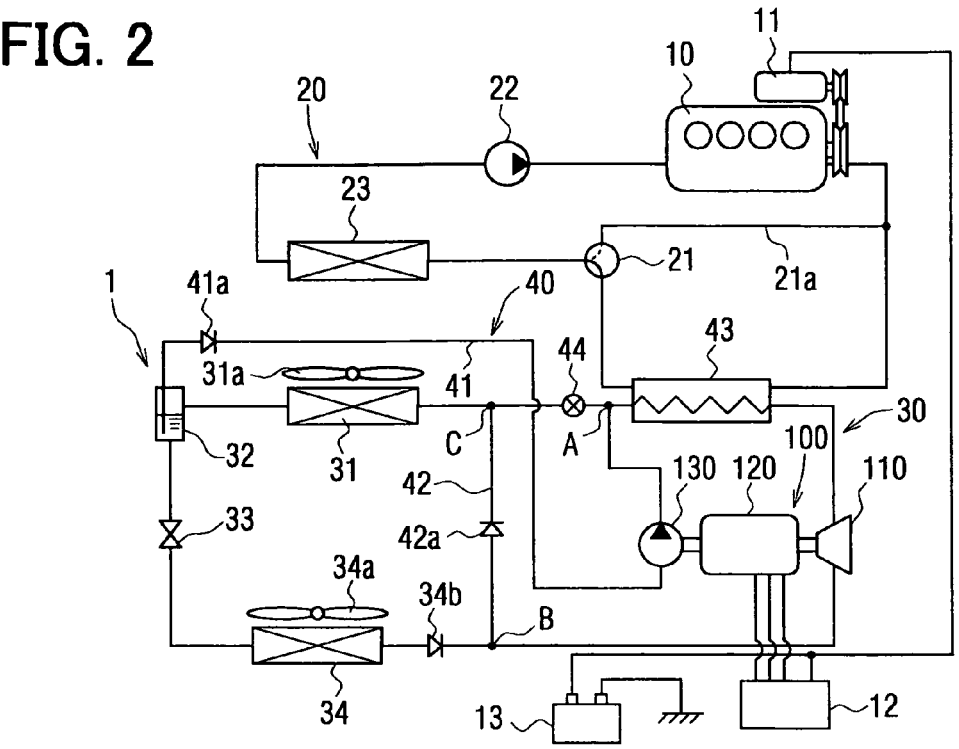
FIG. 2 is a schematic view showing a system structure according to the first embodiment.

In the first embodiment, the refrigerant pump 130, which is integrally formed into the fluid machine 100, is arranged in the refrigerant passage from the gas-liquid separator 32 to the juncture A (FIG. 2). As described above, however, the refrigerant pump is not provided in the fluid machine 100B of the third embodiment (FIG. 10), and an independent liquid pump 130a is instead provided, in place of the refrigerant pump 130, in the refrigerant passage from the gas-liquid separator 32 to the juncture A.

A numeral 300 designates a valve device for provided in the refrigerant passage between the heating device 43 and the expansion-compressor device 110. The valve device 300 comprises the valve body 322, the back pressure chamber 326, the spring 325, the electromagnetic valve 117h and so on, as described above, with reference to FIG. 10.

A numeral 15 designates a temperature sensor for detecting the temperature of the engine cooling water.

A numeral 400 designates an electronic control unit (ECU) for controlling the three way valve 21, the inlet port valve device 300 and so on depending on a command signal for the air conditioning operation (A/C command signal) and the temperature signal from the temperature sensor 15, and so on.

A numeral 170 designates electrical loads, such as head lights, engine accessories.

The other structure of the refrigerating cycle 30 and the Rankine cycle 40, in which the same reference numerals to the first embodiment are used for the same or substantially same components and parts, is basically identical to the first embodiment.

The operation and effects of the fluid machine 100B of the third embodiment are explained below.

Compression Mode

The compression mode is the operational mode to be performed when the cooling operation is commanded by a vehicle passenger.

The operation of the compression mode is the same to that of the first embodiment. Namely, the supply of the hot engine cooling water into the heating device 43 is stopped by the switching operation of the three way valve 21. The electromagnetic valve 117h is closed, so that the inlet port 116 is closed. The electric power is supplied to the motor generator 120 to operate it as the electric motor, so that a rotational driving force of the motor generator is applied to the expansion-compressor device 110 (operating as the compressor device). The refrigerant is sucked by the compressor device 110 through the low pressure port 121a and compressed by the working chamber V to pump out the compressed high pressure refrigerant through the discharge port 115. The discharged refrigerant is circulated in the refrigerating cycle 30, which comprises the high pressure port 111c, the heating device 43, the condenser 31, the gas-liquid separator 32, the depressurizing device 33, the evaporator 34, the check valve 34b, and the low pressure port 121a of the fluid machine 100B.

Expansion Mode

The expansion mode is the operational mode to be performed when the sufficient heat energy can be collected from the engine cooling water, to produce the mechanical energy (the rotational driving force) at the expansion-compressor device 110 in order to rotate the motor generator 120 to generate the electric power. The operation of the expansion mode is the same as that of the first embodiment.

Namely, the supply of the hot engine cooling water into the heating device 43 is started by the switching operation of the three way valve 21, when the temperature of the engine cooling water (detected by the temperature sensor 15) is higher than a predetermined value, and when the cooling operation is not required.

The electromagnetic valve 117*h* is opened, so that the inlet port 116 is opened. The electric power is supplied to the liquid pump 130*a* to start the circulation of the refrigerant in the Rankine cycle 40.

The superheated vaporized refrigerant is supplied from the heating device 43 into the expansion-compressor device 110 (operating as the expansion device) through the opened inlet port 116. The refrigerant is expanded in the working chamber V to generate the rotational driving force, to rotate the rotor 123 so that the electric power is generated at the stator 122. The generated electric power is charged into the battery 13 through the inverter (controller) 12.

The expanded refrigerant of the low pressure is circulated in the Rankine cycle 40, which comprises the low pressure port 121*a*, the second bypass passage 42, the check valve 42*a*, the condenser 31, the gas-liquid separator 32, the first bypass passage 41, the check valve 41*a*, the liquid pump 130*a*, the heating device 43, and the high pressure port 111*c* of the fluid machine 100B.

Effects of the Third Embodiment

According to the above third embodiment, the projected portion 322*c* is formed at the valve body 322, in such a manner that the cubic volume of the projected portion 322*c* is almost equal to the cubic volume of the working chamber side passage 116*b*. The inside space of the working chamber side passage 116*b* is made almost zero, when the expansion-compressor device 110 is operated as the compressor device in the compression mode. Namely, a dead space of the working chamber side passage 116*b* can be made almost zero, to thereby decrease a compression loss of the refrigerant.

According to the above third embodiment, the check valve portion 322*b* and the projected portion 322*c* are coaxially arranged with the sliding portion 322*a*. It is, therefore, easier to manufacture the valve body 322, and becomes unnecessary to position the valve body 322 with respect to a rotational direction around the axial line, when assembling the valve body 322 into the fluid machine 100B.

If the inlet port 116 (the working chamber side passage 116*b*) was formed in the base plate 112*a* in parallel to the discharge port 115 (perpendicular to the base plate 112*a*), wherein the inlet port is opened and closed by the valve body moved in the parallel direction, a longitudinal length of the fluid machine 100B would become longer. On the other hand, if the inlet port 116 (the working chamber side passage 116*b*) was formed in the base plate 112*a* in a direction perpendicular to the discharge port 115, and the valve body 322 is moved in such perpendicular direction, it would become necessary to make a thickness of the base plate 112*a* longer. Then, the discharge port 115 would become correspondingly longer, and thereby a dead space formed by the discharge port 115 would become larger.

According to the above third embodiment, however, the inlet port 116 (the working chamber side passage 116*b*) is formed in the base plate 112*a* to be inclined with respect to the discharge port 115, and the valve body 322 is arranged in the inlet port 116 to move in the same direction to an axial line of the working chamber side passage 116*b*. As a result, the longitudinal length of the fluid machine 100B can be suppressed to a smaller value, and the dead space formed in the discharge port 115 can be made smaller.

Furthermore, according to the above third embodiment, the base plate 112*a* is formed from a thin walled portion (an upper half portion in FIG. 10) and a thick walled portion (a lower half portion in FIG. 10). The discharge port 115 is formed in the thin walled portion, wherein the discharge port 115 is formed at a center of the base plate 112*a* and extends in an axial direction of the expansion-compressor device 110. The working chamber side passage 116*b* and the space for the valve body 322 is formed in the thick walled portion, wherein the working chamber side passage 116*b* and the space for the valve body 322 extend in the radial direction. The inlet port 116 is formed into the L-shape, as already described, and the high pressure side passage 116*c* is formed in the thick walled portion extending in parallel to the discharge port 115 and communicated with the working chamber side passage 116*b*. According to the above structure of the base plate 112*a*, the discharge port 115 as well as the working chamber side passage 116*b* can be formed in the base plate 112*a*, and the valve body 322 can be accommodated in the base plate 112*a*, without making the length of the discharge port 115 unnecessarily longer.

According to the above third embodiment, a circular outer peripheral wall portion is integrally formed with the base plate 112*a*, wherein the wall portion extend from the base plate 112*a* in the longitudinal direction (in the opposite side of the movable scroll 113) of the fluid machine and a front housing plate 111*a* is fixed to the longitudinal end of the wall portion to form the high pressure chamber 114 therein. The space for the valve body 322 and the plug member 323 is formed in the thick walled portion and the circular peripheral wall portion, wherein the space extend in the radial direction through the circular peripheral wall portion. According to such a structure, the fixed scroll 112 can be made smaller.

Furthermore, according to the above third embodiment, the seal element 324 is provided at the outer peripheral surface of the sliding portion 322*a*, the leakage of the refrigerant from the working chamber side passage 116*b* to the back pressure chamber 326 can be prevented. A longitudinal length of the sliding portion 322*a* is made longer than an outer diameter thereof, so that the sliding portion 322*a* can be smoothly moved in the back pressure chamber 326. The spring 325 is guided by the guiding portion 323*a* of the plug member 323, and thereby compression buckling of the spring 325 can be also prevented, when the valve body 322 is moved backwardly (in the valve opening direction).

Modifications of Third Embodiment

Figure 14:
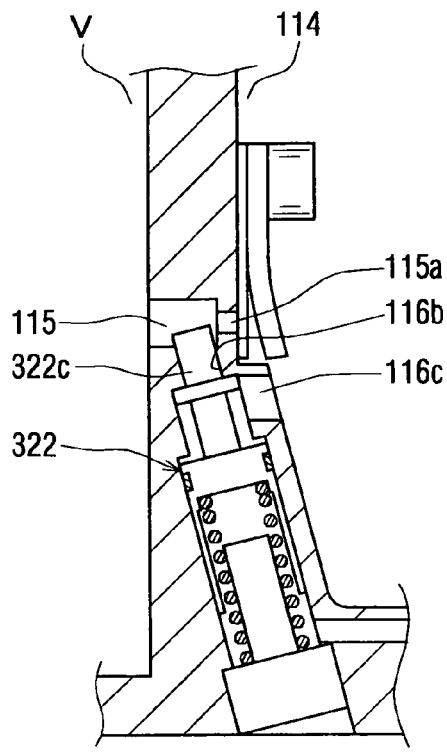
FIGS. 14 to 16 are enlarged cross sectional views respectively showing a valve device of the fluid machine according to modifications of the third embodiment.

A modification of the third embodiment is shown in FIG. 14, in which the projected portion 322*c* is further extended in its longitudinal direction so that its forward end projects into the discharge port 115. Furthermore, an inner diameter of the discharge port 115 on a side to the high pressure chamber 114 is made smaller than that of the other portion of the discharge port. The small diameter portion 115*a* of the discharge port 115 is designed at an optimum value for the flow amount of the refrigerant pumped out from the expansion-compressor device 110.

According to the above modification, the volume of the discharge port 115 for the compression mode can be reduced by the projected portion 322*c*, namely the dead volume of the discharge port 115 can be reduced. The small diameter portion 115*a* substantially functions as the discharge port.

Figure 15:
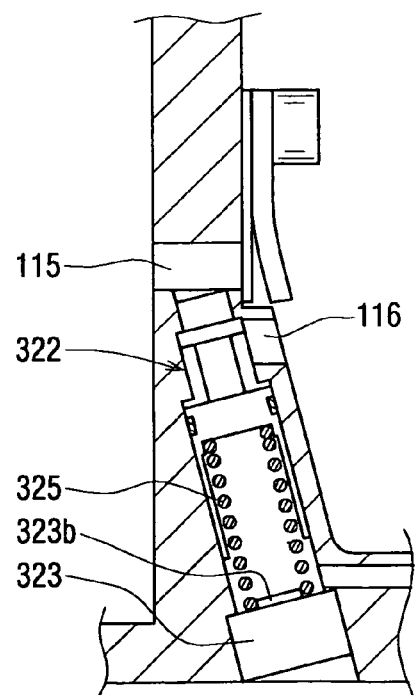

Another modification of the third embodiment is shown in FIG. 15, in which the guide portion 323*a* is eliminated. Instead, a positioning portion 323*b* is provided at the plug member 323, for positioning the spring 125 at its proper position.

Figure 16:
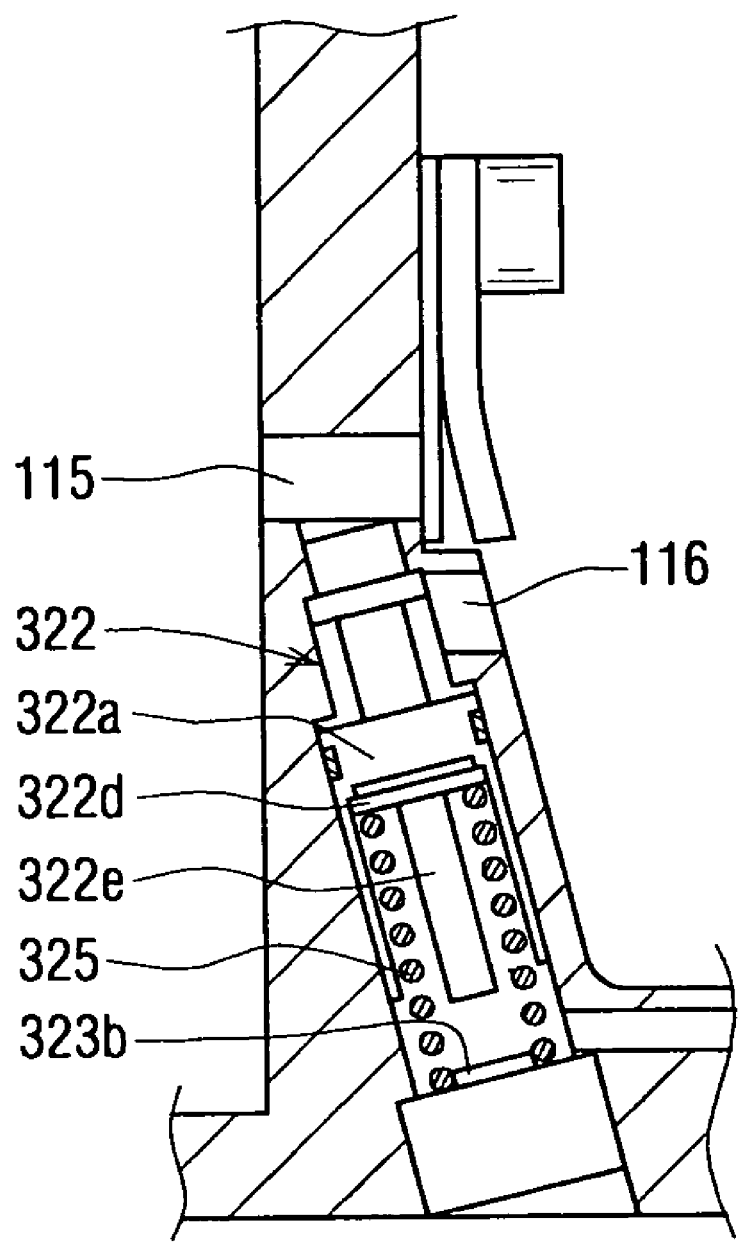

A further modification of the third embodiment is shown in FIG. 16. A sliding plate 322*d* is inserted into a hole of the valve body 322, so that the sliding plate 322*d* is interposed between the spring 325 and a bottom of the hole. In the case that a hardness of material (e.g. aluminum, or aluminum based material) for the valve body 322 is lower than that of a material (e.g. iron, or iron based material) for the spring 325, a material for the sliding plate 322d is selected from materials having a hardness equal to the material of the spring 325, or surface hardening treatment is made on the surface of the sliding plate 322d, for example, by a plating process, so that wear out of the sliding plate 322d due to a sliding movement of the sliding plate 322d with respect to the spring 325 can be prevented. A guiding portion 322e may be provided to the sliding plate 322d, for guiding the spring 325.

The inlet port valve device 300 of the third embodiment can be also used for the fluid machine 100 of the first and second embodiments.

Fourth Embodiment

Figure 17:
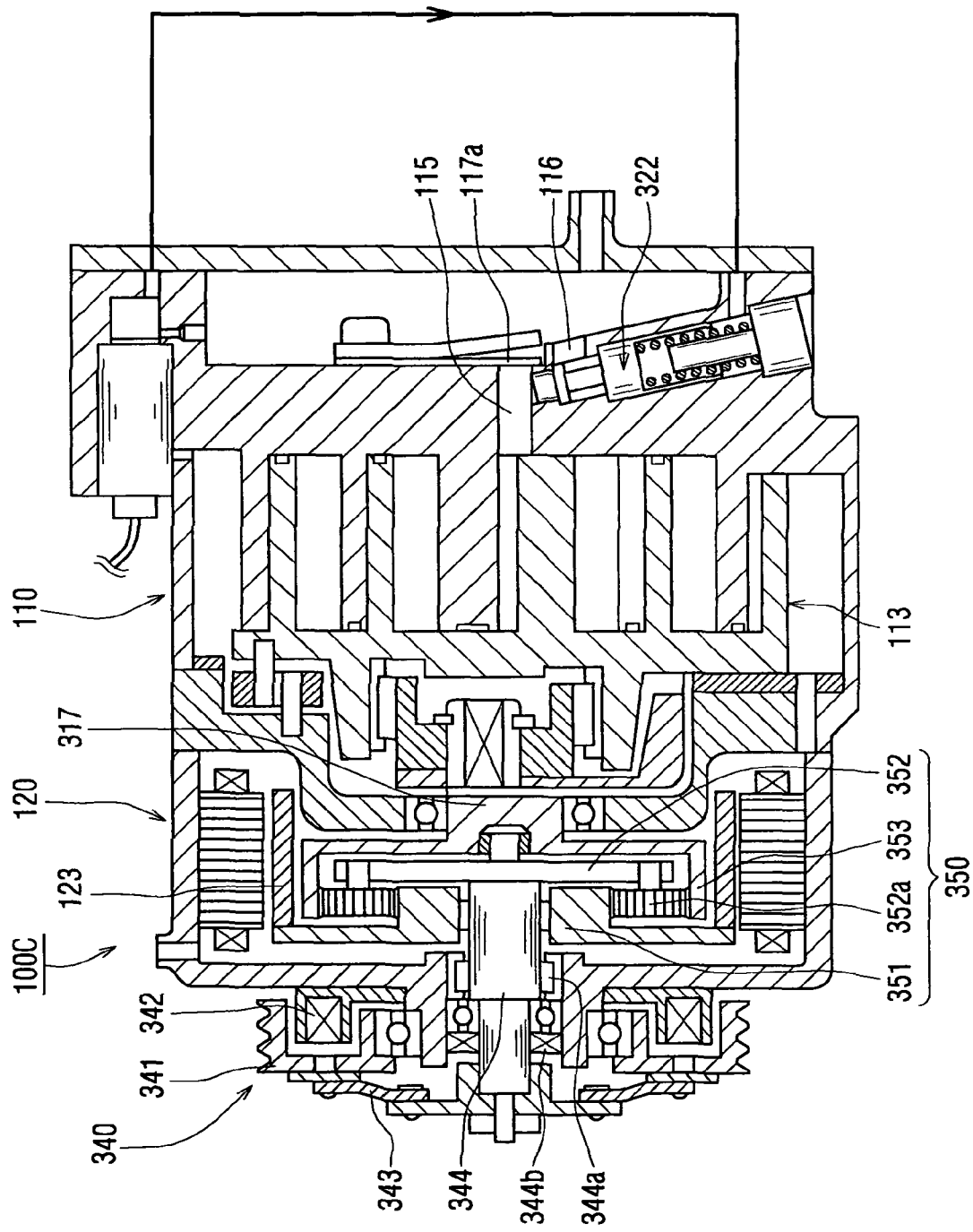
FIG. 17 is a schematic cross sectional view showing a complex fluid machine according to a fourth embodiment of the present invention.

A fourth embodiment (a fluid machine 100C) is shown in FIG. 17, in which an electromagnetic clutch 340 and a power transmitting device 350 are provided to the complex fluid machine 100B of the third embodiment (FIG. 10), and the expansion-compressor device 110, the motor generator 120 and the electromagnetic clutch 340 are operatively connected with the power transmitting device 350.

The electromagnetic clutch 340 comprises a pulley 341 to be rotated by the driving force of the engine 10 via a V-belt (not shown), an excitation coil 342 for generating magnetic field, a friction plate 343 displaced by electromagnetic force of the magnetic field generated by the excitation coil 342 and operatively connected to the pulley 341, a shaft 344 connected to the friction plate 343, and so on. A one way clutch 344a and a rip seal 344b are provided on the shaft 344.

The one way clutch 344a is a clutch for allowing the shaft 344 to rotate only in one direction (a rotational direction of the pulley 341). The rip seal 344b is a sealing element for preventing the refrigerant from leaking from the inside of the fluid machine to the outside of the motor housing 121 through a gap between the shaft 344 and the motor housing 121.

The power transmitting device 350 comprises a sun gear 351 provided at its center, a planetary carrier 352 having multiple pinion gears 352a engaged with the sun gear 351, and a ring gear 353 engaged with the pinion gears 352a, wherein the pinion gears rotate at their own axes and around the sun gear 351. The sun gear 351 is integrally formed with the rotor 123 of the motor generator 120, the planetary carrier 352 is integrally connected to the shaft 344 of the electromagnetic clutch 340, and the ring gear 353 is connected to a shaft 317 for the expansion-compressor device 110.

According to the fourth embodiment, the engine 10 and the motor generator 120 are selectively used as the driving source for the expansion-compressor device 110 during its compression mode, depending on an operational condition of the engine (during its operation or non-operation). Namely, in one case, the expansion-compressor device 110 is connected with the engine 10 through the electromagnetic clutch 340 for transmitting the rotational force to the shaft 317 of the expansion-compressor device 110 from the engine 10. In the other case, the expansion-compressor device 110 is disconnected from the engine 10 by the electromagnetic clutch 340 and the motor generator 120 is operated as the electric motor to generate the rotational force for the expansion compression device 110.

More specifically, the electric power is supplied to the electromagnetic clutch 340 during the engine operation, to connect the electromagnetic clutch 340. And the electric power is also supplied to the motor generator 120 to generate such torque at the rotor 123 as does not rotate the sun gear 351 (i.e. the rotor 123). Then, the rotational driving force transmitted from the engine to the pulley 341 is increased in its rotational speed by the power transmitting device 350 and transmitted to the expansion-compressor device 110, so that it is operated as the compressor device.

The supply of the electric power to the electromagnetic clutch 340 is cut off when the engine operation is stopped (or during the engine operation) to disconnect the expansion-compressor device 110 from the engine 10. And the electric power is supplied to the motor generator 120 to rotate the rotor 123 in a direction opposite to the rotational direction of the pulley 341, so that the expansion-compressor device 110 is operated as the compressor device. In this operation, the shaft 344 (the planetary carrier 352) is not rotated, because the rotation of the shaft 344 in this rotational direction is locked by the one way clutch 344a. As a result, the rotational force generated at the motor generator 120 is decreased in its rotational speed by the power transmitting device 350 and transmitted to the expansion-compressor device 110.

In the case that the expansion-compressor device 110 is operated as the expansion device, the supply of the electric power to the electromagnetic clutch 340 is cut off to disconnect the expansion-compressor device 110 from the engine 10. Then, the movable scroll 113 is rotated by the expansion of the superheated refrigerant in the reversed direction to the direction of the compression mode, and the rotational force of the movable scroll 113 is transmitted to the motor generator 120. In this operation, the rotational force of the movable scroll 113 is increased in its rotational speed by the power transmitting device 350 and transmitted to the motor generator, because the rotation of the shaft 344 in this rotational direction is locked by the one way clutch 344a.

Fifth Embodiment

Figure 18:
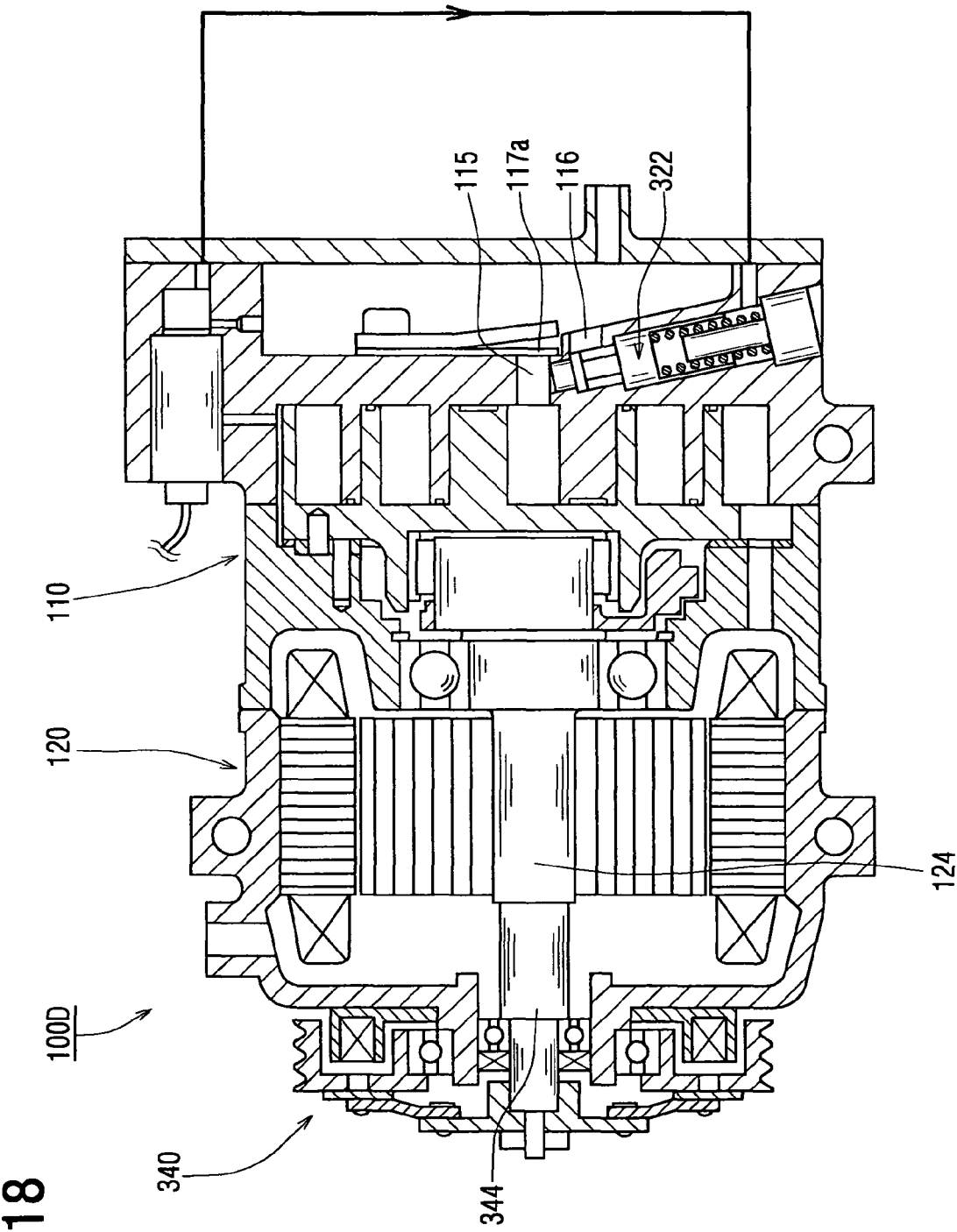
FIG. 18 is a schematic cross sectional view showing a complex fluid machine according to a fifth embodiment of the present invention.

A fifth embodiment (a fluid machine 100D) is shown in FIG. 18, in which the electromagnetic clutch 340 is provided to the fluid machine 100B of the third embodiment (FIG. 10). In this embodiment, the shaft 344 of the electromagnetic clutch 340 is integrally connected to the shaft 124 of the motor generator 120.

According to the fifth embodiment, as in the same manner to the fourth embodiment (FIG. 17), the engine 10 and the motor generator 120 are selectively used as the driving source for the expansion-compressor device 110 during its compression mode, depending on an operational condition of the engine (during its operation or non-operation). In the case that the expansion-compressor device 110 is operated as the expansion device, the supply of the electric power to the electromagnetic clutch 340 is cut off to disconnect the expansion-compressor device 110 from the engine 10. Then, the movable scroll 113 is rotated by the expansion of the superheated refrigerant, and the rotational force of the movable scroll 113 is transmitted to the motor generator 120.

A rotary type, piston type, vane type, or any other type fluid machine can be used as the expansion-compressor device 110, or independently as the compressor device and the expansion device.

In the above embodiments, the energy collected by the expansion-compressor device 110 is charged into the battery 15. The collected energy, however, may be charged as energy of movement by a flywheel, or as other kinetic energy such as elastic potential energy by a spring.

The fluid machine of the above embodiments can be applied not only to the waste heat utilizing apparatus having Rankine cycle for collecting waste heat from the internal combustion engine, but to any other apparatuses for collecting and utilizing the waste heat from any other heat generating devices.

Sixth Embodiment

A sixth embodiment is shown in FIGS. 19 to 24, which differs from the second embodiment (FIGS. 4 to 9) in the following points.

In the above described second embodiment, the fluid machine 100 is used, wherein the fluid machine 100 has the expansion-compressor device 110, the motor generator 120 and the refrigerant pump 130, which are integrally formed into one unit, as shown in FIG. 1.

According to the sixth embodiment, a fluid machine is used, wherein the fluid machine has the expansion-compressor device 110 and the motor generator 120, which are integrally formed into one unit, for example, as shown in FIGS. 10, 17 and 18. And the liquid pump 130a is provided in the Rankine cycle, in place of the refrigerant pump 130.

Figure 19:
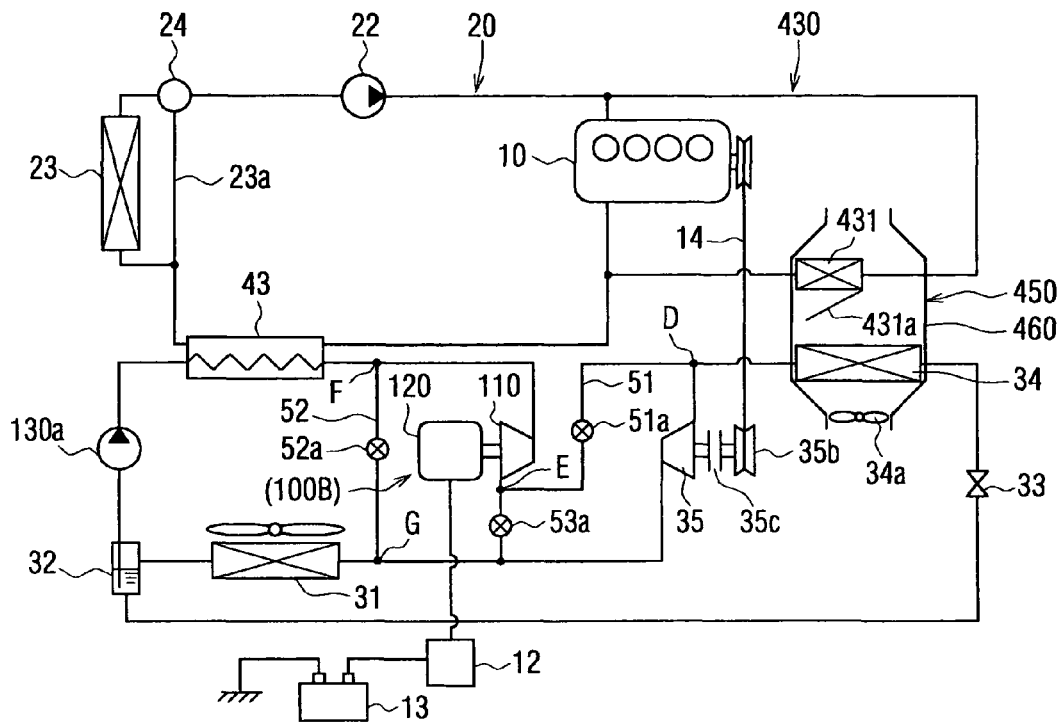
FIG. 19 is a schematic view showing a system structure according to a sixth embodiment.

In FIG. 19, numerals 35b and 35c respectively designate a pulley and an electromagnetic clutch, which correspond to the pulley device 35a of the second embodiment (FIG. 4).

Although the three way valve 21 and the heating device bypass passage 21a are not provided in the sixth embodiment, they can be added to this embodiment.

The other structure of the sixth embodiment is identical to that of the second embodiment (FIG. 4), and its operation is also substantially equal to the second embodiment. The operation is briefly explained with reference to FIGS. 20 to 24.

Figure 20:
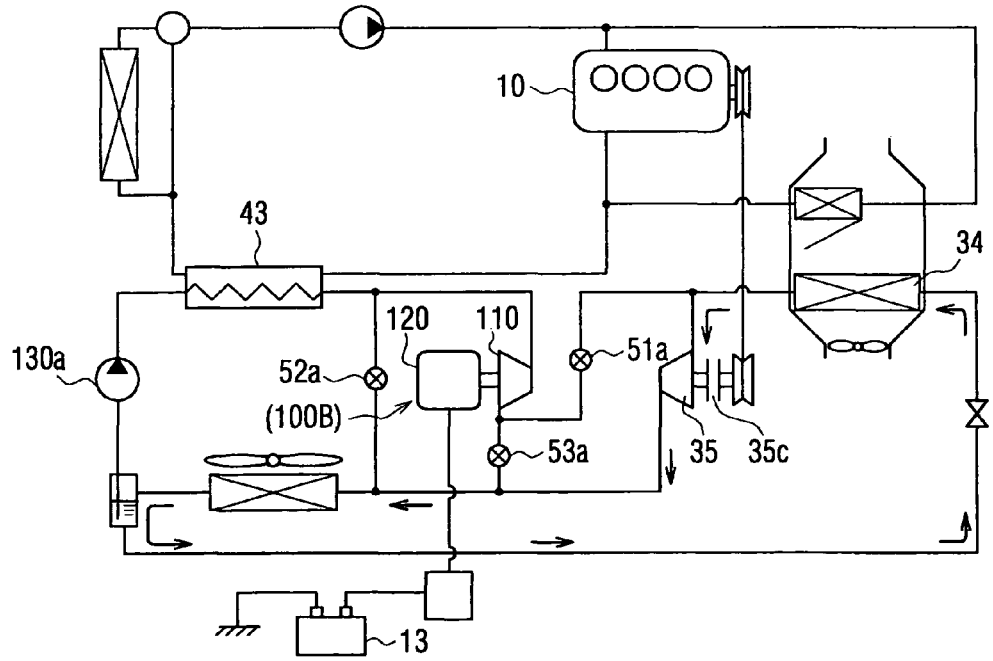
FIGS. 20 to 24 are schematic views showing the system structure according to the above sixth embodiment, in which refrigerant flows in respective operational modes are shown.

Sole Operational Mode of Main Cooling Operation: FIG. 20

In this operational mode, the main compressor device 35 is operated when the cooling operation for the vehicle is required, in the case that sufficient amount of waste heat can not be obtained from the engine 10, for example when the engine 10 is in its warming-up condition, or in the case that the battery 13 is sufficiently charged with the electric power and no further charging of the electric power is necessary.

The main compressor device 35 is connected to the engine 10 via the electromagnetic clutch 35c, and the refrigerant compressed by the main compressor device 35 is circulated in the refrigerating cycle 30, as indicated by arrows of a solid line in FIG. 20.

Figure 21:
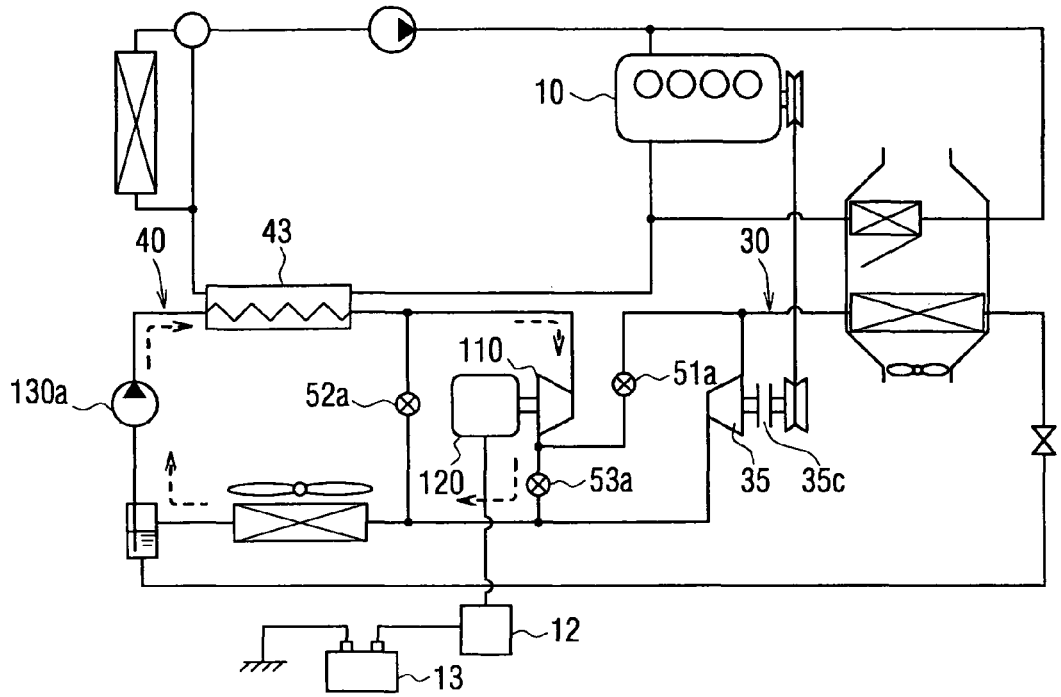

Sole Operational Mode of Rankine Cycle Operation: FIG. 21

In this operational mode, the expansion-compressor device 110 is operated as the expansion device when the cooling operation for the vehicle is not required, in the case that sufficient amount of waste heat can be obtained from the engine 10 during the vehicle is running, and in the case that the charging of the electric power to the battery 13 is necessary.

The main compressor device 35 is disconnected from the engine 10, and the refrigerant heated by the heating device 43 is circulated by the liquid pump 130a in the Rankine cycle 40, as indicated by arrows of a dotted line in FIG. 21.

Figure 22:
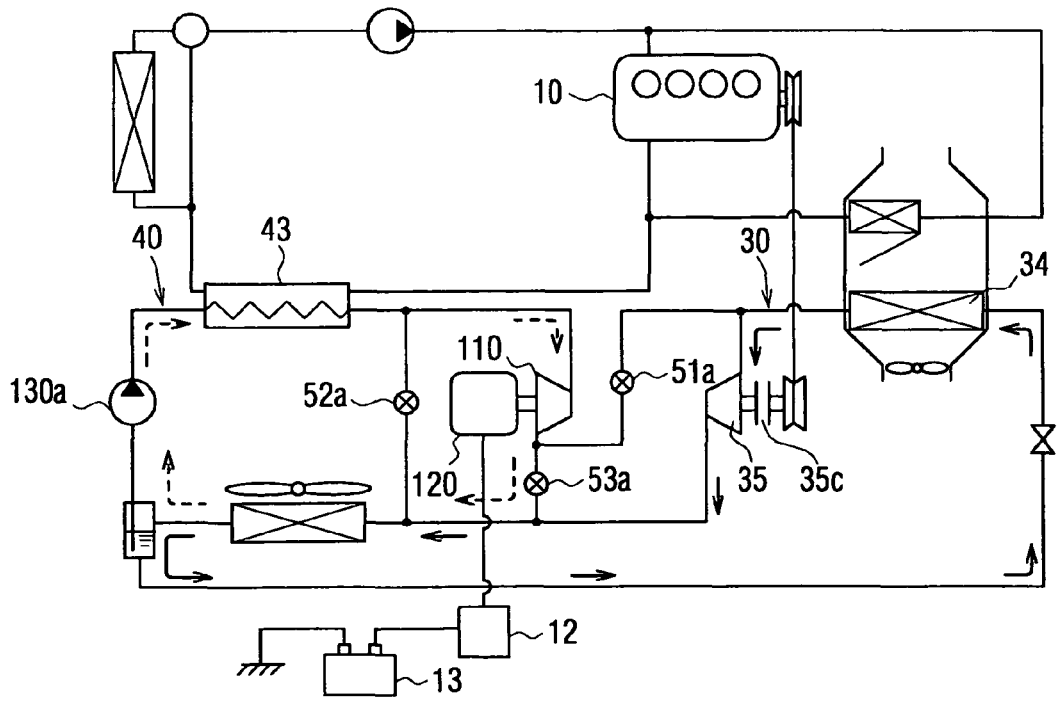

Bilateral Operational Mode of Main Cooling & Rankine Cycle Operation: FIG. 22

In this operational mode, the main compressor device 35 is further operated in addition to the above sole operational mode of the Rankine cycle, when the cooling operation for the vehicle is required, in the case that sufficient amount of waste heat can be obtained from the engine 10 during the vehicle is running, and in the case that the charging of the electric power to the battery 13 is necessary.

The main compressor device 35 is connected to the engine 10 via the electromagnetic clutch 35c, and the refrigerant compressed by the main compressor device 35 is circulated in the refrigerating cycle 30, as indicated by arrows of the solid line in FIG. 22. In addition, the refrigerant heated by the heating device 43 is circulated by the liquid pump 130a in the Rankine cycle 40, as indicated by arrows of the dotted line in FIG. 22.

Figure 23:
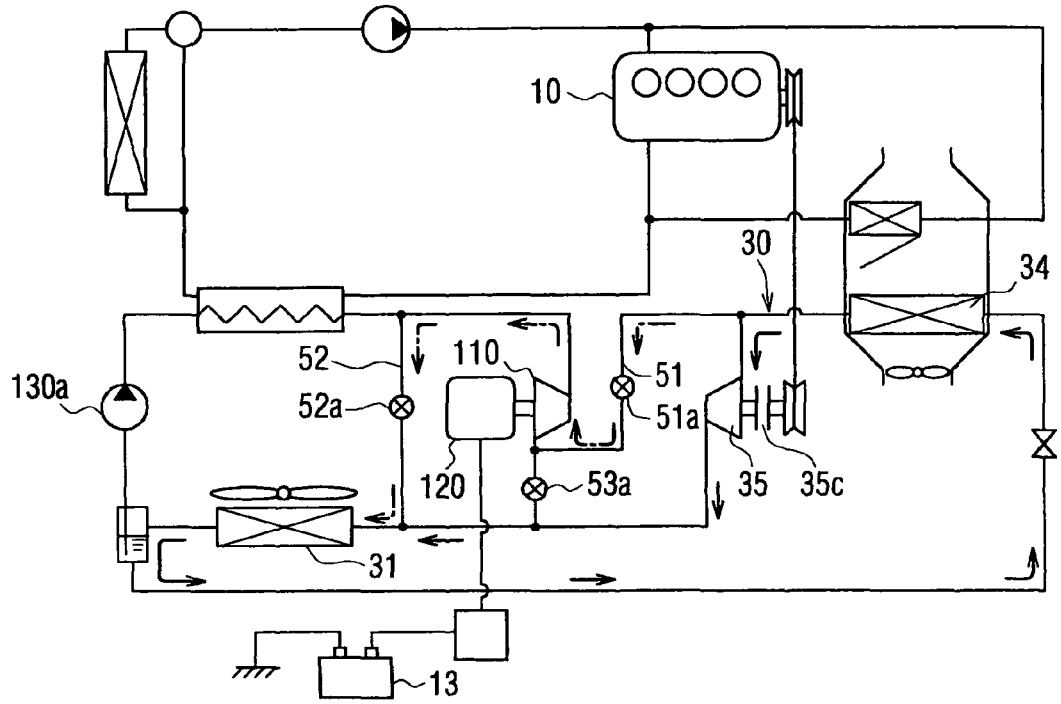

Assisting Operational Mode for Main Cooling Operation: FIG. 23

In this operational mode, the expansion-compressor device 110 is operated as the compressor device, in addition to the operation of the main compressor device 35, when a large cooling capacity is required for quickly cooling down the inside space of the vehicle in the case that the vehicle has been parked under the brazing sun in summer.

The main compressor device 35 is connected to the engine 10 via the electromagnetic clutch 35c, and the refrigerant compressed by the main compressor device 35 is circulated in the refrigerating cycle 30, as indicated by arrows of the solid line in FIG. 23. In addition, the refrigerant compressed by the compressor device 110 is circulated in the refrigerating cycle, as indicated by arrows of a one-dot-chain line in FIG. 23.

Figure 24:
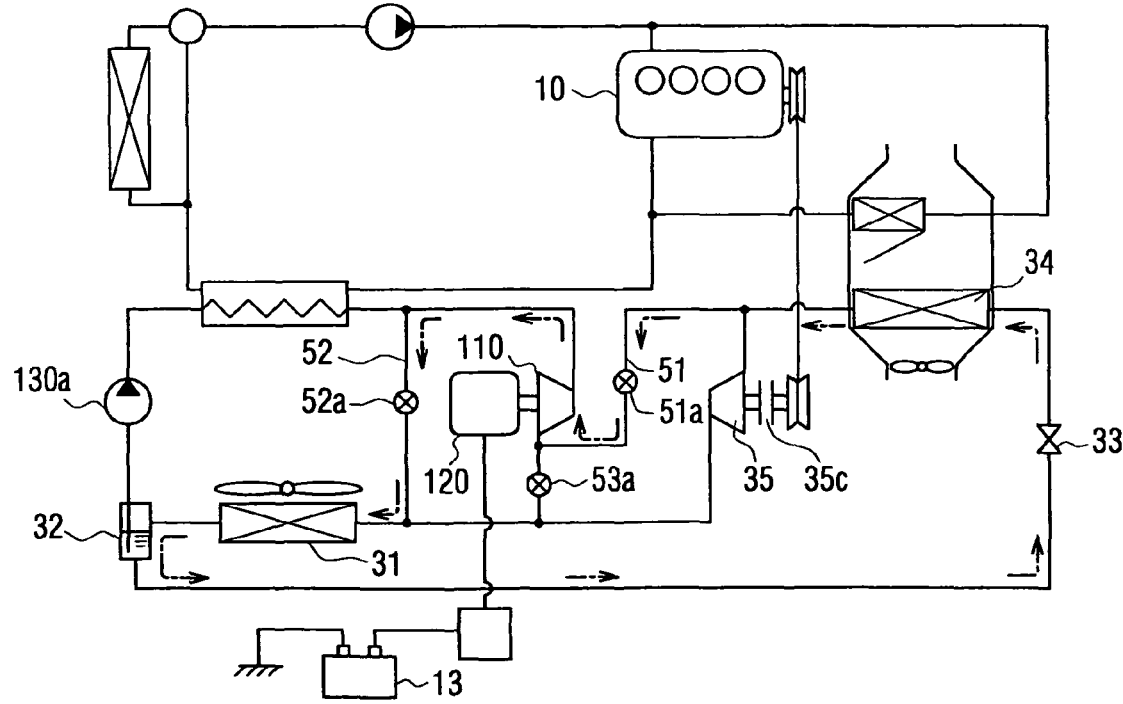

Sole Operational Mode of Sub-Cooling Operation: FIG. 24

In this operational mode, the expansion-compressor device 110 is operated as the compressor device, in place of the main compressor device 35, when the cooling operation is required, even in the case that the engine operation is stopped.

The operation of the main compressor device 35 is stopped due to the stop of the engine operation, whether or not the main compressor device 35 is connected to the engine 10 via the electromagnetic clutch 35c. The refrigerant compressed by the compressor device 110 is circulated in the refrigerating cycle, as indicated by arrows of the one-dot-chain line in FIG. 24.

The fluid machines 100 and 100A to 100D explained for the first to fifth embodiments can be used as the fluid machine for the sixth embodiment.

Seventh Embodiment

Figure 25:
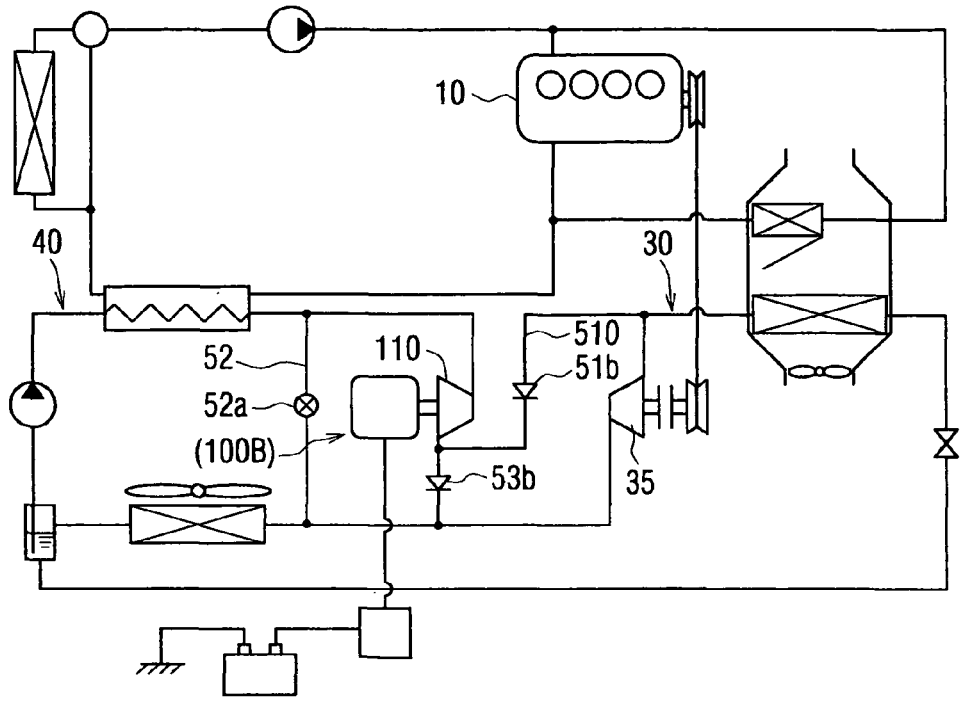
FIG. 25 is a schematic view showing a system structure according to a seventh embodiment.
Figure 26:
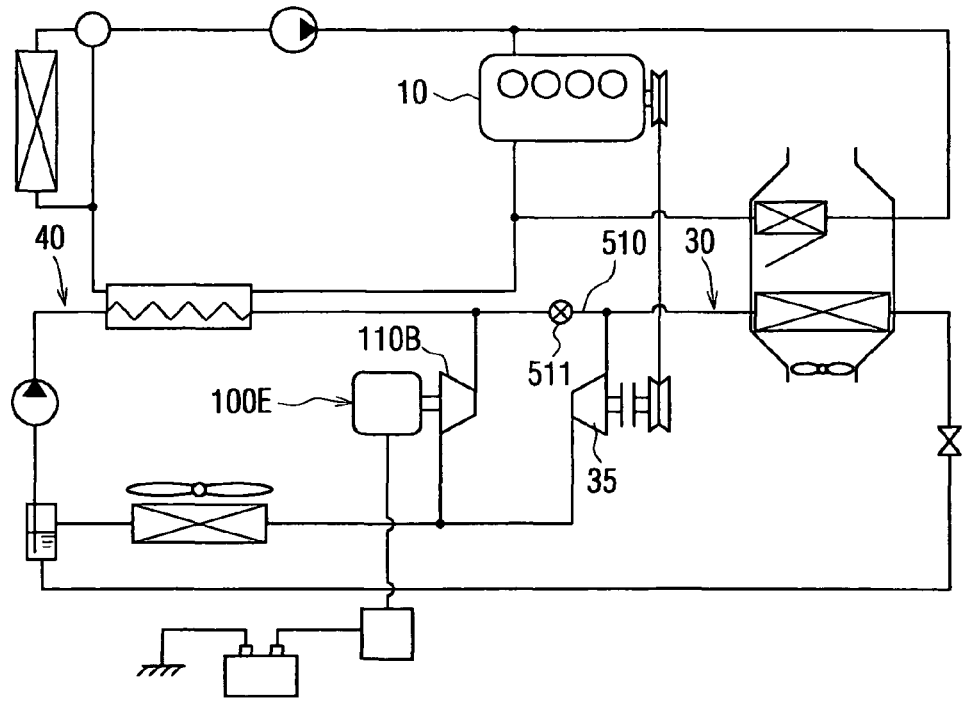
FIG. 26 is a schematic view showing a system structure according to an eighth embodiment.
Figure 27:
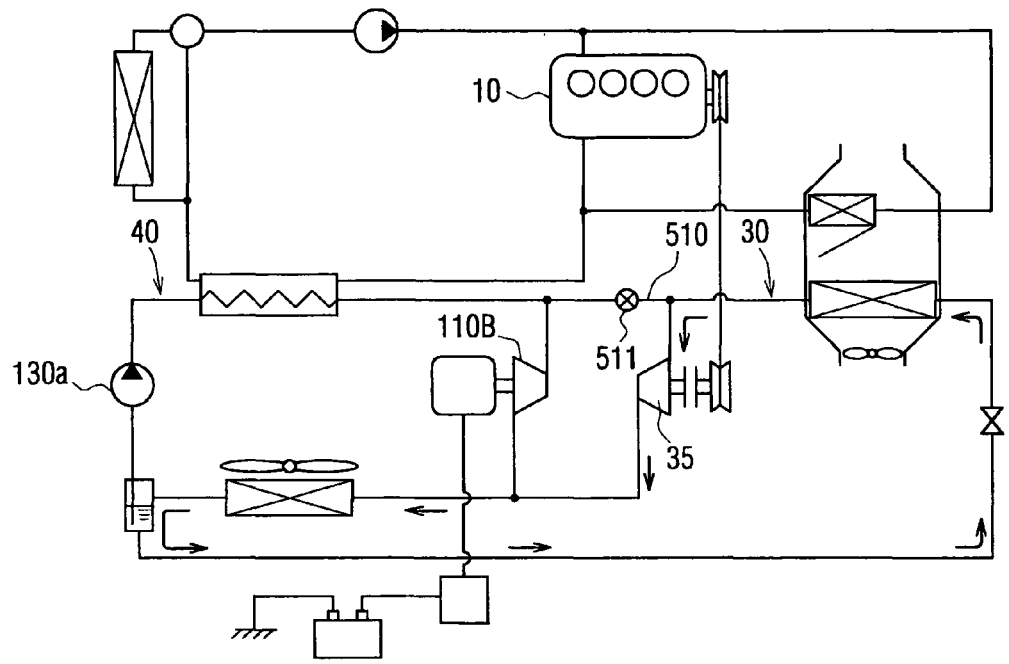
FIGS. 27 to 31 are schematic views showing the system structure according to the above eighth embodiment, in which refrigerant flows in respective operational modes are shown.
Figure 28:
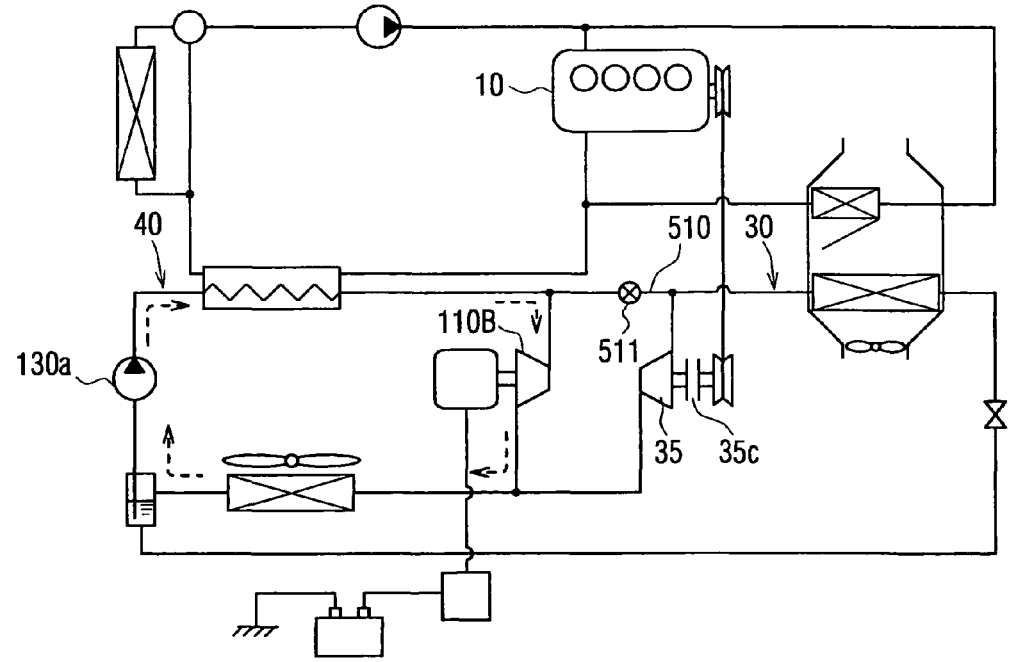
Figure 29:
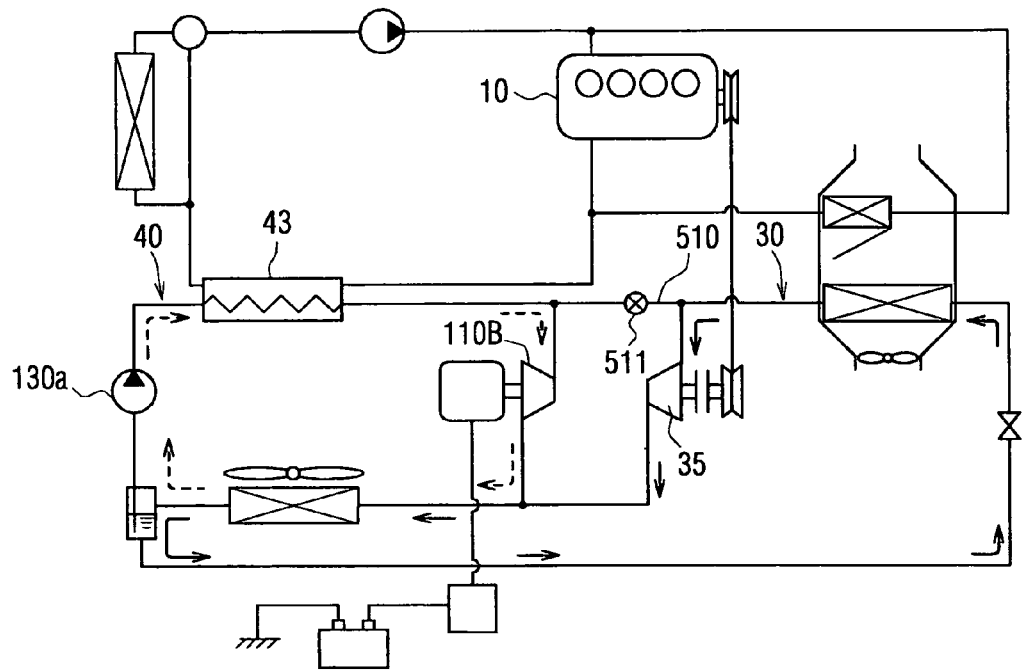
Figure 30:
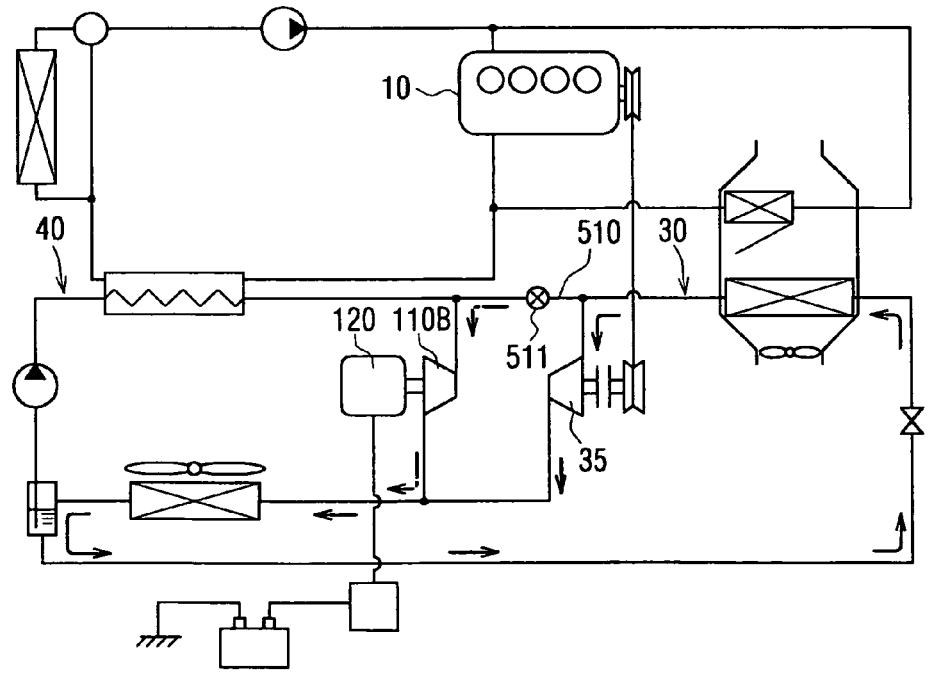
Figure 31:
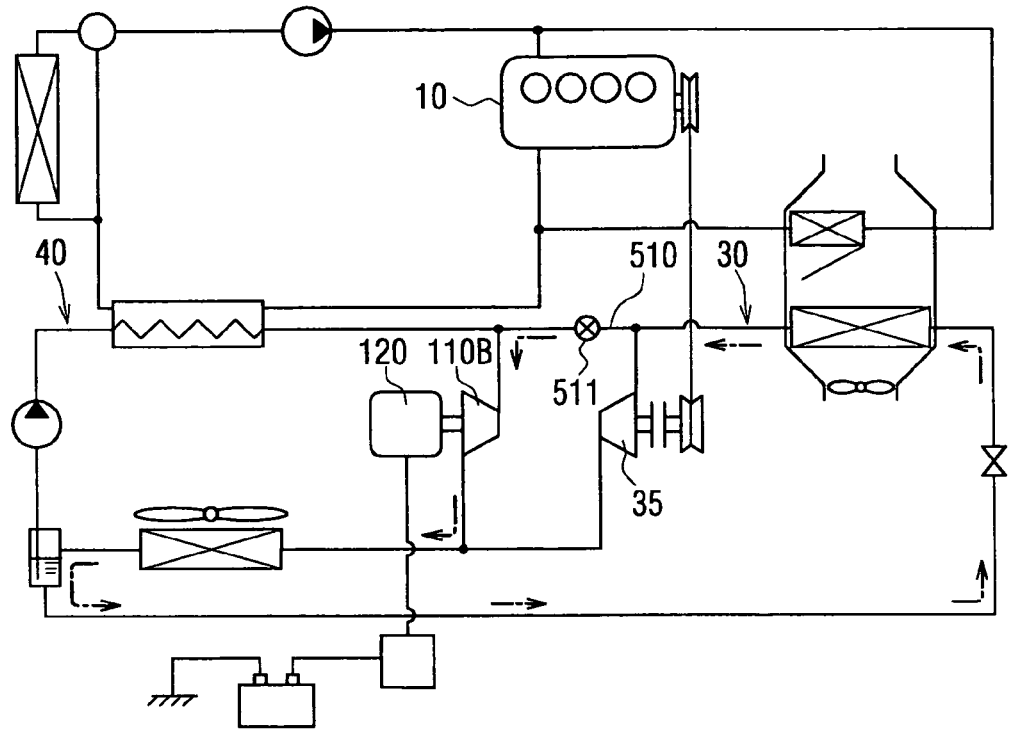

A seventh embodiment is shown in FIG. 25, in which the first and third ON-OFF valves 51a and 53a of the sixth embodiment (FIG. 19) are replaced by check valves 51b and 53b.

The check valves 51b and 53b respectively allow the refrigerant to flow only in one direction, namely from the main compressor device 35 to the expansion-compressor device 110 in the first connecting passage 51, and from the expansion-compressor device 110 to the condenser 31 when the system is operating with the Rankine cycle 40.

The check valves 51b and 53b are lower in cost than the ON-OFF valves (the electromagnetic valves) 51a and 53a, so that the system of the embodiment can be made at a lower cost.

Eighth Embodiment

An eighth embodiment is shown in FIGS. 26 to 31, which differs from the sixth embodiment (FIGS. 19 to 24) in the structure of the expansion-compressor device and connecting passages.

An expansion-compressor device 110B is formed from a piston type fluid machine instead of the scroll type fluid machine. Timing valves are provided to control the opening and closing timings of the working chamber, so that the flow-in and flow-out of the refrigerant is controlled. And the flow direction of the refrigerant to the expansion-compressor device 110B is fixed to one direction in both cases, in which the expansion-compressor device is operated as the expansion device and the compressor device.

A connecting passage 510 is provided for connecting the suction side of the main compressor device 35 and an inlet side of the expansion-compressor device 110B (a suction side when operating as the sub-compressor device), and an ON-OFF valve 511 is provided in the connecting passage 510 for opening or closing the connecting passage 510.

According to the eighth embodiment, the sole operational mode of the main cooling operation is performed in such a manner that the connecting passage 510 is closed by the ON-OFF valve 511, the operation of the expansion-compressor device 110 is stopped, and the main compressor device 35 is driven by the engine 10. The refrigerant compressed by the main compressor device 35 is circulated in the refrigerating cycle, as indicated by arrows of the solid line in FIG. 27.

The sole operational mode of the Rankine cycle operation is performed in such a manner that the connecting passage 510 is closed by the ON-OFF valve 511, the main compressor device 35 is disconnected from the engine 10 by cutting off the electromagnetic clutch 35c, and the expansion-compressor device 110B is operated as the expansion device. The refrigerant heated by the heating device 43 is circulated by the liquid pump 130a in the Rankine cycle, as indicated by arrows of the dotted line in FIG. 28.

The bilateral operational mode of the main cooling & Rankine cycle operation is performed in such a manner that the connecting passage 510 is closed by the ON-OFF valve 511, the main compressor device 35 is connected to and driven by the engine 10, and the expansion-compressor device 110B is operated as the expansion device. Then, the refrigerant compressed by the main compressor device 35 is circulated in the refrigerating cycle, as indicated by arrows of the solid line in FIG. 29, whereas the refrigerant heated by the heating device 43 is circulated by the liquid pump 130a in the Rankine cycle, as indicated by arrows of the dotted line in FIG. 29.

The assisting operational mode for the main cooling operation is performed in such a manner that the connecting passage 510 is opened by the ON-OFF valve 511, the main compressor device 35 is connected to and driven by the engine 10, and the motor generator 120 is operated as the electric motor so that the expansion-compressor device 110B is operated as the sub-compressor device. Then, the refrigerant compressed by the main compressor device 35 is circulated in the refrigerating cycle, as indicated by arrows of the solid line in FIG. 30, whereas the refrigerant compressed by the sub-compressor device 110B is circulated, as indicated by arrows of the one-dot-chain line in FIG. 30.

The sole operational mode of the sub-cooling operation is performed in such a manner that the connecting passage 510 is opened by the ON-OFF valve 511, the main compressor device 35 is disconnected from the engine 10 (or connected to the engine 10, but the operation of the main compressor device 35 is stopped), and the motor generator 120 is operated as the electric motor so that the expansion-compressor device 110B is operated as the sub-compressor device. Then, the refrigerant compressed by the sub-compressor device 110B is circulated, as indicated by arrows of the one-dot-chain line in FIG. 31.

As above, the five different operational modes can be performed according to the eighth embodiment, with a simple structure of the connecting passage.

The fluid machines 100 and 100A to 100D explained for the first to fifth embodiments can be likewise used as the fluid machine for the seventh and eighth embodiments.

A rotary type, piston type, vane type, or any other type fluid machine can be also used as the expansion-compressor device 110, or independently as the compressor device and the expansion device. An external combustion engine may be used as a heat generating device, instead of the internal combustion engine 10.

Ninth Embodiment

A ninth embodiment is shown in FIGS. 32 to 36. The structure of a system for the refrigerant cycles shown in FIG. 32 of this ninth embodiment is similar to that of the first embodiment shown in FIG. 2, whereas a structure of a fluid machine 100F is similar to the fluid machine 100D shown in FIG. 18 (the fifth embodiment). Therefore, only those portions which are different from the first embodiment (FIG. 2) and the fifth embodiment (FIG. 18) are hereinafter explained.

The refrigerant pump 130 is integrally formed into the fluid machine 100 according to the first embodiment. According to the ninth embodiment, the liquid pump 130a (corresponding to the refrigerant pump 130) is separately provided from the fluid machine 100F in the first bypass passage 41.

Figure 33:
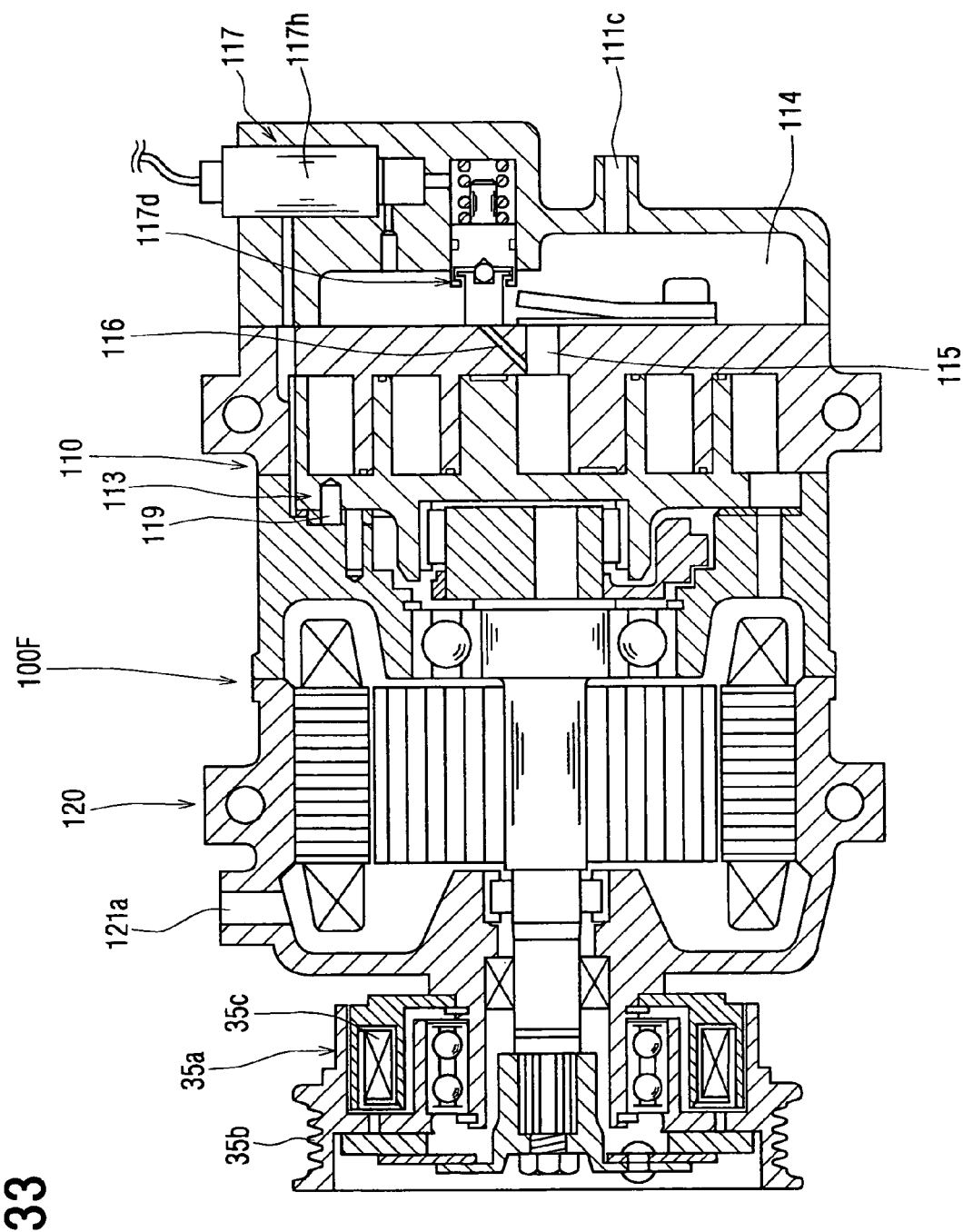
FIG. 33 is a schematic cross sectional view showing a complex fluid machine according to the ninth embodiment, which is applied to the system of FIG. 32.

The fluid machine 100F comprises, as shown in FIG. 33, the expansion-compressor device 110, the motor generator 120, and the pulley device 35a (which corresponds to the pulley device 35a of FIG. 4, and comprises the pulley 35b and the electromagnetic clutch 35c). The pulley device 35a is connected with the engine 10 via the V-belt, so that the fluid machine 100F is operatively connected to the engine 10.

Figure 32:
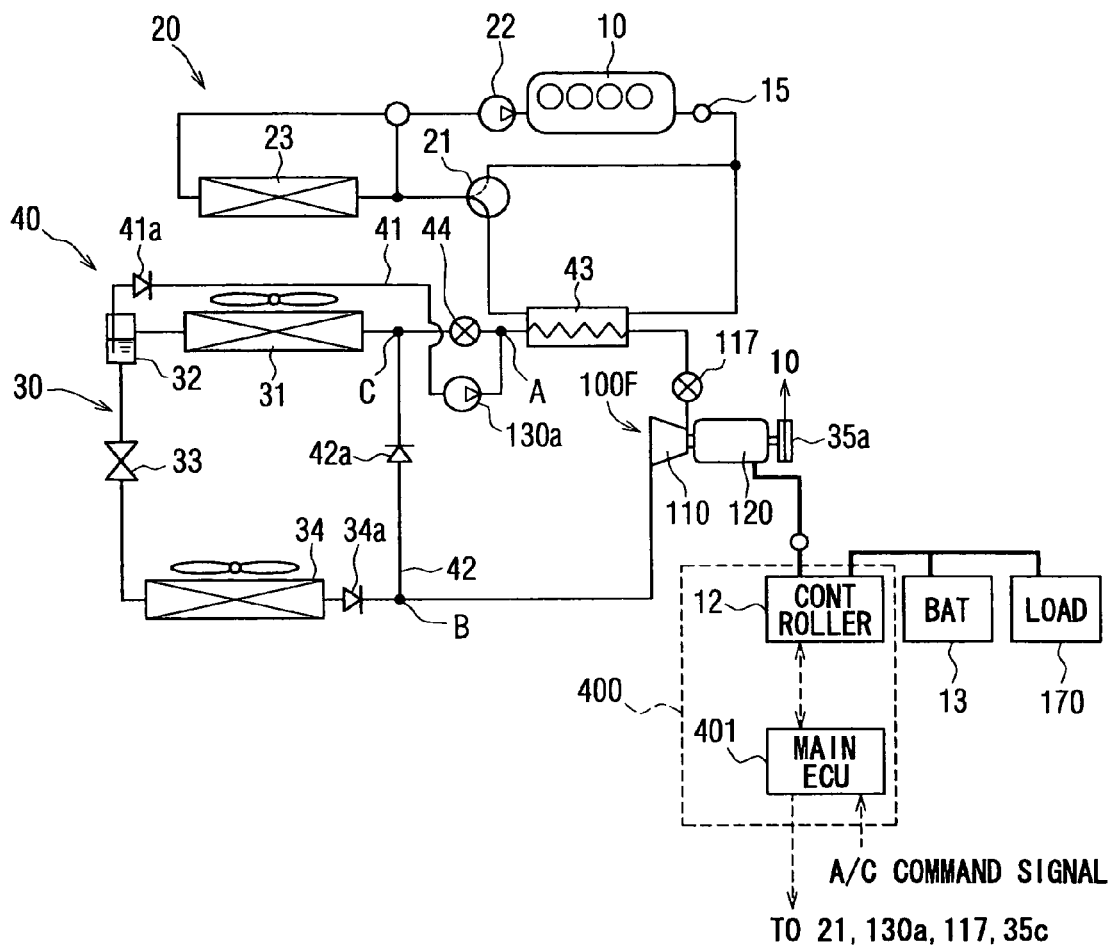
FIG. 32 is a schematic view showing a system structure according to a ninth embodiment.
Figure 34:
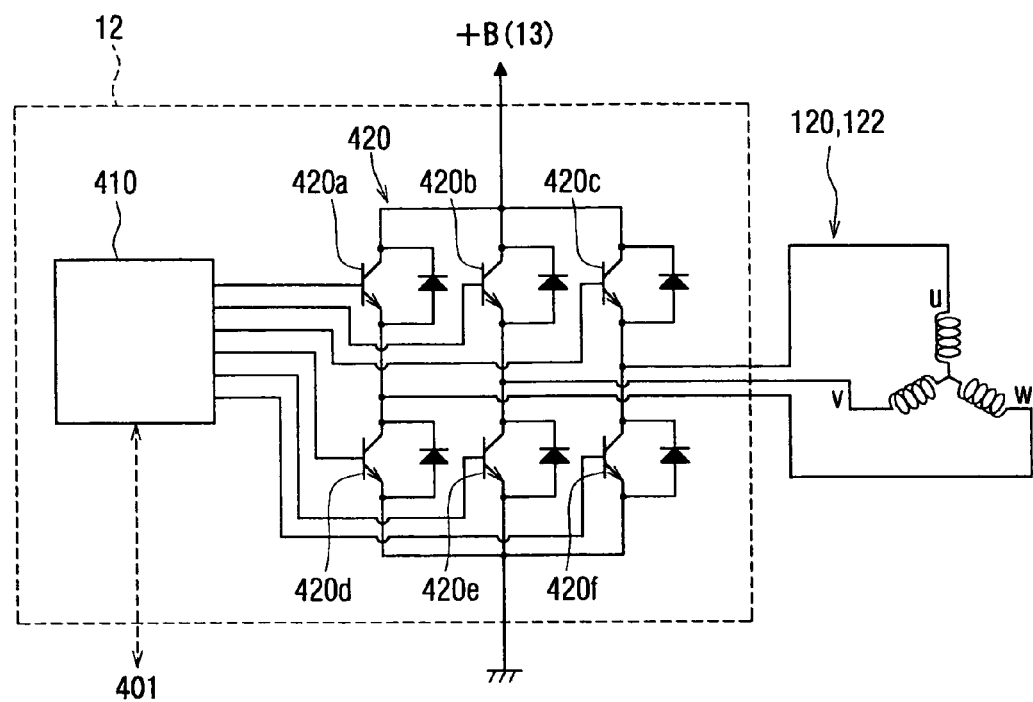
FIG. 34 is a schematic view showing an electric circuit of a controller to be used in the system of FIG. 32.
Figure 35:
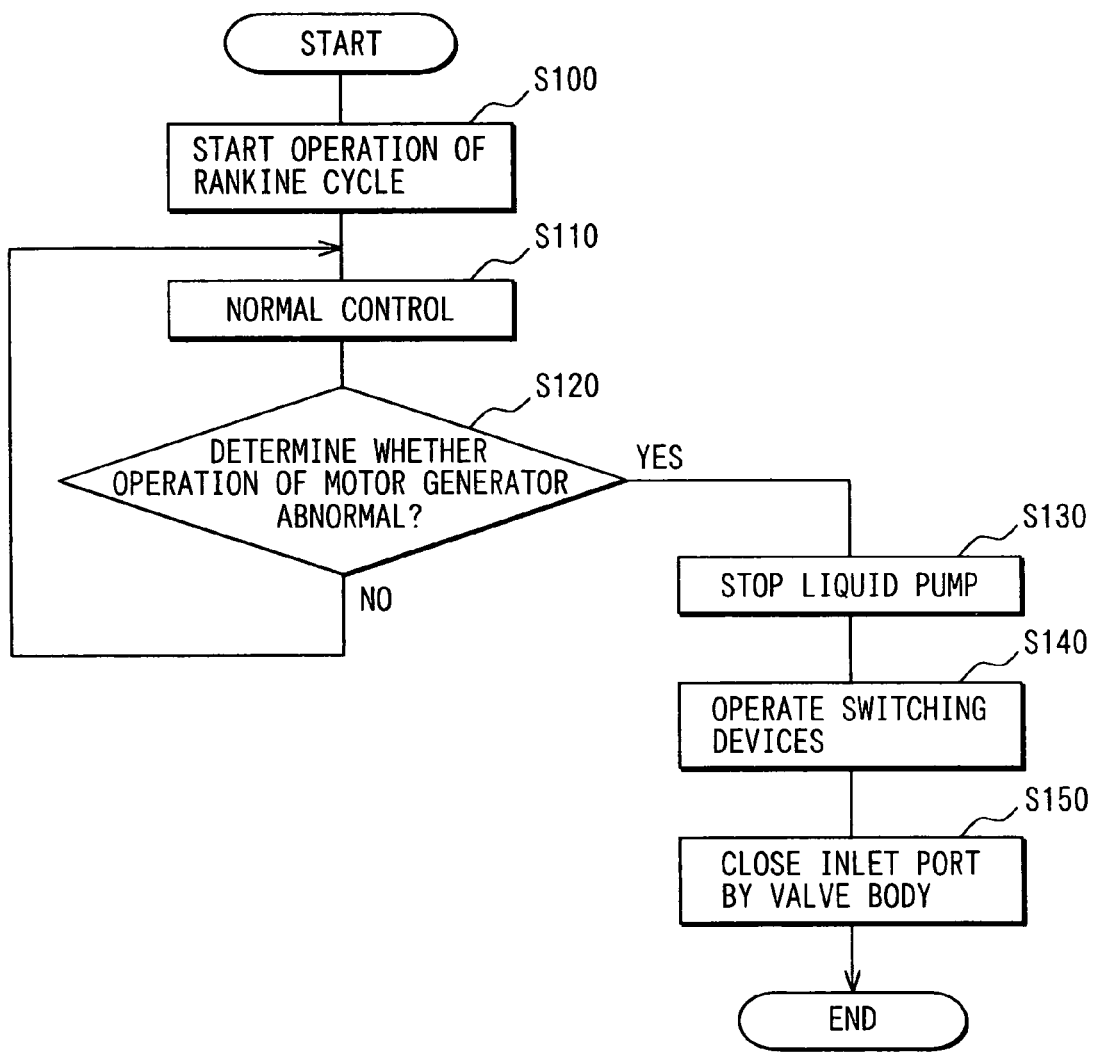
FIG. 35 is a flow chart for controlling an operation of the system of FIG. 32.

As shown in FIGS. 32 and 34, the electronic control unit 400 comprises the controller 12 and a main ECU 401, and electronic signals are communicated between the controller 12 and the main ECU 401. Inputted into the main ECU 401 are an A/C command signal, which is decided based on a set temperature adjusted by a vehicle passenger and environmental conditions and so on, and a temperature signal detected by the temperature sensor 15. Operations of the three way valve 21, the liquid pump 130a, the valve device 117 (the electromagnetic valve 117h) of the expansion-compressor device 110, the electromagnetic clutch 35c and so on are controlled based on the above mentioned inputted signals.

As shown in FIG. 34, the controller 12 comprises an operation control portion 410 and a switching portion 420, wherein the operation control portion 410 is connected to the main ECU 401 and the switching portion 420 is connected to the battery 13 and the motor generator 120 (respective windings of U-phase, V-phase and W-phase of the stator 122).

The operation control portion 410 controls switching operations (ON or OFF) of the respective (six) switching devices 420a to 420f of the switching portion 420, in accordance with command signal from the main ECU 401, so that the rotational speed of the motor generator 120 is controlled by controlling the electric power (the electric current and/or electric voltage) at the motor generator 120. The operation control portion 410 outputs signals relating to the electric current, the electric voltage and/or the rotational speed, to the main ECU 401, when the motor generator 120 is operated.

An operation of the ninth embodiment is explained. When the cooling operation is required by the vehicle passenger, the compressor device 110 is connected with the engine 10 via the pulley device 35a, so that the compressor device 110 is driven by the engine 10. In the case that the engine operation is temporarily stopped, the electric power is supplied to the motor generator 120 to generate the rotational force, so that the compressor device 110 is driven by the motor generator 120.

When the operation of the expansion-compressor device 110 as the compressor device is started, the compressed refrigerant is circulated in the refrigerating cycle 30 to perform the cooling operation.

When the compressor device 110 is driven by the driving force from the engine 10, the motor generator 120 is also driven by the engine driving force to generate the electric power, which will be charged into the battery 13.

In the above cooling operation, the operation of the liquid pump 130a is stopped, the ON-OFF valve 44 is opened, the three way valve 21 is switched to the position of the hot water bypass mode, in which the hot water from the engine 10 is prevented from flowing into the heating device 43. The electromagnetic valve 117h is closed to close the inlet port 116.

In the case that the cooling operation is not required and there is a sufficient waste heat from the engine 10, for example the temperature detected by the temperature sensor 15 is higher than a predetermined value, the fluid machine 100F is disconnected from the engine 10, or the operation of the fluid machine 100F as the compressor device 110 by the rotation of the motor generator 120 is stopped.

The ON-OFF valve 44 is opened, and the three way valve 21 is switched to the other position so that the hot water from the engine 10 is allowed to flow into the heating device 43.

The operation of the liquid pump 130a is started to increase the pressure of the refrigerant to be supplied from the gas-liquid separator 32 to the heating device 43. In this time point, the inlet port 116 is still in its closed position by the valve body 117d, and the refrigerant does not flow into the working chamber from the high pressure chamber 114. Accordingly, the pressure of the refrigerant is rapidly increased by the operation of the liquid pump 130a.

The motor generator 120 is operated as the electric motor to rotate in the direction opposite to the compression mode, to drive the movable scroll 113 to start its rotation. The rotational speed of the movable scroll 113 is increased to a predetermined speed by the driving force of the motor generator 120. Then, the electromagnetic valve 117h is opened to open the inlet port 116, so that the expansion-compressor device 110 starts to operate as the expansion device.

When a stable operation of the Rankine cycle 40 is achieved, the movable scroll 113 is rotated by the expansion of the superheated refrigerant to output the rotational force. The motor generator 120 is then rotated by the rotational force obtained at the expansion device 110 to generate the electric power, which will be charged into the battery 13.

The rotational speed of the expansion-compressor device 110 (the movable scroll 113) is controlled depending on the temperature of the hot engine cooling water, so that the maximum electric power can be obtained during the operation of the Rankine cycle 40. The temperature of the refrigerant flowing through the heating device 43 is decided by the temperature of the hot water. The pressure of the refrigerant can be decreased by increasing the rotational speed of the motor generator 120 and thereby increasing the expansion speed of the refrigerant, whereas the refrigerant pressure can be increased by decreasing the rotational speed of the motor generator 120 and thereby decreasing the expansion speed. Accordingly, the effective expansion work is obtained at the expansion device 110, and an operational balance of the Rankine cycle 40 is maintained so that the refrigerant having a certain degree of superheat after its expansion is supplied to the condenser 31. As above, the higher electric power can be obtained.

According to the ninth embodiment, the operation of the Rankine cycle 40 is forcibly stopped, when the operation of the motor generation 120 becomes uncontrollable, as a result that the operation of the motor generator 120 steps out from its normal operation during the operation of the Rankine cycle 40. This operation is further explained with reference to a flowchart of FIG. 35 and a time chart of FIGS. 36A to 36D.

At a step S100, the operation of the Rankine cycle 40 is started, and a normal control for the operation of the motor generator 120 is carried out at a step S110. At a step S120, the electronic control unit 400 determines whether or not the operation of the motor generator 120 is in its normal condition, namely whether the operation of the motor generator 120 steps out from its normal operation.

The determination whether the operation of the motor generator 120 is normal or not is carried out based on current signals. Namely, the electronic control unit 400 determines that the operation of the motor generator 120 is in its normal condition, when the electric current of the motor generator 120 during its operation is within a predetermined target current range (a stepping-out determining range shown in FIG. 36A). On the other hand, it is determined that the operation of the motor generator 120 is in an abnormal condition, when the current is out of the target current range. In the case that the determination at the step S120 is NO, namely when the operation of the motor generator 120 is in its normal condition, the process goes back to the step S110, to continue the normal control for the operation of the motor generator 120. In the case that the determination at the step S120 is YES, namely when the operation is abnormal, the process goes to a step S130 to stop the operation of the liquid pump 130a.

Figure 36A:
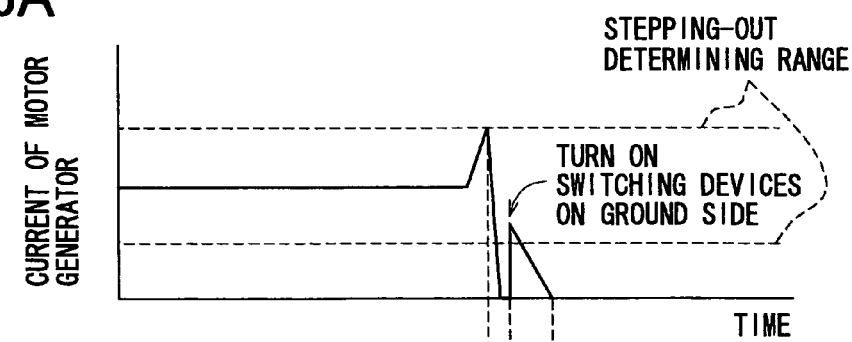
FIG. 36 is a time chart for explaining the operation of the system of FIG. 32.
Figure 36B:
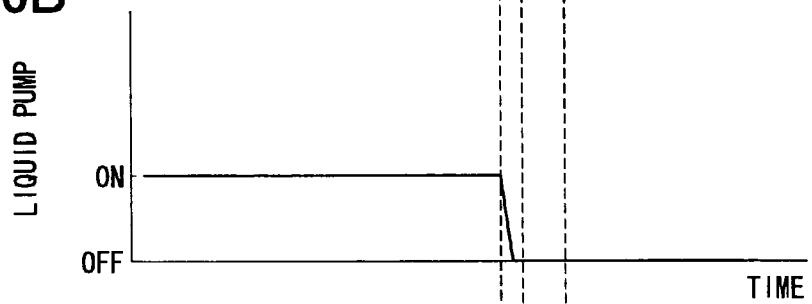
Figure 36C:

At the step S130, the operation of the liquid pump 130a is stopped at once, as shown in FIG. 36B. At a step S140, all of the switching devices 420a to 420f of the switching portion 420 are turned off at first, and then the three switching devices 420d to 420f, which are on a ground side of the battery 13, are turned on, as indicated in FIG. 36A. At a step S150, the electromagnetic valve 117h of the expansion-compressor device 110 is closed to close the inlet port 116 by the valve body 117d, as indicated in FIG. 36C.

Figure 36D:
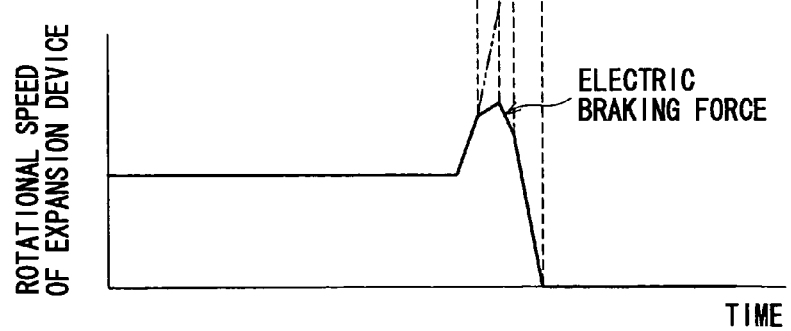

As above, the circulation of the refrigerant in the Rankine cycle 40 is stopped because of the stop of the liquid pump 130a, so that the supply of the refrigerant to the expansion-compressor device 110 is decreased. The three switching devices 420d to 420f on the ground side are turned on to form closed circuits for the respective windings U, V and W, so that the current is allowed to flow through the closed circuits. As a result, electric braking force is generated at the motor generator 120 to quickly stop the rotation of the motor generator 120, as indicated in FIG. 36D. Then, the inlet port 116 is closed by the valve body 117d, to completely stop the flow-in of the refrigerant into the expansion device 110, as indicated in FIG. 36C.

As above, the operation of the expansion-compressor device 110 and the motor generator 120 can be stopped in safe, when the operation of the control for the motor generator 120 steps out from its normal operation and the operation for the motor generator 120 becomes uncontrollable.

Namely, as a result of preventing an acceleration of the expansion-compressor device 110, a possible damage of the fluid machine can be avoided, which might occur when the rotational speed of the fluid machine exceeds a predetermined tolerance level. Furthermore, generation of a noise can be suppressed, which might be generated between the movable and fixed scrolls when the self rotation preventing mechanism 119 does not work well. Furthermore, generation of an extremely high voltage, which may destroy associated electric devices, is prevented. Since the electric braking force is used for quickly stopping the rotation of the fluid machine, the cost for the fluid machine becomes lower in comparison with such a fluid machine in which a mechanical braking device is adopted.

Signals for the electrical voltage or the rotational speed of the fluid machine can be used at the step S120, instead of the electric current, for the purpose of determining whether the operation of the motor generator 120 is in its normal operational condition.

The steps S130 to S150 are carried out for stopping the operation of the Rankine cycle 40, when the abnormal condition has occurred. However, only one of the steps S130 (stopping the liquid pump 130a), S140 (switching off all switching devices and then switching on the devices 420d to 420f) and S150 (closing the inlet port by the valve body) can be carried out for stopping the operation of the Rankine cycle 40.

Figure 37:
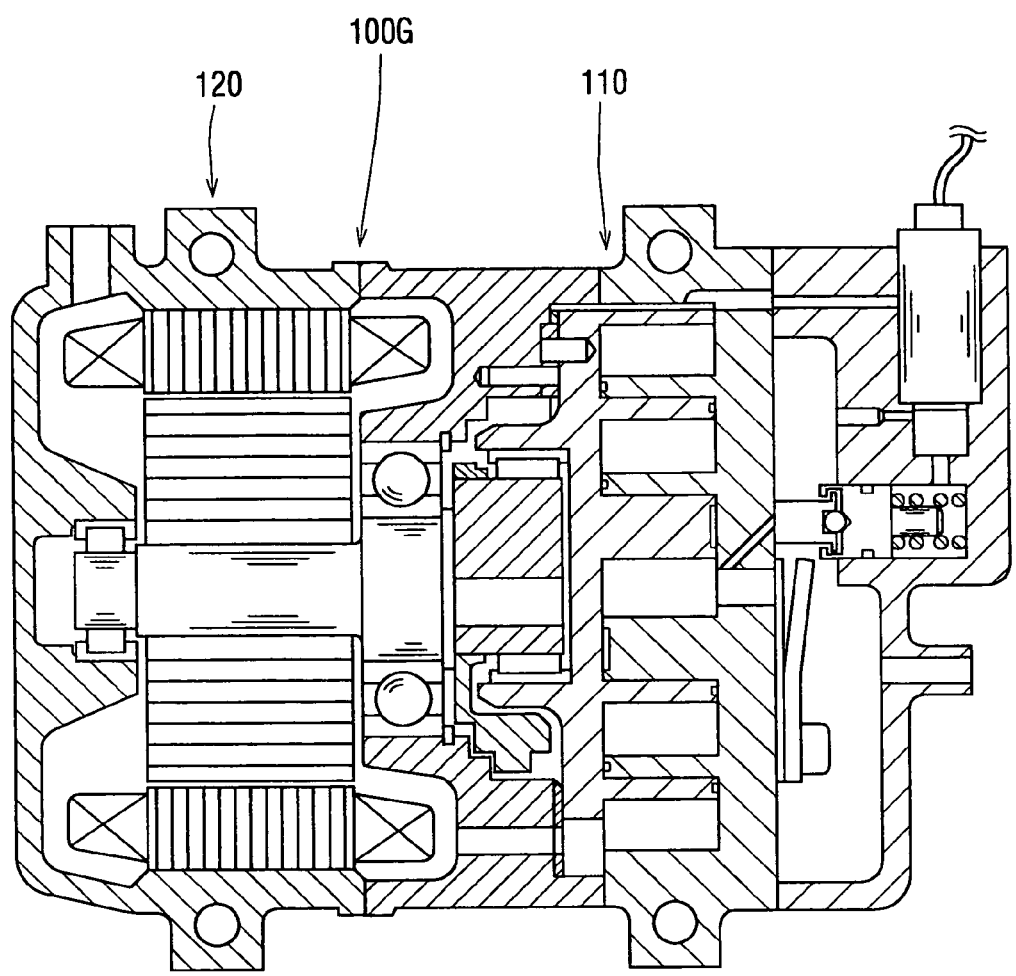
FIG. 37 is a schematic cross sectional view showing a complex fluid machine according to a modification of the above ninth embodiment.

As a modification of the fluid machine for the ninth embodiment, the electromagnetic clutch 35c can be removed from the fluid machine 100F, as shown in FIG. 37. According to such a structure (the fluid machine 100G), the expansion-compressor device 110 is always driven by the motor generator 120, when it is operated as the compressor device.

The fluid machines 100 and 100A to 100D explained for the first to fifth embodiments can be used as the fluid machine for the ninth embodiment.

Figure 38:
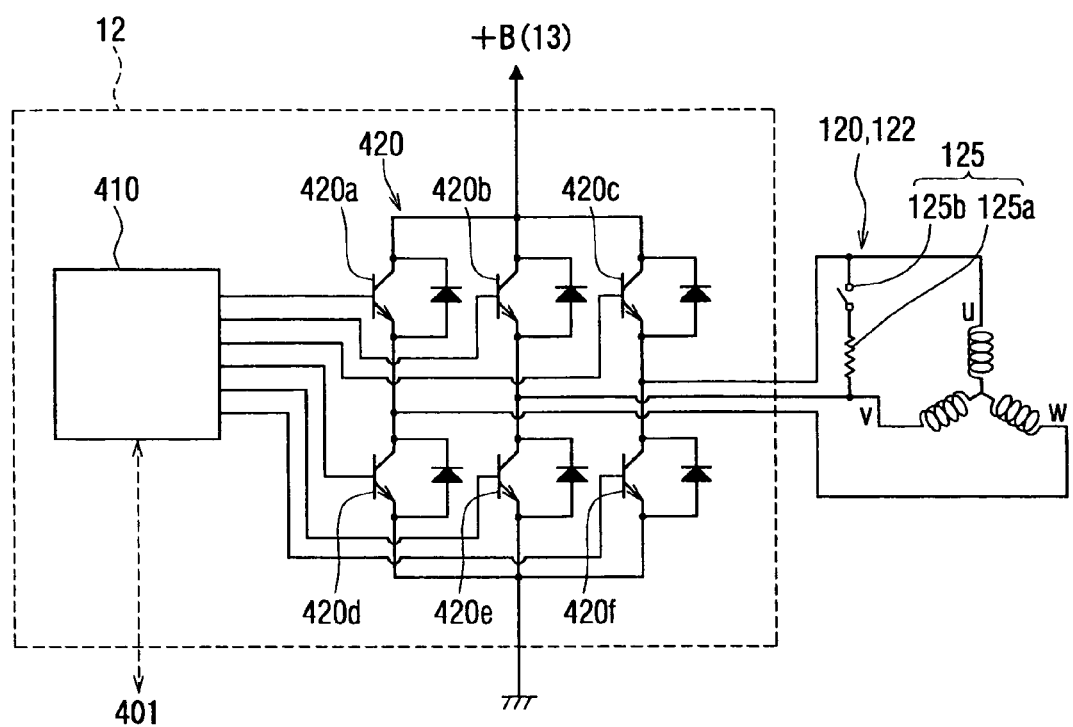
FIG. 38 is a schematic view showing an electric circuit of a controller and a motor generator according to a modification of the above ninth embodiment.
Figure 39:
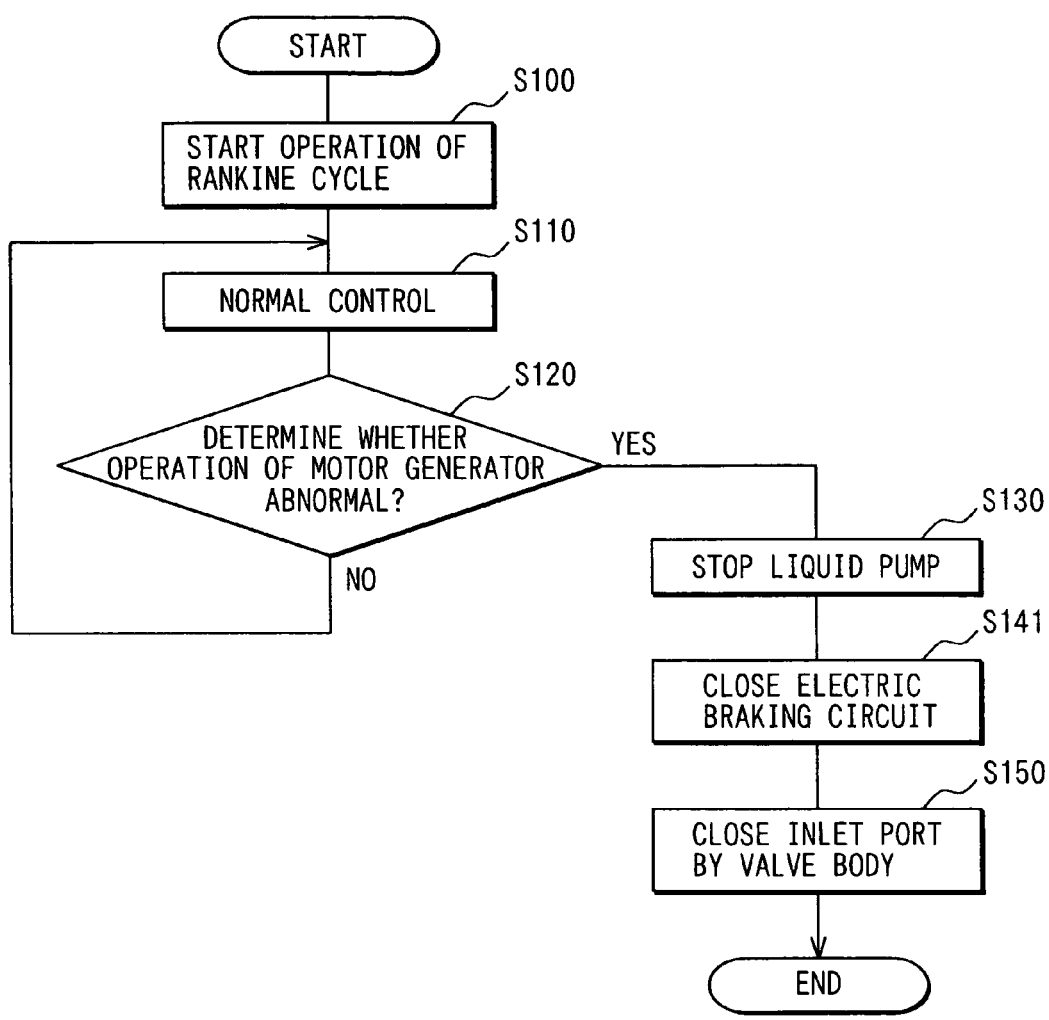
FIG. 39 is a flow chart for controlling an operation of the system of FIG. 32, which is modified by FIG. 38.

FIGS. 38 and 39 show another modification of the ninth embodiment, in which an electric braking circuit for the motor generator 120 is modified.

According to the modification, as shown in FIG. 38, an electric braking circuit 125 having an electric resistance 125a and a switching device 125b is provided between two windings U and V of the stator 122, to operatively form a closed circuit by the windings U and V, the resistance 125a, and the switching device 125b.

As shown in FIG. 39, when the abnormal operating condition of the motor generator 120 is detected at the step S120, the switching device 125b is closed at a step S141, after the operation of the liquid pump 130a is stopped.

As a result, the electric current flows through the closed circuit of the windings U and V, and the electric resistance 125a, to generate the electric braking force for the motor generator 120.

The step S150 can be eliminated from the process shown in FIG. 39, as the case may be.

Tenth Embodiment

The invention of the above ninth embodiment can be applied to the other form of the system structure.

Figure 40:
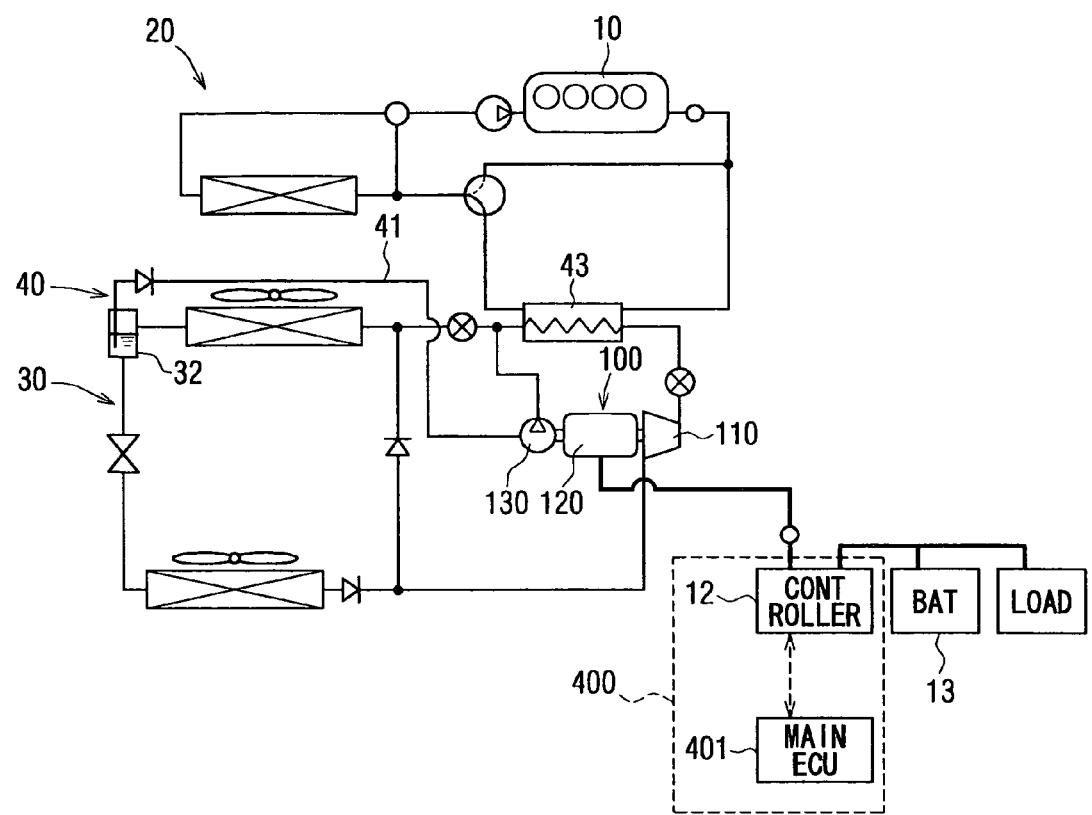
FIG. 40 is a schematic view showing a system structure according to a tenth embodiment.
Figure 41:
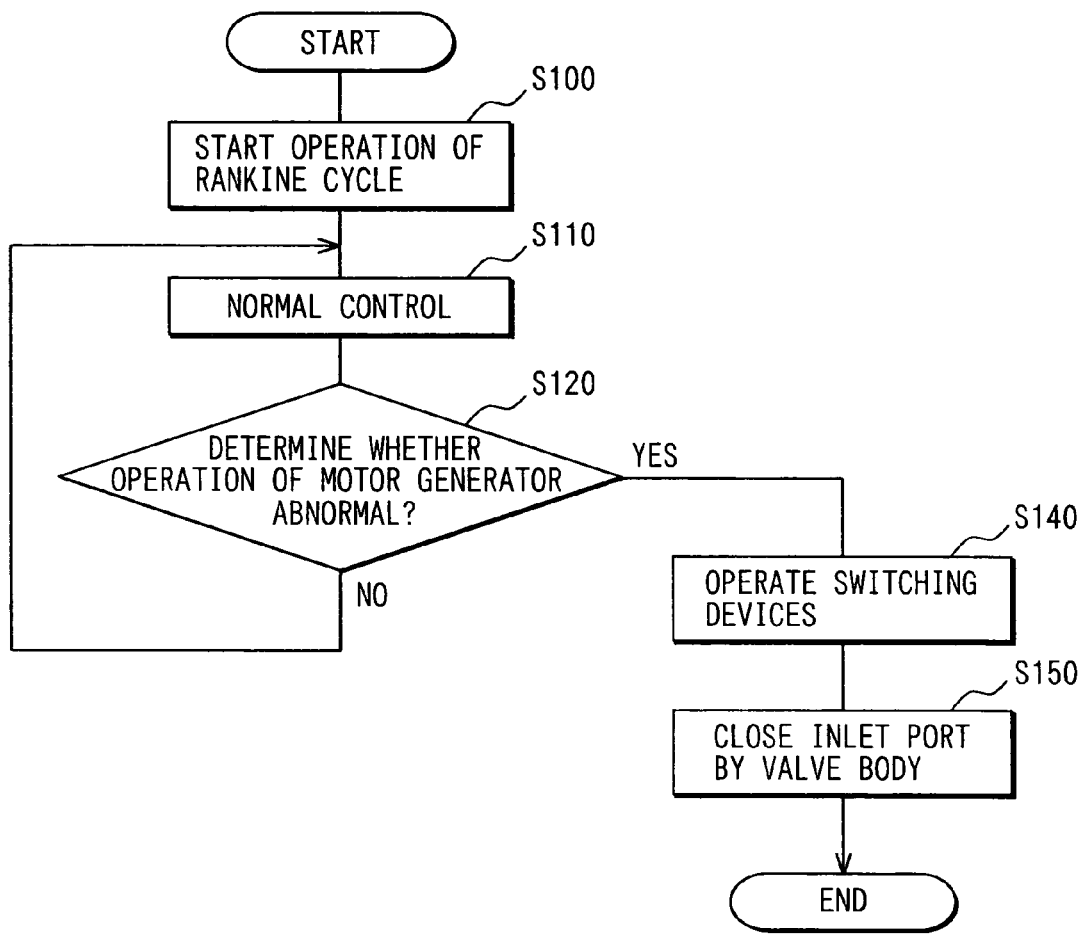
FIG. 41 is a flow chart for controlling an operation of the system of FIG. 40.

A tenth embodiment is shown in FIGS. 40 and 41, wherein a structure of a system for the refrigerant cycles shown in FIG. 40 is substantially equal to that of the first embodiment shown in FIG. 2, and the fluid machines 100 and 100A to 100D explained for the first to fifth embodiments can be used as the fluid machine for the system of FIG. 40. The detailed explanation is therefore omitted.

The structure of the electronic control unit 400, more specifically the controller 12, of FIG. 40 is identical to that shown in FIG. 34.

According to the flow chart of FIG. 41, when the abnormal operating condition of the motor generator 120 is detected at the step S120, the switching devices (420a to 420f) are controlled as in the same manner to the ninth embodiment, to quickly stop the operation of the motor generator 120. In this embodiment, the step (S130) for stopping the liquid pump 130a is omitted.

Eleventh Embodiment

Figure 42:
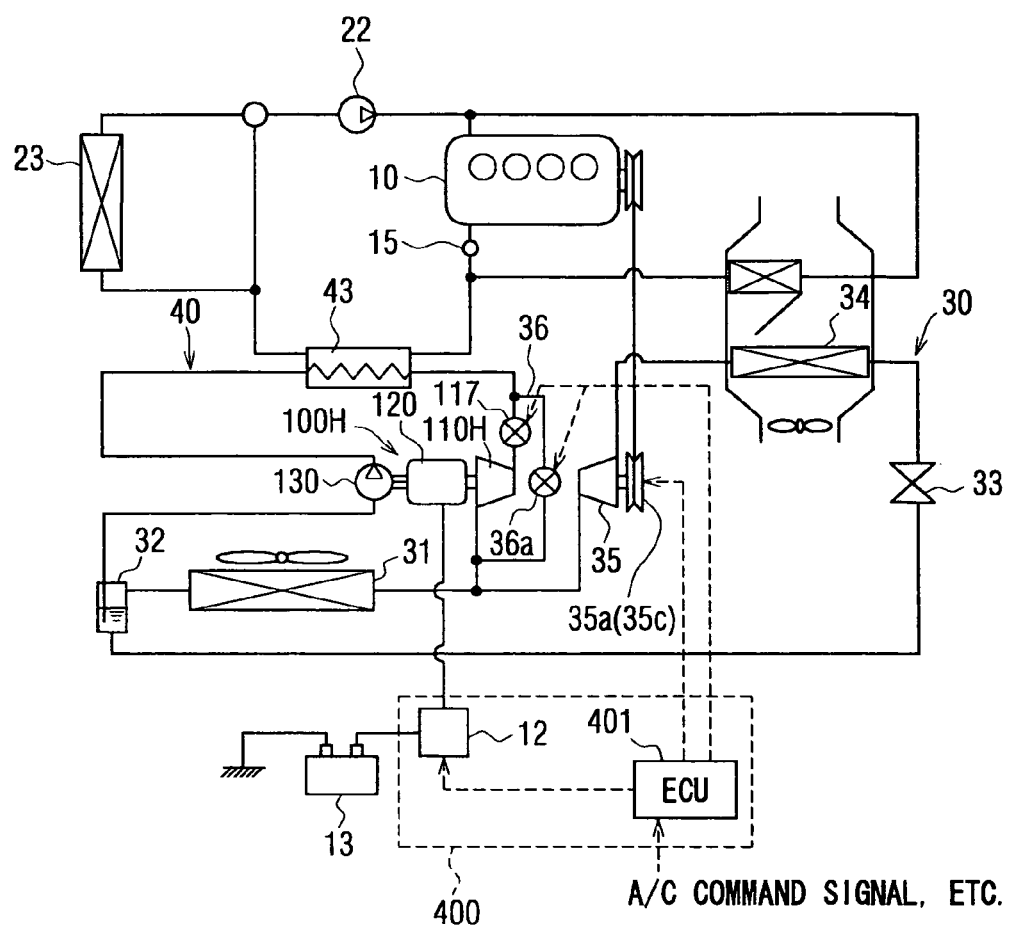
FIG. 42 is a schematic view showing a system structure according to an eleventh embodiment.
Figure 43:
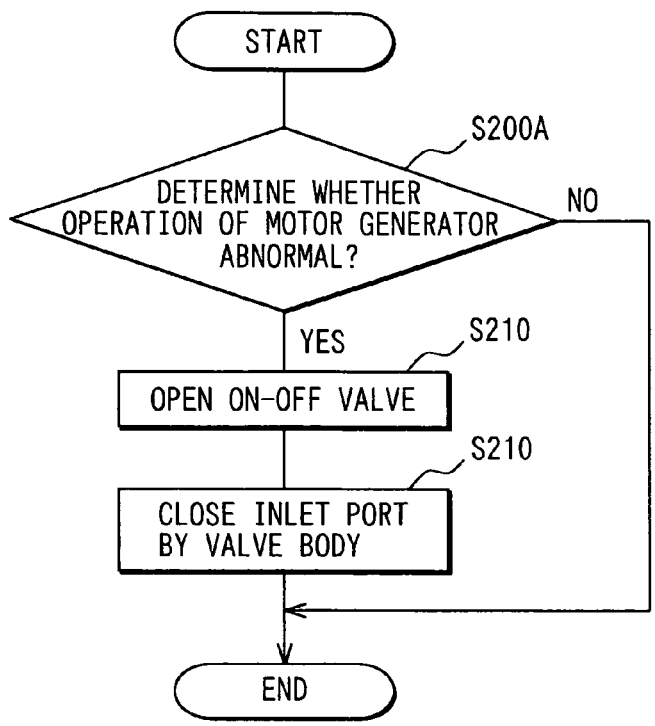
FIG. 43 is a flow chart for controlling an operation of the system of FIG. 42.

An eleventh embodiment is shown in FIGS. 42 and 43. The structure of a system for the refrigerant cycles shown in FIG. 42 of this eleventh embodiment is similar to that of the second embodiment shown in FIG. 4, whereas a structure of a fluid machine 100H is similar to the fluid machine 100 shown in FIG. 1. Therefore, only those portions which are different from the first embodiment (FIG. 1) and the second embodiment (FIG. 4) are hereinafter explained.

According to the eleventh embodiment, the fluid machine 100H is exclusively used as the expansion device, whereas the main compressor device 35 is exclusively used as the compressor device as in the same manner to the second embodiment shown in FIG. 4.

Although the detailed structure of the fluid machine 100H is not shown, the basic structure thereof is similar to the fluid machine 100 shown in FIG. 1. However, since the fluid machine 100H is exclusively used as the expansion device, some modification is made to the fluid machine 100 of FIG. 1. For example, the discharge port 115 and the discharge valve 117a are eliminated from the fluid machine 100 of FIG. 1, whereas the inlet port 116 and the inlet port valve device 117 (the valve body 117d, the back pressure chamber 117e, the electromagnetic valve 117h, and so on) are formed as they are shown in FIG. 1, so that the inlet port 116 is opened and/or closed when the Rankine cycle is operated.

The structure of the system for the refrigerant cycles shown in FIG. 42 is formed by modifying the structure of FIG. 4, so that the fluid machine 100H can be exclusively operated as the expansion device. More specifically, an expansion device bypass passage 36 is provided for communicating a high pressure side with a low pressure side of the expansion device 110H, and an ON-OFF valve 36a is provided in the expansion device bypass passage 36 for opening or closing the passage 36. The operation of the ON-OFF valve 36a is controlled by the electronic control unit 400.

The electronic control unit 400 comprises the main ECU 401 and the controller 12, as in the same manner to that of FIGS. 32 and 34, and the electronic signals are communicated between the controller 12 and the main ECU 401. Inputted into the main ECU 401 are an A/C command signal, which is decided based on a set temperature adjusted by a vehicle passenger and environmental conditions and so on, and a temperature signal detected by the temperature sensor 15. Operations of the ON-OFF valve 36a, the valve device 117 (the electromagnetic valve 117h) of the expansion device 110H, the electromagnetic clutch 35c and so on are controlled based on the above mentioned inputted signals.

The controller 12 controls the electric power (the electric voltage and/or current) of the motor generator 120 in accordance with command signal from the main ECU 401, so that the rotational speed of the motor generator 120 is controlled. The controller 12 outputs signals relating to the electric current, the electric voltage and/or the rotational speed, to the main ECU 401, during the motor generator 120 is operated. The controller 12 also operates as an abnormal condition detecting device, which detects an abnormal operating condition of the motor generator 120.

When the abnormal operating condition is detected by the controller 12 during the Rankine cycle 40 is operated, the operation of the Rankine cycle 40 is stopped in accordance with the process of the flow chart shown in FIG. 43.

More specifically, the controller 12 determines at a step S200A whether there is the abnormal operational condition as a result that the operation of the motor generator 120 has stepped out from its normal operation. At the step S200A, the determination is carried out based on the rotational speed of the motor generator 120. The controller 12 determines that the motor generator 120 is operating in the normal condition, when the rotational speed is within a predetermined speed range, whereas it determines the abnormal condition when the rotational speed is out of the predetermined speed range.

In the case that the controller 12 determines at the step S200A that there is the abnormal operational condition, the process moves on to a step S210, at which an operation for stopping the expansion device 110H and the motor generator 120 will be carried out.

Namely, the ON-OFF valve 36*a* is opened at the step S210. The electromagnetic valve 117*h* is closed, at a step S220, to close the inlet port 116 by the valve body 117*d*.

As a result, the high pressure side and the low pressure side of the expansion device 110H is communicated with each other through the ON-OFF valve 36*a*, and the superheated refrigerant from the heating device 43 is prevented from flowing into the expansion device 110H. Then, the pressures of the high pressure side and the low pressure side are equalized, and the driving energy (force) for the expansion device 110H is removed therefrom. The flow-in of the refrigerant into the expansion device 110H is completely stopped by closing the inlet port 116 by the valve body 117*d*.

As above, the accelerated rotation of the expansion device 110H is prevented, and the operation of the expansion device 110H as well as the motor generator 120 can be stopped in safe, when the operation of the control for the motor generator 120 steps out from its normal operation and the operation for the motor generator 120 becomes uncontrollable.

In the above embodiment, the rotational speed of the motor generator 120 is used as the information for determining the abnormal operational condition thereof at the step S200A. However, the signals relating to the electric voltage and/or current can be also used as the information for the determination.

Furthermore, the signals relating to the pressure and/or temperature of the refrigerant in the Rankine cycle 40 can be used as the information for the determination. In this case, a pressure sensor and/or a temperature sensor for detecting the pressure and/or temperature of the refrigerant in the Rankine cycle 40 are provided at appropriate portions, and the determination is carried out whether the detected pressure and/or temperature are within a predetermined pressure or temperature range.

Furthermore, the expansion device bypass passage 36 and the ON-OFF valve 36*a* can be replaced by a pump bypass passage and another ON-OFF valve, wherein the pump bypass passage communicates a high pressure side of the refrigerant pump 130 with a low pressure side thereof when the other ON-OFF valve is opened. According to such a modified arrangement of the pump bypass passage, the circulation of the refrigerant (the pressure increase of the refrigerant) is stopped, to finally stop the operation of the expansion device 110H. Furthermore, the above pump bypass passage can be provided in addition to the expansion device bypass passage 36. Furthermore, the bypass passage can be provided at any other positions, so that the circulation of the refrigerant for the Rankine cycle 40 is substantially stopped or the operation of the Rankine cycle 40 is substantially prevented, for example at such positions at which the refrigerant bypasses the heating device 43 or the condenser 31.

Furthermore, the valve device 117 is provided at the inlet side of the expansion device 110H in the above embodiment. However, a valve device for stopping the flow of the refrigerant in the Rankine cycle 40 can be provided at any other positions, for example at an inlet side of the refrigerant pump 130.

Furthermore, one of the steps S210 and S220 in FIG. 43 can be eliminated from the process for stopping the operation of the Rankine cycle 40.

Modification of the Eleventh Embodiment

Figure 44:
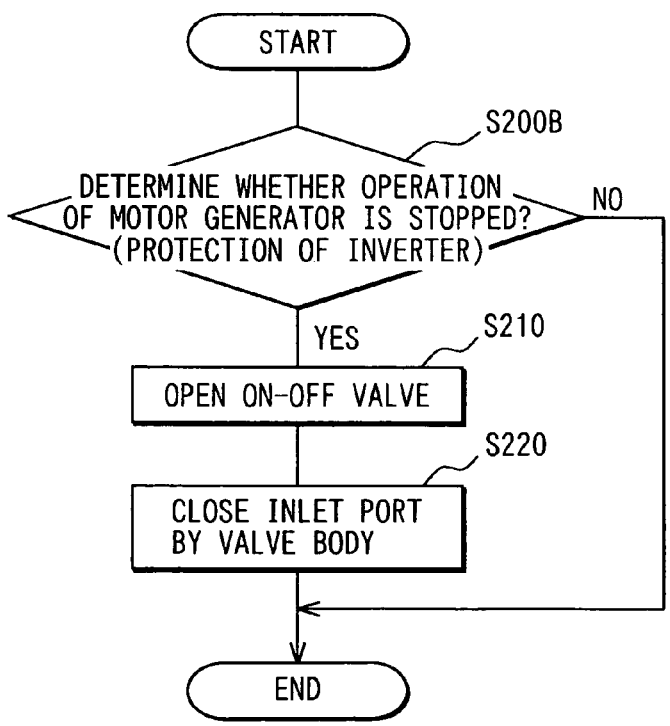
FIG. 44 is a flow chart for controlling an operation of a modification of the system of FIG. 42.

A further modification of the eleventh embodiment is explained with reference to FIG. 44. According to the modification, the controller 12 further determines an abnormal operation in the operation of the Rankine cycle 40, based on the control signal from the controller to the motor generator 120.

More specifically, the controller 12 is so designed that it stops the control of the motor generator 120, in the case that an over-current flows in the controller 12 (or an over-voltage is applied to the controller 12, or a temperature of the controller 12 becomes higher than a predetermined tolerance level), for example, as a result that a certain abnormal condition has been generated in the motor generator 120. This is for the purpose of protecting the controller 12 itself. The electronic control unit 400 detects such situation, in which the controller 12 stops the control of the motor generator 120 for protecting itself, at a step S200B in FIG. 44. When such situation is detected, the process goes to the steps S210 and S220, to open the ON-OFF valve 36*a* and close the inlet port 116 by the valve body 117*d*, as in the same manner to the process of FIG. 43.

According to the above modification, the operation of the expansion device 110H as well as the motor generator 120 can be quickly stopped, even in such abnormal condition in which the controller 12 stops the control for the motor generator 120.

Further Modification of the Eleventh Embodiment

Figure 45:
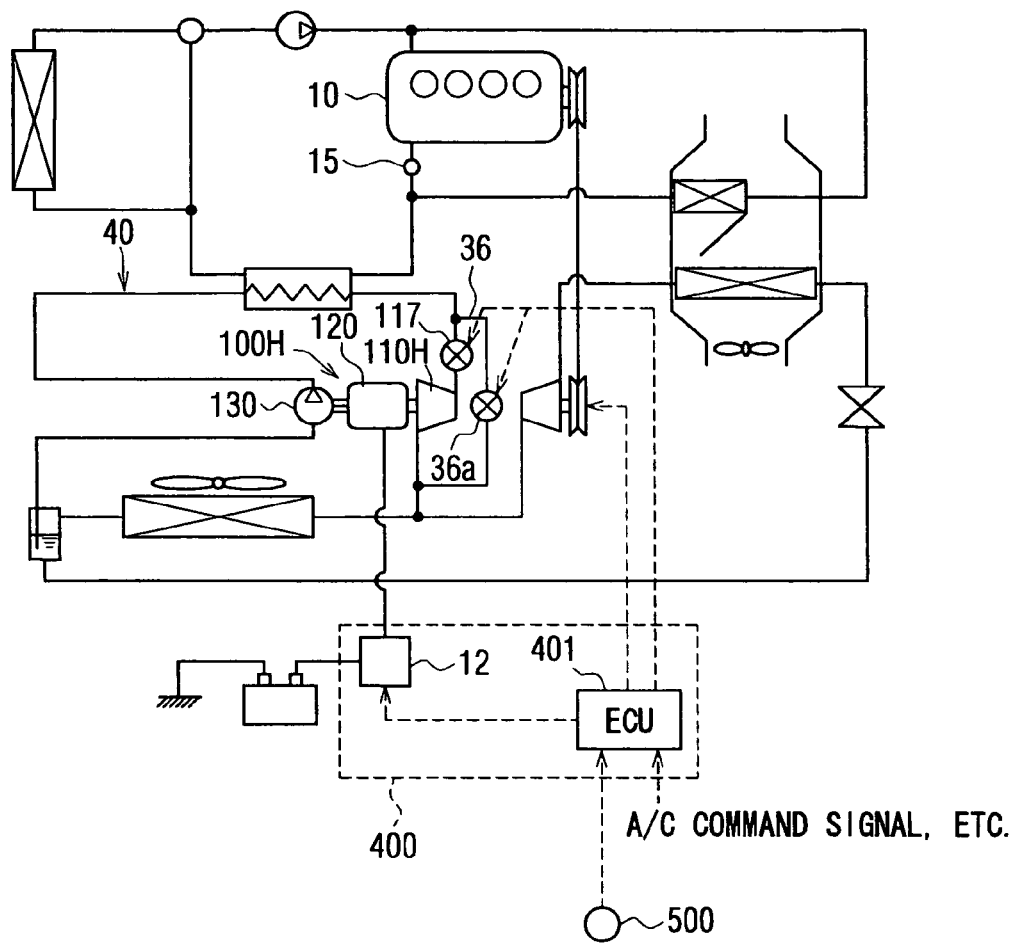
FIG. 45 is a schematic view showing a system structure according to a modification of the eleventh embodiment (FIG. 42.

A further modification of the eleventh embodiment is explained with reference to FIGS. 45 and 46. In the above ninth to eleventh embodiments, the operation of the Rankine cycle 40 as well as the motor generator 120 is started when the certain condition is met, for example, when there is sufficient waste heat, whereas the operation of the Rankine cycle 40 as well as the motor generator 120 is stopped when any abnormal condition has occurred. According to the modification, a manual switch 500 is provided, as shown in FIG. 45, so that the operation of the Rankine cycle 40 as well as the motor generator 120 can be started or stopped by an intention (a switching operation) of the vehicle passenger. As shown in FIG. 45, a signal of the manual switch 500 is inputted into the electronic control unit 400.

Figure 46:
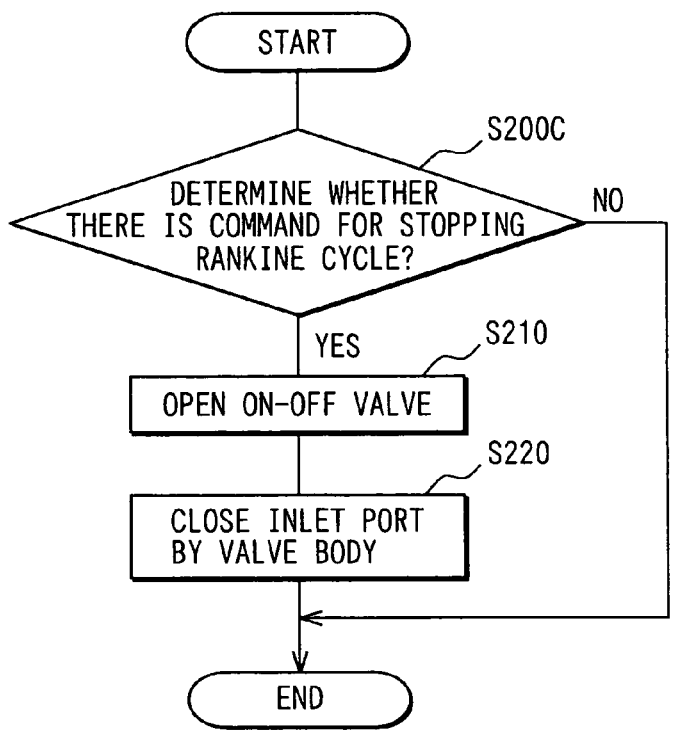
FIG. 46 is a flow chart for controlling an operation of the system of FIG. 45.

As shown in FIG. 46, when the electronic control unit 400 determines at a step S200C that there is a command signal for stopping the operation of the Rankine cycle, the process goes to the steps S210 and S220, to open the ON-OFF valve 36*a* and close the inlet port 116 by the valve body 117*d*, as in the same manner to the process of FIG. 43. The operation of the Rankine cycle 40 as well as the motor generator 120 can be, accordingly, quickly stopped.

In the case that the vehicle is provided, in addition to the Rankine cycle, with other electric power generating devices, such as the alternator, an electric power generator for collecting energy of speed reduction, and so on, and the generation of the electric power is totally controlled by a total power generation system, the step S200C is replaced by such a step, at which the electronic control unit determines whether there is a command signal for stopping the operation of the Rankine cycle 40 from the total power generation system.

In an electric power generating apparatus having multiple electric power generating devices, the most appropriate electric power generating device is selected for the operation, so that the electric power can be most effectively generated. In such apparatus, the switching of the operation from one power generating device to the other generating device must be quickly done. Accordingly, it is necessary to quickly stop the operation of the Rankine cycle, when the operation for the electric power generation is switched from the power generation by the Rankine cycle to the power generation by the electric power generator for collecting energy of speed reduction.

Further Modification of the Eleventh Embodiment

A further modification of the eleventh embodiment is explained with reference to FIG. 47. In the Rankine cycle 40, for example, as shown in FIG. 45, when an ignition switch (not shown) is turned off, the operation of the electronic control unit 400 as well as the motor generator 120 is stopped. A normally-opened type electromagnetic valve is usually used for the ON-OFF valve 36a provided in the bypass passage 36, so that the ON-OFF valve 36a is opened when the supply of the electric current to the valve 36a is cut off. A normally-closed type electromagnetic valve is usually used for the valve device 117, so that the valve device 117 is closed when the supply of the electric current to the valve device 117 is cut off.

With such an arrangement, the operation of the expansion device 110H is continued by the residual pressure of the refrigerant at the upstream side of the expansion device 110H, even when the ignition switch is turned off. In addition, the operation (rotation) of the expansion device 110H may be even accelerated, because the load of the motor generator 120 is not applied to the operation of the expansion device 110H since the motor generator 120 has been stopped.

Figure 47:
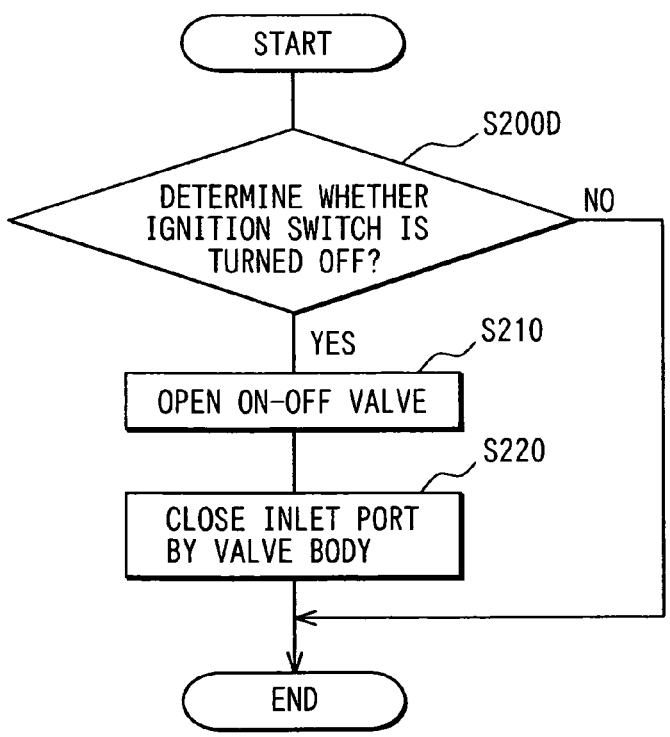
FIG. 47 is a flow chart for controlling an operation of a further modification of the system of FIG. 42.

According to the modification of the eleventh embodiment, therefore, when the turn-off of the ignition switch is detected at a step S200D in FIG. 47, the ON-OFF valve 36a of the bypass passage 36 is opened (at the step S210) and the valve device 117 is closed at the step S 220 (the inlet port 116 is closed by the valve body 117d), so that the operation of the expansion device 110H is stopped quickly and safely.

In the above embodiments, the electric power generator (the motor generator) 120 is explained as a generator having no phase sensor. However, a rotational position sensor can be provided to the generator for detecting a rotational position of a rotor with respect to a stator thereof for controlling an operation of the generator.

A mechanical braking device can be provided to the motor generator 120, instead of the electric braking operation, so that the operation of the motor generator 120 can be quickly stopped.

The invention of the above embodiments can be further applied to such a waste heat utilizing apparatus, in which the refrigerating cycle and Rankine cycle are independently provided, and the motor generator 120 is separately provided from the expansion-compressor device 110.

The expansion device bypass passage 36 can be replaced by a bypass passage connected between an upstream side and a downstream side of the heating device 34, so that the refrigerant may bypass the heating device 34 when an ON-OFF valve provided in the bypass passage is opened. As a result, the refrigerant flowing into the expansion device is prevented from being heated, and thereby the operation of Rankine cycle (the expansion device 110H) can be stopped.

As above, various methods for controlling the refrigerating apparatus, more particularly, various methods for stopping the operation of the Rankine cycle and the expansion device have been explained in the ninth to eleventh embodiments.

The invention claimed is:

1. A refrigerating apparatus having a waste heat collecting device comprising:
   a refrigerating cycle having a main compressor device, a condenser, a depressurizing device, and an evaporator, which are connected in a circuit; and
   Rankine cycle having a heating device for heating working fluid by waste heat from a thermal engine, an expansion device, the condenser, and a pump, which are connected in a circuit, wherein
   the main compressor device is driven by the thermal engine,
   the expansion device has a function of a sub-compressor device, in addition to a function of an expansion operation,
   the expansion device is operatively connected to a motor generator having a function of an electric motor and a function of an electric power generator, and
   a fluid passage device is provided and selectively connected between an inlet side of the main compressor device and an inlet side of the condenser via the expansion device, so that working fluid flows from the inlet side of the main compressor device to the inlet side of the condenser through the expansion device when the expansion device is operated as the sub-compressor device.

2. A refrigerating apparatus according to claim 1, wherein the working fluid flows through the expansion device when the expansion device is operated as the sub-compressor device, in a direction opposite to a flow direction of the working fluid flowing through the expansion device during its expansion operation, and
   the fluid passage device comprises
   a first connecting passage connected between the inlet side of the main compressor device and an inlet side of the expansion device when the expansion device is operated as the sub-compressor device;
   a second connecting passage connected between an outlet side of the expansion device, when the expansion device is operated as the sub-compressor device, and the inlet side of the condenser;
   a first ON-OFF valve provided in the first connecting passage;
   a second ON-OFF valve provided in the second connecting passage;
   a third connecting passage connected between an outlet side of the main compressor device and the inlet side of the expansion device when the expansion device is operated as the sub-compressor device; and
   a third ON-OFF valve provided in the third connecting passage,
   wherein the first and second ON-OFF valves are opened and the third ON-OFF valve is closed when the expansion device is to be operated as the sub-compressor device, so that the working fluid is allowed to flow from the inlet side of the main compressor device to the inlet side of the condenser through the expansion device, and the working fluid is prohibited from flowing from the outlet side of the main compressor device to the inlet side of the sub-compressor device.

3. A refrigerating apparatus according to claim 2, wherein the first ON-OFF valve is replaced by a check valve for allowing the working fluid to flow only from the inlet side of the main compressor device to the inlet side of the expansion device when the expansion device is operated as the sub-compressor device, so that a reversed flow of the working fluid is prohibited.

4. A refrigerating apparatus according to claim 1 or 2, wherein the third ON-OFF valve is replaced by a check valve for prohibiting the working fluid to flow from the inlet side of the main compressor device to the inlet side of the expansion device when the expansion device is operated as the sub-compressor device, while a reversed flow of the working fluid through the check valve is allowed.

5. A refrigerating apparatus according to claim 1, wherein the working fluid flows through the expansion device when the expansion device is operated as the sub-compressor device, in a direction identical to a flow direction of the working fluid flowing through the expansion device during its expansion operation, and the fluid passage device comprises;

a fluid connecting passage connected between the inlet side of the main compressor device and an inlet side of the expansion device when the expansion device is operated as the sub-compressor device; and a fluid passage ON-OFF valve provided in the fluid connecting passage, for opening the fluid connecting passage when the expansion device is to be operated as the sub-compressor device.

* * * * *

UNITED STATES PATENT AND TRADEMARK OFFICE
CERTIFICATE OF CORRECTION

| | | |
|---|---|---|
| PATENT NO. | : 7,992,400 B2 | Page 1 of 1 |
| APPLICATION NO. | : 12/078074 | |
| DATED | : August 9, 2011 | |
| INVENTOR(S) | : Keiichi Uno et al. | |

It is certified that error appears in the above-identified patent and that said Letters Patent is hereby corrected as shown below:

Title Page

Correct Item (75) Inventors

Keiichi Uno, Kariya (JP); Hironori Asa, Okazaki (JP);
Yasuhiro Takeuchi, Kariya (JP); Hideji Yoshida, Hashima (JP);
Akihiro Imura, Kariya (JP); Atsushi Inaba, Kariya (JP);
Hiroshi Kishita, Anjo (JP); Hiroshi Ogawa, Nagoya (JP)

Signed and Sealed this
Twentieth Day of December, 2011

David J. Kappos
*Director of the United States Patent and Trademark Office*